US012796861B2

(12) United States Patent
Masek et al.

(10) Patent No.: US 12,796,861 B2
(45) Date of Patent: Nov. 17, 2026

(54) ACCESSORY SUPPORT FRAMES FOR GRILLS

(71) Applicant: Weber-Stephen Products LLC, Palatine, IL (US)

(72) Inventors: Douglas W. Masek, Palatine, IL (US); Curtis P. Menning, Palatine, IL (US)

( * ) Notice: Subject to any disclaimer, the term of this patent is extended or adjusted under 35 U.S.C. 154(b) by 457 days.

(21) Appl. No.: 18/439,989

(22) Filed: Feb. 13, 2024

(65) Prior Publication Data

US 2025/0255433 A1 Aug. 14, 2025

(51) Int. Cl.
*A47J 37/07* (2006.01)

(52) U.S. Cl.
CPC .................................. *A47J 37/0786* (2013.01)

(58) Field of Classification Search
CPC .................................................. A47J 37/0786
USPC ....................................... 126/25 R, 30, 37 A
See application file for complete search history.

(56) References Cited

U.S. PATENT DOCUMENTS

| | | | | |
|---|---|---|---|---|
| 2,823,657 | A * | 2/1958 | Brodbeck | F24C 15/12 126/211 |
| 4,688,541 | A | 8/1987 | Stephen et al. | |
| 5,104,080 | A * | 4/1992 | Berger | A47J 37/0786 211/90.01 |
| 6,474,327 | B1 | 11/2002 | Bossler | |
| D477,501 | S | 7/2003 | Coleman et al. | |
| D480,914 | S | 10/2003 | Wagner et al. | |
| 7,793,649 | B2 | 9/2010 | Barkhouse et al. | |
| D680,365 | S | 4/2013 | Chung | |
| D709,316 | S | 7/2014 | Yang | |
| 9,289,096 | B2 | 3/2016 | Barkhouse et al. | |
| 9,329,606 | B2 | 5/2016 | Barkhouse et al. | |
| 9,492,032 | B2 | 11/2016 | Chung | |
| D796,249 | S | 9/2017 | Morelock et al. | |
| 9,814,354 | B2 | 11/2017 | McAdams et al. | |
| 9,907,435 | B2 | 3/2018 | Kohler et al. | |
| D827,370 | S | 9/2018 | Colston | |
| D831,403 | S | 10/2018 | Morelock et al. | |

(Continued)

FOREIGN PATENT DOCUMENTS

| | | | |
|---|---|---|---|
| DE | 102017125414 | A1 | 5/2019 |
| DE | 202022106733 | U1 | 1/2023 |

(Continued)

OTHER PUBLICATIONS

Weber, Slate 30" Rust-Resistant Griddle, accessed on Feb. 15, 2024 from https://www.weber.com/US/en/griddle/stand-up-griddles/slate-30-rust-resistant-griddle/1500014.html.

(Continued)

*Primary Examiner* — Vivek K Shirsat
(74) *Attorney, Agent, or Firm* — Avantech Law, LLP

(57) ABSTRACT

Accessory support frames for grills are disclosed. An example accessory support frame includes a front support, a rear support, an inset region, and an accessory rail. The rear support is spaced apart from the front support. The inset region is located between and bordered by the front support and the rear support. The inset region is configured to receive and to support an insertable accessory. The accessory rail is coupled to the front support and the rear support. The inset region is bordered by the accessory rail. The accessory rail includes an accessory mounting segment configured to be engaged by and to support a snap fit accessory.

20 Claims, 49 Drawing Sheets

(56) References Cited

U.S. PATENT DOCUMENTS

| | | | | |
|---|---|---|---|---|
| 10,180,691 | B2 | 1/2019 | Barkhouse et al. | |
| D844,362 | S | 4/2019 | Davis et al. | |
| 10,302,539 | B2 | 5/2019 | Prior et al. | |
| 10,327,589 | B1 | 6/2019 | Dahle et al. | |
| 10,413,124 | B2 | 9/2019 | Morelock et al. | |
| 10,426,295 | B2 | 10/2019 | McAdams et al. | |
| 10,492,644 | B2 | 12/2019 | Olsen | |
| 10,588,461 | B2 | 3/2020 | Dahle | |
| D883,009 | S | 5/2020 | Lien | |
| 10,667,650 | B2 | 6/2020 | Denning | |
| 10,729,283 | B2 | 8/2020 | McAdams et al. | |
| 10,888,193 | B2 | 1/2021 | Dahle et al. | |
| 10,959,572 | B2 | 3/2021 | Dahle et al. | |
| 11,116,360 | B2 | 9/2021 | Dahle et al. | |
| 11,172,688 | B2 | 11/2021 | Powell et al. | |
| 11,197,580 | B2 | 12/2021 | Dahle et al. | |
| 11,202,532 | B2 | 12/2021 | Dahle et al. | |
| 11,231,178 | B2 | 1/2022 | James | |
| 11,284,743 | B2 | 3/2022 | Dahle et al. | |
| D947,589 | S | 4/2022 | Czach et al. | |
| 11,311,147 | B2 | 4/2022 | Dahle | |
| 11,350,790 | B2 | 6/2022 | Jan et al. | |
| 11,439,275 | B2 | 9/2022 | Morelock et al. | |
| 11,457,771 | B2 | 10/2022 | Jan et al. | |
| D968,155 | S | 11/2022 | Springer | |
| D968,871 | S | 11/2022 | Springer | |
| 11,607,079 | B2 | 3/2023 | Dahle et al. | |
| 11,751,723 | B2 * | 9/2023 | Dahle | A47J 37/0763 126/25 R |
| 11,759,050 | B2 | 9/2023 | Dahle et al. | |
| 11,918,144 | B2 | 3/2024 | Jan et al. | |
| 2012/0247448 | A1 | 10/2012 | Thibodeaux | |
| 2012/0266856 | A1 | 10/2012 | Zelek et al. | |
| 2013/0340741 | A1 * | 12/2013 | Kahler | A47J 37/0786 126/25 R |
| 2017/0198917 | A1 | 7/2017 | Gillespie et al. | |
| 2020/0093145 | A1 | 3/2020 | Powell et al. | |
| 2021/0007550 | A1 | 1/2021 | Puertas et al. | |
| 2021/0196078 | A1 | 7/2021 | Colston et al. | |
| 2021/0196079 | A1 | 7/2021 | Dahle et al. | |
| 2022/0110483 | A1 | 4/2022 | Dahle et al. | |
| 2022/0133090 | A1 | 5/2022 | Shen | |
| 2022/0160175 | A1 | 5/2022 | Wright | |
| 2022/0304506 | A1 | 9/2022 | Bauerdick et al. | |
| 2023/0013573 | A1 | 1/2023 | McFadden et al. | |
| 2023/0031340 | A1 | 2/2023 | Dahle et al. | |
| 2023/0056438 | A1 | 2/2023 | Marquez | |
| 2023/0088726 | A1 | 3/2023 | Witzel et al. | |
| 2023/0218111 | A1 | 7/2023 | Czach et al. | |
| 2023/0301438 | A1 | 9/2023 | Sherer et al. | |

FOREIGN PATENT DOCUMENTS

| | | |
|---|---|---|
| FR | 941213 | 6/1994 |
| WO | 2022166443 A1 | 8/2022 |

OTHER PUBLICATIONS

Weber, Slate 36" Rust-Resistant Griddle, accessed on Feb. 15, 2024 from https://www.weber.com/us/en/griddle/stand-up-griddles/slate-36-rust-resistant-griddle/1500216.html.

International Searching Authority, "International Search Report and Written Opinion," issued in connection with International Patent Application No. PCT/US2024/058075, mailed on Mar. 20, 2025, 9 pages.

* cited by examiner

SECTION A-A

SECTION B-B

SECTION C-C

SECTION A-A

SECTION A-A

SECTION A-A

ACCESSORY SUPPORT FRAMES FOR GRILLS

FIELD OF THE DISCLOSURE

This disclosure relates generally to stands for grills and, more specifically, to accessory support frames for grills.

BACKGROUND

Grills (e.g., gas grills, charcoal grills, pellet grills, electric grills, etc.) are commonly equipped with one or more side table(s) having an upper tabletop surface configured to support one or more item(s) (e.g., food, tools, utensils, vessels, devices, etc.) that may be utilized in connection with preparing, cooking, and/or serving food. In some instances, the side table(s) of the grill is/are equipped with one or more hook(s), bar(s), handle(s), or rail(s) configured to support an accessory or a plurality of accessories that is/are removably couplable to the side table(s).

Figure 1:
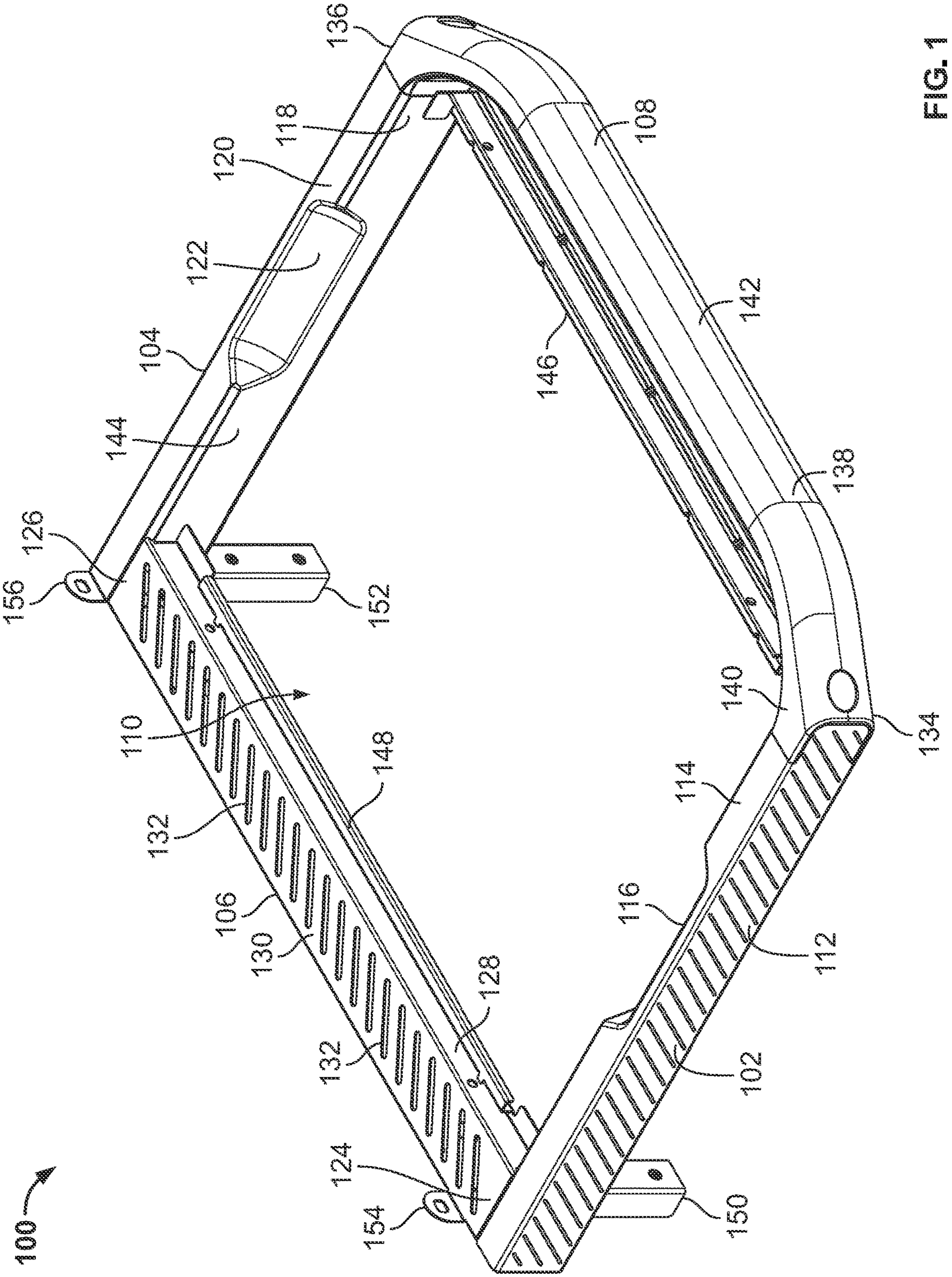
FIG. 1 is a perspective view of an example accessory support frame constructed in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Unless specifically stated otherwise, descriptors such as “first,” “second,” “third,” etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor “first” may be used to refer to an element in the detailed description, while the same element may be referred to in a claim with a different descriptor such as “second” or “third.” In such instances, it should be understood that such descriptors are used merely for identifying those elements distinctly that might, for example, otherwise share a same name.

DETAILED DESCRIPTION

Example accessory support frames disclosed herein are advantageously configured to increase (e.g., maximize) the configurability offered by a conventional side table of a grill. In this regard, example accessory support frames disclosed herein include (1) an inset region configured to interchangeably receive and/or support respective ones of a plurality of insertable accessories (e.g., a tabletop, a cutting board, a storage bin, a basin, a caddy, a tray, etc.), and (2) an accessory rail configured to interchangeably receive and/or support respective ones of a plurality of snap fit accessories (e.g., a tool hook, a bottle holder, a caddy, a bag holder, a roll holder, etc.). When one or more instance(s) of the disclosed accessory support frames is/are incorporated into (e.g., coupled to) a grill, the enhanced configurability associated with each such accessory support frame provides a user of a grill with substantial flexibility in terms of customizing the combination, configuration, and/or arrangement of accessories to be supported by the accessory support frame of the grill at any given time to suit the user’s current and/or future needs in association with the grill.

In some disclosed examples, an accessory support frame includes a front support, a rear support, an inset region, and an accessory rail. The rear support is spaced apart from the front support. The inset region is located between and bordered by the front support and the rear support. The inset region is configured to receive and to support an insertable accessory. The accessory rail is coupled to the front support and the rear support. The inset region is bordered by the accessory rail. The accessory rail includes an accessory mounting segment configured to be engaged by and to support a snap fit accessory.

In some disclosed examples, the insertable accessory is one insertable accessory from among a plurality of insertable accessories, wherein respective ones of the plurality of insertable accessories are configured to be interchangeably inserted into the inset region. In some disclosed examples, the plurality of insertable accessories includes a tabletop, a cutting board, a storage bin, a basin, a caddy, or a tray. In some disclosed examples, the snap fit accessory is one snap fit accessory from among a plurality of snap fit accessories, wherein respective ones of the plurality of snap fit accessories are configured to be interchangeably removably coupled to the accessory mounting segment. In some disclosed examples, the plurality of snap fit accessories includes a tool hook, a caddy, a bottle holder, a bag holder, or a roll holder.

In some disclosed examples, the inset region of the accessory support frame includes a first support rail and a second support rail. The first support rail is located between the front support and the rear support, and is configured to support a first portion of the insertable accessory. The second support rail is located between the front support and the rear support, is spaced apart from the first support rail, and is configured to support a second portion of the insertable accessory. In some disclosed examples, the accessory mounting segment of the accessory rail is spaced apart from and oriented parallel relative to the first support rail of the inset region. In some disclosed examples, the second support rail is oriented parallel relative to the first support rail.

In some disclosed examples, the second support rail is spaced apart from the first support rail by a width, and the rear support is spaced apart from the front support by a depth. In some disclosed examples, the insertable accessory is configured to occupy the width when the insertable accessory is inserted into the inset region. In some disclosed examples, the insertable accessory is configured to substantially occupy the depth when the insertable accessory is inserted into the inset region. In some disclosed examples, the insertable accessory is configured to occupy approximately one half of the depth when the insertable accessory is inserted into the inset region.

In some disclosed examples, at least one of the front support or the rear support includes a recess leading into and extending outwardly from the inset region. In some disclosed examples, the recess is configured to enable removal of the insertable accessory from the inset region.

In some disclosed examples, the accessory support frame further includes a side support coupled to the front support and the rear support. The side support is spaced apart from the accessory rail. The inset region is located between and bordered by the side support and the accessory rail. In some disclosed examples, an upper surface of the side support includes a plurality of heat distribution openings.

In some disclosed examples, the accessory support frame further includes a mounting leg located proximate the side support. The mounting leg extends below the inset region, and is receivable within and couplable to a support member of a grill. In some disclosed examples, the accessory support frame further includes a mounting tab located proximate the side support. The mounting tab extends above the inset region, and is couplable to a support member of the grill.

In some disclosed examples, the accessory mounting segment of the accessory support frame is configured to be engaged by a connector of the snap fit accessory to removably couple the snap fit accessory to the accessory rail. In some disclosed examples, a shape of a portion of the connector of the snap fit accessory complements a shape of a portion of the accessory mounting segment of the accessory rail.

In some disclosed examples, the accessory support frame is advantageously configured to (1) enable removal of the insertable accessory from the inset region while the snap fit accessory remains coupled to the accessory mounting segment of the accessory rail, and (2) enable removal of the snap fit accessory from the accessory mounting segment of the accessory rail while the insertable accessory remains within the inset region.

The above-identified features as well as other advantageous features of example accessory support frames for grills disclosed herein are further described below in connection with the figures of the application.

As used herein, the term "configured" means sized, shaped, arranged, structured, oriented, positioned, and/or located. For example, in the context of a first part configured to fit within a second part, the first part is sized, shaped, arranged, structured, oriented, positioned, and/or located to fit within the second part.

As used herein in the context of a first object circumscribing a second object, the term "circumscribe" means that the first object is constructed around and/or defines an area around the second object. In interpreting the term "circumscribe" as used herein, it is to be understood that the first object circumscribing the second object can include gaps and/or can consist of multiple spaced-apart objects, such that a boundary formed by the first object around the second object is not necessarily a continuous boundary.

As used herein, unless otherwise stated, the terms "above" and "below" describe the relationship of two parts relative to Earth. For example, as used herein, a first part is "above" a second part if the second part is closer to Earth than the first part is. As another example, as used herein, a first part is "below" a second part if the first part is closer to Earth than the second part is. It is to be understood that a first part can be above or below a second part with one or more of: another part or parts therebetween; without another part therebetween; with the first and second parts contacting one another; or without the first and second parts contacting one another.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

As used herein, the terms "substantially" and/or "approximately" modify their subjects and/or values to recognize the potential presence of variations that occur in real world applications. For example, "substantially" and/or "approximately" may modify dimensions that may not be exact due to manufacturing tolerances and/or other real-world imperfections as will be understood by persons of ordinary skill in the art. For example, "substantially" and/or "approximately" may indicate such dimensions may be within a tolerance range of +/−10% unless otherwise specified in the description provided herein.

As used herein, the terms "including" and "comprising" (and all forms and tenses thereof) are open-ended terms. Thus, whenever the written description or a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements, or method actions may be implemented by, for example, the same entity or object. Additionally, although individual features may be included in different examples or claims, these may possibly be combined, and the inclusion in different examples or claims does not imply that a combination of features is not feasible and/or advantageous.

The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein, when the phrase "at least" is used as the transition term in, for example, a preamble of a claim, it is open-ended in the same manner as the term "comprising" and "including" are open-ended. As used herein in the context of describing structures, components, items, objects, and/or things, the phrase "at least one of A and B" is intended to refer to implementations including any of (1) at least one A, (2) at least one B, or (3) at least one A and at least one B. Similarly, as used herein in the context of describing structures, components, items, objects, and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, and/or steps, the phrase "at least one of A or B" is intended to refer to implementations including any of (1) at least one A, (2) at least one B, or (3) at least one A and at least one B.

Figure 2:
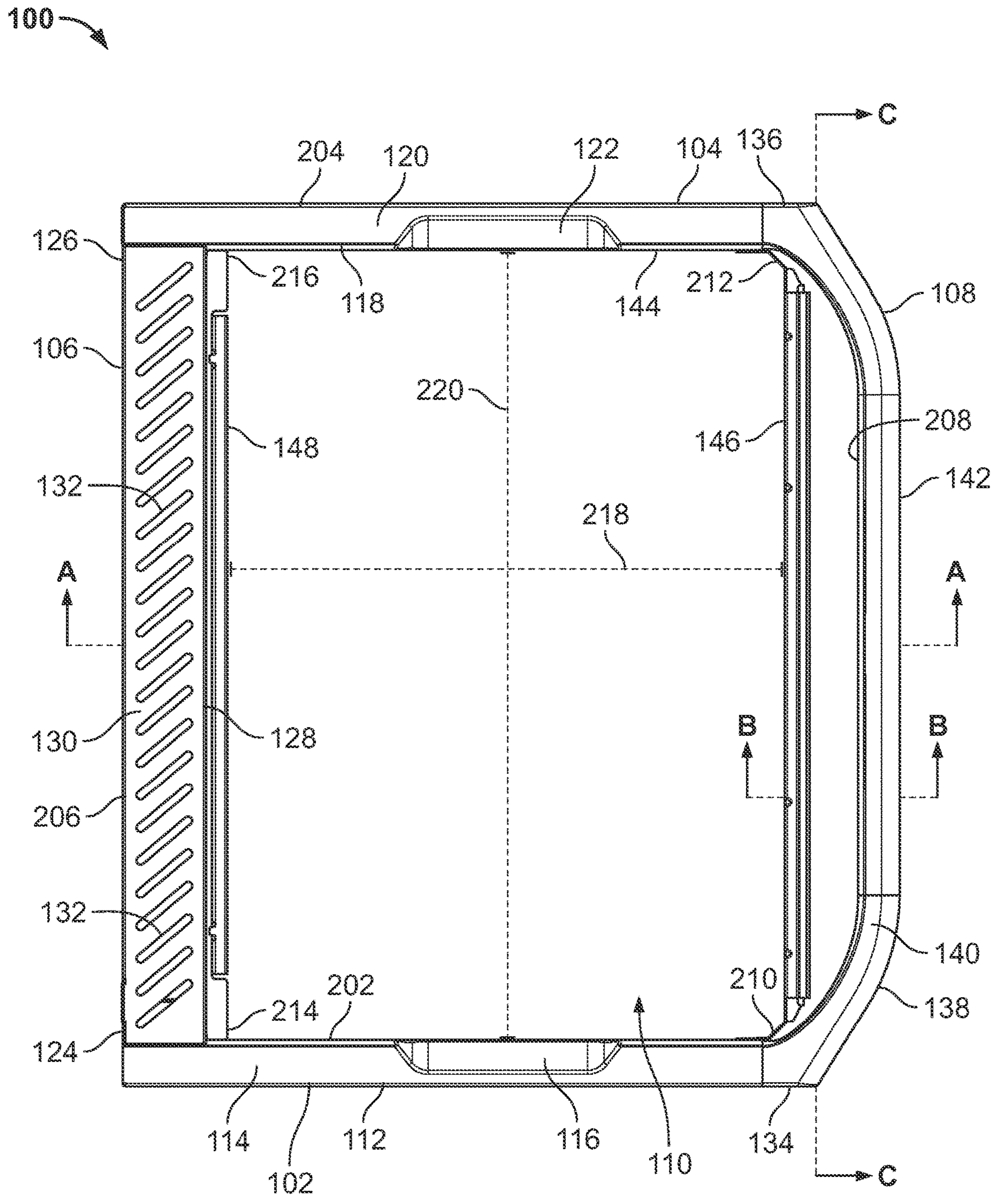
FIG. 2 is a top view of the accessory support frame of FIG. 1.
Figure 3:
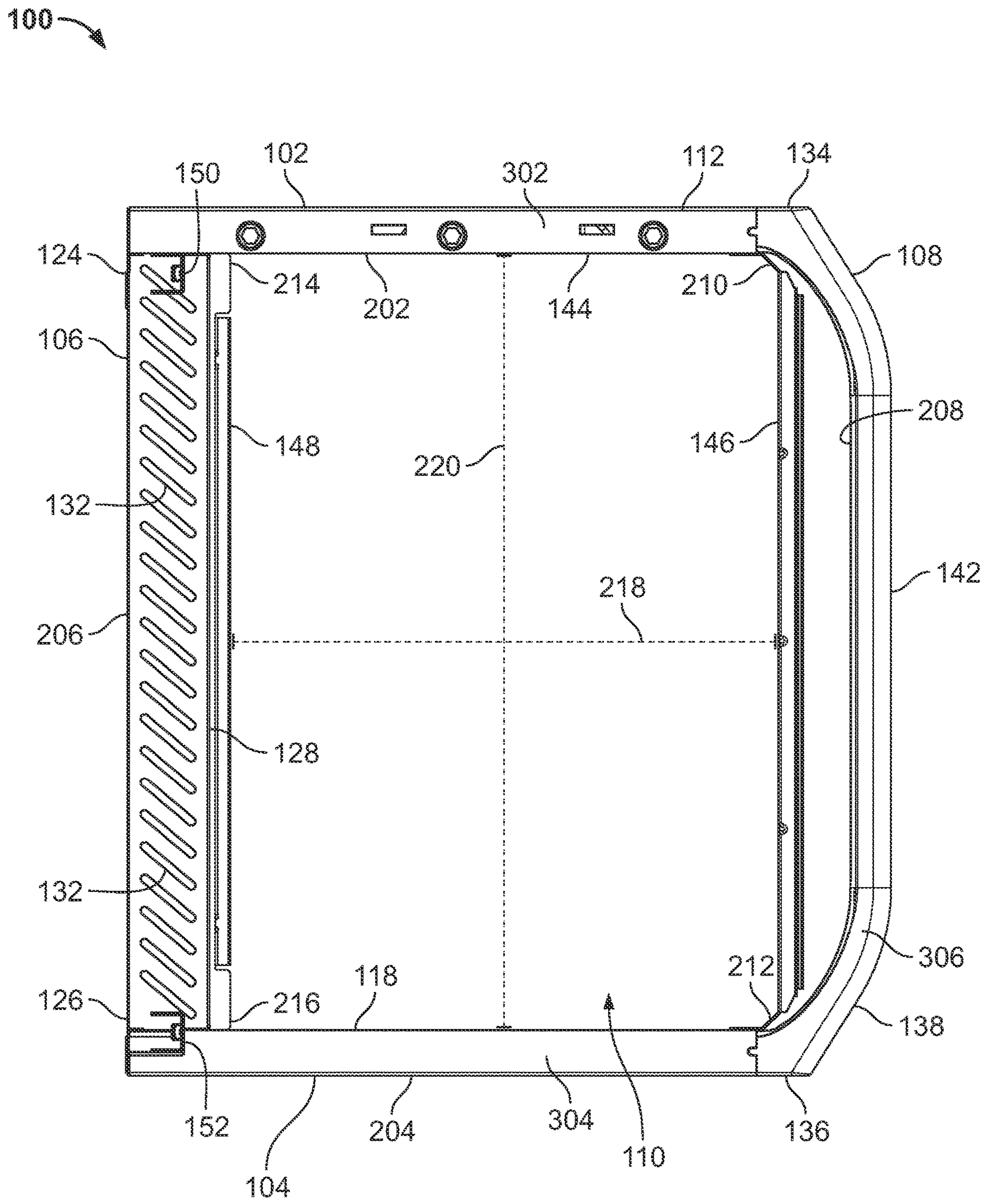
FIG. 3 is a bottom view of the accessory support frame of FIGS. 1 and 2.
Figure 4:
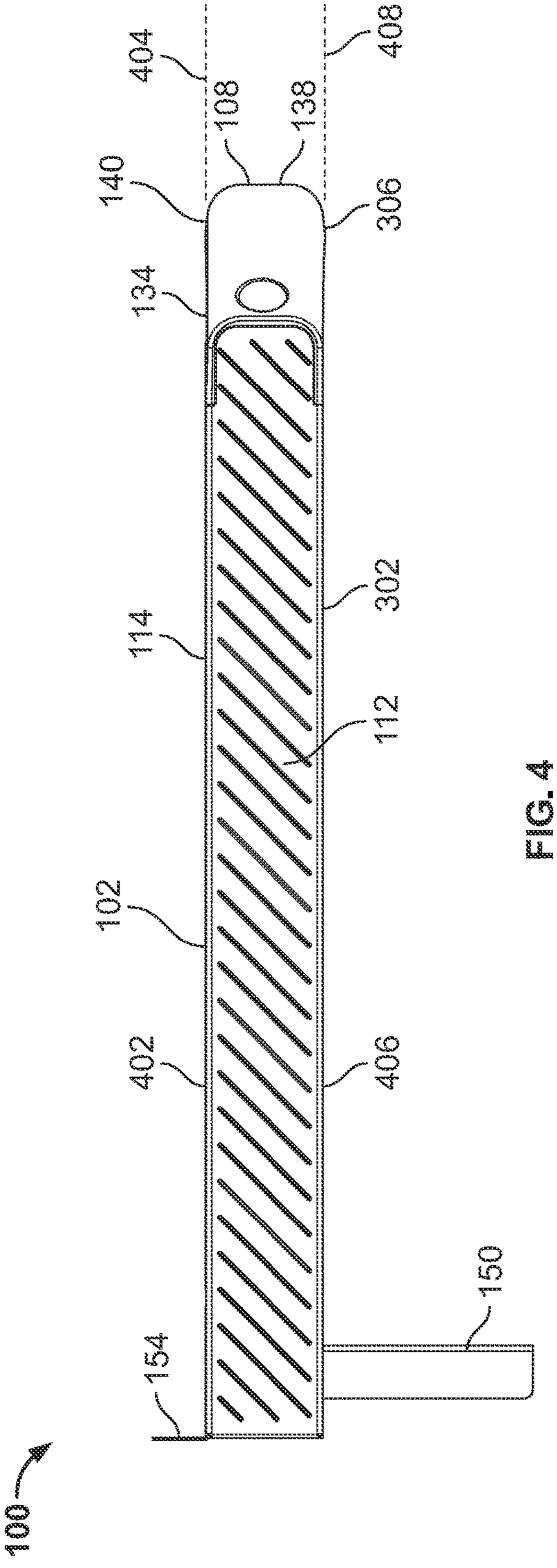
FIG. 4 is a front view of the accessory support frame of FIGS. 1-3.
Figure 5:
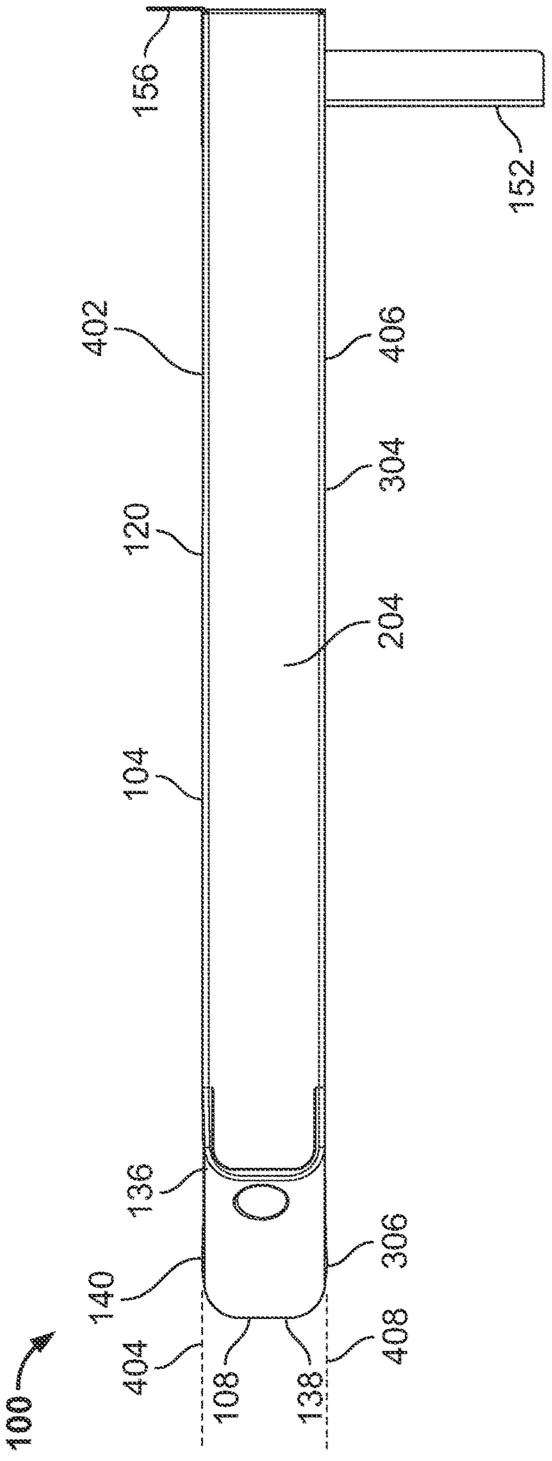
FIG. 5 is a rear view of the accessory support frame of FIGS. 1-4.
Figure 6:
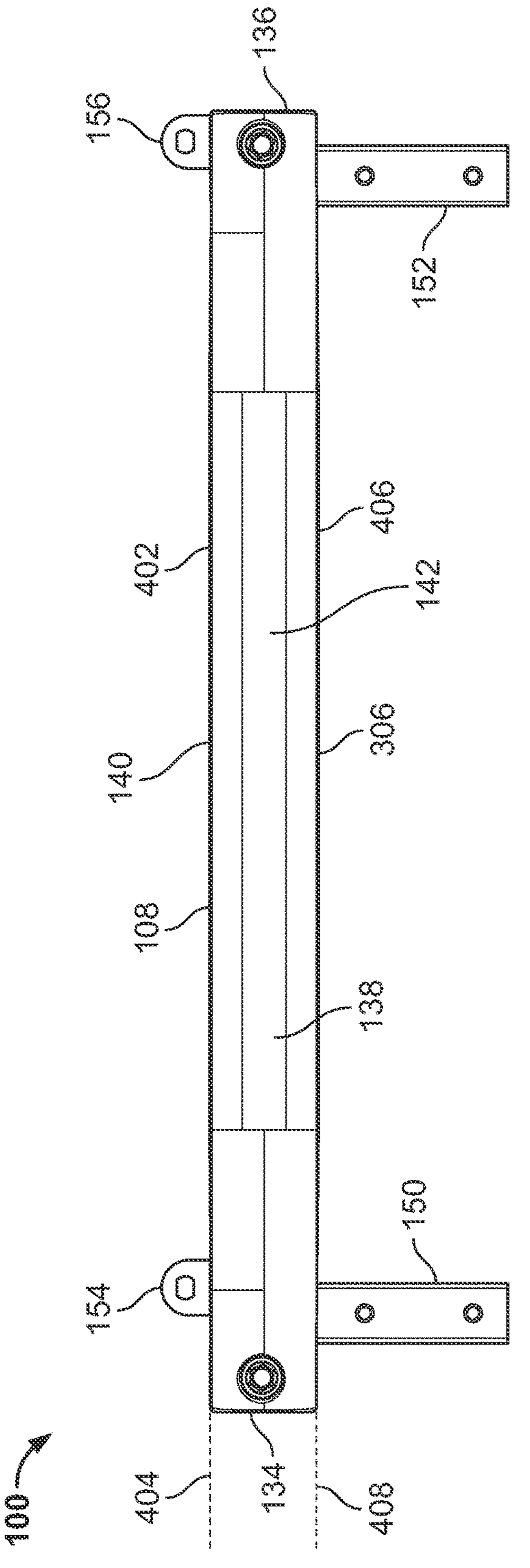
FIG. 6 is a right side view of the accessory support frame of FIGS. 1-5.
Figure 7:
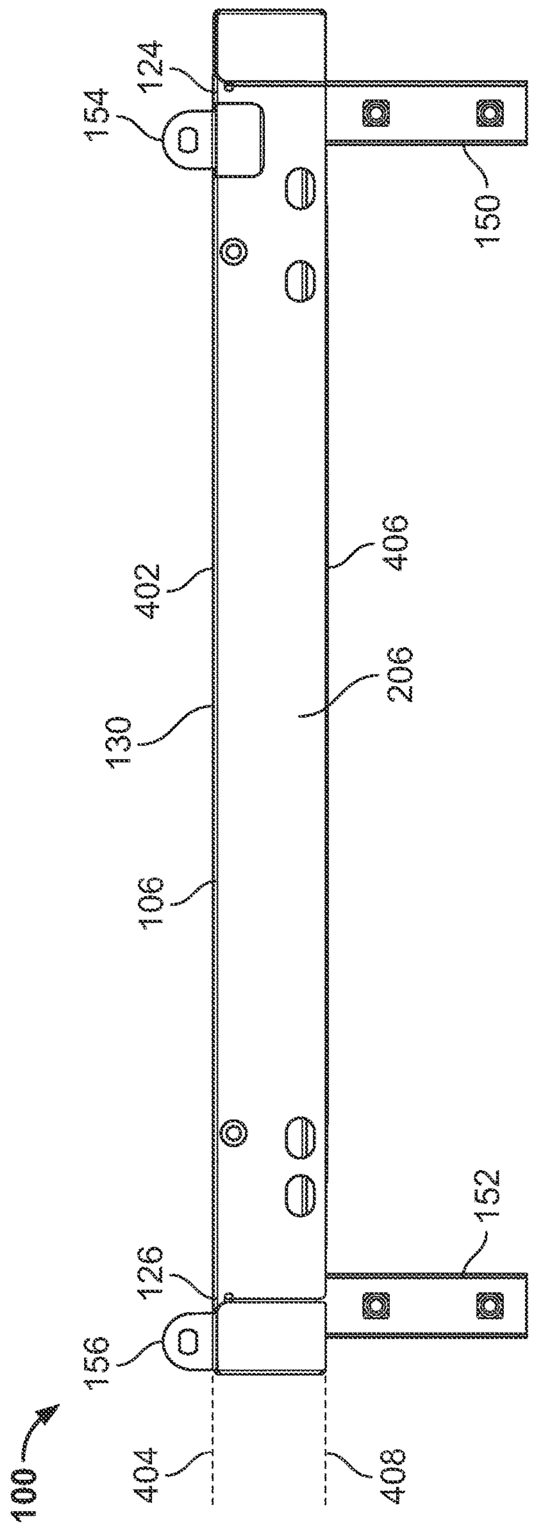
FIG. 7 is a left side view of the accessory support frame of FIGS. 1-6.
Figure 8:
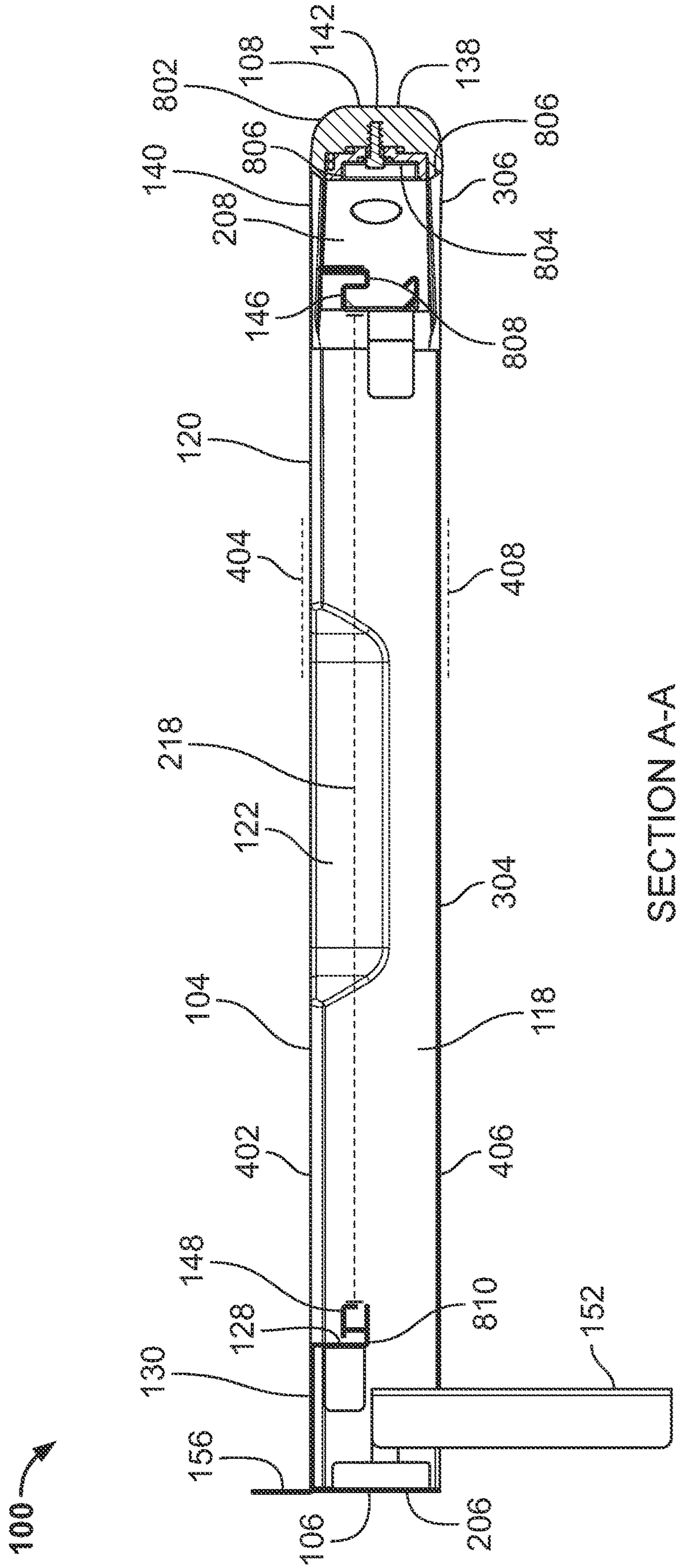
FIG. 8 is a cross-sectional view of the accessory support frame of FIGS. 1-7 taken along section A-A of FIG. 2.
Figure 9:
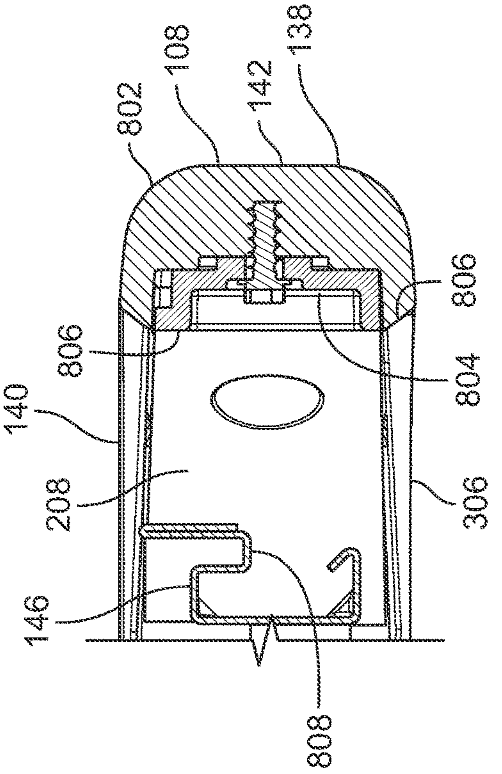
FIG. 9 is a cross-sectional view of the accessory support frame of FIGS. 1-8 taken along section B-B of FIG. 2.
Figure 10:
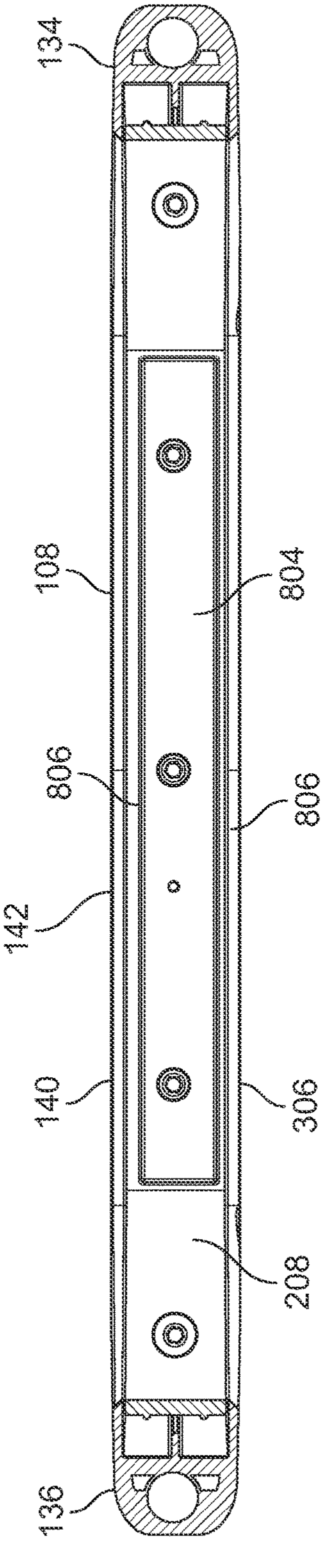
FIG. 10 is a cross-sectional view of the accessory support frame of FIGS. 1-9 taken along section C-C of FIG. 2.

FIG. 1 is a perspective view of an example accessory support frame 100 constructed in accordance with the teachings of this disclosure. FIG. 2 is a top view of the accessory support frame 100 of FIG. 1. FIG. 3 is a bottom view of the accessory support frame 100 of FIGS. 1 and 2. FIG. 4 is a front view of the accessory support frame 100 of FIGS. 1-3. FIG. 5 is a rear view of the accessory support frame 100 of FIGS. 1-4. FIG. 6 is a right side view of the accessory support frame 100 of FIGS. 1-5. FIG. 7 is a left side view of the accessory support frame 100 of FIGS. 1-6. FIG. 8 is a cross-sectional view of the accessory support frame 100 of FIGS. 1-7 taken along section A-A of FIG. 2. FIG. 9 is a cross-sectional view of the accessory support frame 100 of FIGS. 1-8 taken along section B-B of FIG. 2. FIG. 10 is a cross-sectional view of the accessory support frame 100 of FIGS. 1-9 taken along section C-C of FIG. 2.

The accessory support frame 100 of FIGS. 1-10 includes one or more support member(s) (e.g., supports, rails, rods, beams, braces, brackets, etc.) configured to support and/or carry various accessories, as further described herein. In the illustrated example of FIGS. 1-10, the accessory support frame 100 includes an example front support 102, an example rear support 104, an example side support 106, and an example accessory rail 108. The front support 102, the rear support 104, the side support 106, and the accessory rail 108 border, circumscribe, and/or otherwise define an example inset region 110 of the accessory support frame 100. In this regard, the inset region 110 of FIGS. 1-10 is located between the front support 102 and the rear support 104 of the accessory support frame 100, and between the side support 106 and the accessory rail 108 of the accessory support frame 100. The inset region 110 of the accessory support frame 100 of FIGS. 1-10 is configured to receive and to support various ones of a plurality of insertable accessories, respective ones of which are configured to be interchangeably inserted into the inset region 110, as further described herein.

The front support 102 of the accessory support frame 100 of FIGS. 1-10 includes an example outer surface 112, an example inner surface 202 located opposite the outer surface 112, an example upper surface 114 extending between the outer surface 112 and the inner surface 202, and an example lower surface 302 located opposite the upper surface 114 and extending between the outer surface 112 and the inner surface 202. In the illustrated example of FIGS. 1-10, the front support 102 has a generally rectangular cross-sectional profile defined by the outer surface 112, the inner surface 202, the upper surface 114, and the lower surface 302 of the front support 102. In other examples, the front support 102 can instead have a cross-sectional profile that is non-rectangular (e.g., circular, oval, triangular, trapezoidal, hexagonal, etc.). In the illustrated example of FIGS. 1-10, the front support 102 further includes an example recess 116 formed in the inner surface 202 and the upper surface 114 of the front support 102. The recess 116 of the front support 102 leads into and/or extends outwardly from the inset region 110 of the accessory support frame 100. The recess 116 of the front support 102 is configured to enable removal of an insertable accessory from the inset region 110 of the accessory support frame 100 subsequent to the insertable accessory having been inserted into and/or otherwise located within the inset region 110 of the accessory support frame 100.

The rear support 104 of the accessory support frame 100 of FIGS. 1-10 is spaced apart from the front support 102 of the accessory support frame 100. In the illustrated examples of FIGS. 1-10, the rear support 104 is oriented parallel relative to the front support 102. In other examples, the rear support 104 can instead be oriented at an angle (e.g., non-parallel) relative to the front support 102. The rear support 104 of the accessory support frame 100 of FIGS. 1-10 includes an example outer surface 204, an example inner surface 118 located opposite the outer surface 204, an example upper surface 120 extending between the outer surface 204 and the inner surface 118, and an example lower surface 304 located opposite the upper surface 120 and extending between the outer surface 204 and the inner surface 118. In the illustrated example of FIGS. 1-10, the rear support 104 has a generally rectangular cross-sectional profile defined by the outer surface 204, the inner surface 118, the upper surface 120, and the lower surface 304 of the rear support 104. In other examples, the rear support 104 can instead have a cross-sectional profile that is non-rectangular (e.g., circular, oval, triangular, trapezoidal, hexagonal, etc.). In the illustrated example of FIGS. 1-10, the rear support 104 further includes an example recess 122 formed in the inner surface 118 and the upper surface 120 of the rear support 104. The recess 122 of the rear support 104 leads into and/or extends outwardly from the inset region 110 of the accessory support frame 100. The recess 122 of the rear support 104 is configured to enable removal of an insertable accessory from the inset region 110 of the accessory support frame 100 subsequent to the insertable accessory having been inserted into and/or otherwise located within the inset region 110 of the accessory support frame 100.

The side support 106 of the accessory support frame 100 of FIGS. 1-10 is coupled to the front support 102 and the rear support 104 of the accessory support frame 100. More specifically, an example first end 124 of the side support 106 is coupled to the front support 102, and an example second end 126 of the side support 106 located opposite the first end 124 of the side support 106 is coupled to the rear support 104. In the illustrated examples of FIGS. 1-10, the side support 106 is oriented perpendicular relative to the front support 102 and/or relative to the rear support 104. In other examples, the side support 106 can instead be oriented at a non-perpendicular angle relative to the front support 102 and/or relative to the rear support 104. The side support 106 of the accessory support frame 100 of FIGS. 1-10 includes an example outer surface 206, an example inner surface 128 located opposite the outer surface 206, and an example upper surface 130 extending between the outer surface 206 and the inner surface 128. In the illustrated example of FIGS. 1-10, the upper surface 130 of the side support 106 includes example heat distribution openings 132 formed in and extending through the upper surface 130 of the side support 106. The heat distribution openings 132 are configured to distribute, disperse, and/or release heat received from a cookbox of a grill when the accessory support frame 100 is coupled to the grill and when the cookbox is in use.

The accessory rail 108 of the accessory support frame 100 of FIGS. 1-10 is coupled to the front support 102 and the rear support 104 of the accessory support frame 100. More specifically, an example first end 134 of the accessory rail 108 is coupled to the front support 102, and an example second end 136 of the accessory rail 108 located opposite the first end 134 of the accessory rail 108 is coupled to the rear support 104. The accessory rail 108 of the accessory support frame 100 of FIGS. 1-10 is spaced apart from the side support 106 of the accessory support frame 100. In the illustrated examples of FIGS. 1-10, the accessory rail 108 is oriented parallel relative to the side support 106. In other examples, the accessory rail 108 can instead be oriented at an angle (e.g., non-parallel) relative to the side support 106. In the illustrated example of FIGS. 1-10, the accessory rail 108 is oriented perpendicular relative to the front support 102 and/or relative to the rear support 104. In other examples, the accessory rail 108 can instead be oriented at a non-perpendicular angle relative to the front support 102 and/or relative to the rear support 104. The accessory rail 108 of the accessory support frame 100 of FIGS. 1-10 includes an example outer surface 138, an example inner surface 208 located opposite the outer surface 138, an example upper surface 140 extending between the outer surface 138 and the inner surface 208, and an example lower surface 306 located opposite the upper surface 140 and extending between the outer surface 138 and the inner surface 208.

The accessory rail 108 of FIGS. 1-10 further includes an example accessory mounting segment 142 located between the first end 134 and the second end 136 of the accessory rail 108. The accessory mounting segment 142 of the accessory rail 108 of FIGS. 1-10 is configured to be engaged by and to support various ones of a plurality of snap fit accessories, respective ones of which are configured to be removably coupled to the accessory mounting segment 142 of the accessory rail 108, as further described herein. In the illustrated examples of FIGS. 1-10, the accessory mounting segment 142 of the accessory rail 108 is oriented parallel relative to the side support 106. In other examples, the accessory mounting segment 142 of the accessory rail 108 can instead be oriented at an angle (e.g., non-parallel) relative to the side support 106. In the illustrated example of FIGS. 1-10, the accessory mounting segment 142 of the accessory rail 108 is oriented perpendicular relative to the front support 102 and/or relative to the rear support 104. In other examples, the accessory mounting segment 142 of the accessory rail 108 can instead be oriented at a non-perpendicular angle relative to the front support 102 and/or relative to the rear support 104.

As shown in FIGS. 8-10 the accessory mounting segment 142 of the accessory rail 108 has a cross-sectional profile that includes an example contoured outer surface 802, an example recessed inner surface 804, and one or more example engagement surface(s) 806 located between the contoured outer surface 802 and the recessed inner surface 804. The contoured outer surface 802 and/or the engagement surface(s) 806 of the accessory mounting segment 142 of the accessory rail 108 is/are configured to be engaged by one or more portion(s) of a connector of a snap fit accessory to removably couple the snap fit accessory to the accessory rail 108 (e.g., via a snap fit), as further described below.

The inset region 110 of the accessory support frame 100 of FIGS. 10-10 includes an example outer boundary 144 formed and/or defined by the inner surface 202 of the front support 102, the inner surface 118 of the rear support 104, the inner surface 128 of the side support 106, and the inner surface 208 of the accessory rail 108. In this regard, the inner surface 202 of the front support 102, the inner surface 118 of the rear support 104, the inner surface 128 of the side support 106, and the inner surface 208 of the accessory rail 108 border and/or circumscribe the inset region 110 of the accessory support frame 100. In the illustrated example of FIGS. 1-10, the outer boundary 144 of the inset region 110 has a generally rectangular profile. In other examples, the outer boundary 144 of the inset region 110 can instead have profile that is non-rectangular (e.g., circular, oval, triangular, trapezoidal, hexagonal, etc.).

The inset region 110 of the accessory support frame 100 of FIGS. 1-10 further includes an example upper boundary 402 formed and/or defined by the upper surface 114 of the front support 102, the upper surface 120 of the rear support 104, the upper surface 130 of the side support 106, and the upper surface 140 of the accessory rail 108. In the illustrated example of FIGS. 1-10, the upper surface 114 of the front support 102, the upper surface 120 of the rear support 104, the upper surface 130 of the side support 106, and the upper surface 140 of the accessory rail 108 commonly lie along an example first horizontal plane 404 such that the upper boundary 402 of the inset region 110 is planar (e.g., flat). In other examples, the upper surface 114 of the front support 102, the upper surface 120 of the rear support 104, the upper surface 130 of the side support 106, and/or the upper surface 140 of the accessory rail 108 can lie along different (e.g., non-common) horizontal planes such that the upper boundary 402 of the inset region 110 is non-planar (e.g., not flat).

The inset region 110 of the accessory support frame 100 of FIGS. 1-10 further includes an example lower boundary 406 formed and/or defined by the lower surface 302 of the front support 102, the lower surface 304 of the rear support 104, and the lower surface 306 of the accessory rail 108. In the illustrated example of FIGS. 1-10, the lower surface 302 of the front support 102, the lower surface 304 of the rear support 104, and the lower surface 306 of the accessory rail 108 commonly lie along an example second horizontal plane 408 such that the lower boundary 406 of the inset region 110 is planar (e.g., flat). In other examples, the lower surface 302 of the front support 102, the lower surface 304 of the rear support 104, and/or the lower surface 306 of the accessory rail 108 can lie along different (e.g., non-common) horizontal planes such that the lower boundary 406 of the inset region 110 is non-planar (e.g., not flat).

The inset region 110 of the accessory support frame 100 of FIGS. 1-10 further includes an example first support rail 146 located within the inset region 110 between the front support 102 and the rear support 104 of the accessory support frame 100, and between the side support 106 and the accessory rail 108 of the accessory support frame 100. In the illustrated examples of FIGS. 1-10, the first support rail 146 of the inset region 110 is located proximate to and/or extends along the accessory rail 108 of the accessory support frame 100, with the accessory mounting segment 142 of the accessory rail 108 being spaced apart from the first support rail 146 of the inset region 110. The first support rail 146 of the inset region 110 of FIGS. 1-10 is configured to support a first portion (e.g., a right edge portion) of an insertable accessory when the insertable accessory is inserted into and/or otherwise located within the inset region 110, as further described herein. In the illustrated example of FIGS. 1-10, the first support rail 146 of the inset region 110 includes an example upwardly-facing notch 808 configured to receive a portion of a downwardly-facing rim of the insertable accessory when the insertable accessory is inserted into and/or otherwise located within the inset region 110.

In the illustrated example of FIGS. 1-10, the first support rail 146 of the inset region 110 is coupled to the front support 102 and the rear support 104 of the accessory support frame 100. More specifically, an example first end 210 of the first support rail 146 is coupled to the front support 102, and an example second end 212 of the first support rail 146 located opposite the first end 210 of the first support rail 146 is coupled to the rear support 104. In other examples, the first support rail 146 of the inset region 110 can instead be coupled to (e.g., integrally formed with) and/or carried by the accessory rail 108. In the illustrated examples of FIGS. 1-10, the first support rail 146 of the inset region 110 is oriented parallel relative to the accessory mounting segment 142 of the accessory rail 108 and/or relative to the side support 106. In other examples, the first support rail 146 of the inset region 110 can instead be oriented at an angle (e.g., non-parallel) relative to the accessory mounting segment 142 of the accessory rail 108 and/or relative to the side support 106. In the illustrated example of FIGS. 1-10, the first support rail 146 of the inset region 110 is oriented perpendicular relative to the front support 102 and/or the rear support 104. In other examples, the first support rail 146 of the inset region 110 can instead be oriented at a non-perpendicular angle relative to the front support 102 and/or relative to the rear support 104.

The inset region 110 of the accessory support frame 100 of FIGS. 1-10 further includes an example second support rail 148 located within the inset region 110 between the front support 102 and the rear support 104 of the accessory support frame 100, and between the side support 106 and the accessory rail 108 of the accessory support frame 100. In the illustrated examples of FIGS. 1-10, the second support rail 148 of the inset region 110 is spaced apart from the first support rail 146 of the inset region 110, with the second support rail 148 of the inset region 110 being located proximate to and/or extending along the side support 106 of the accessory support frame 100. The second support rail 148 of the inset region 110 of FIGS. 1-10 is configured to support a second portion (e.g., a left edge portion) of an insertable accessory when the insertable accessory is inserted into and/or otherwise located within the inset region 110, as further described herein. In the illustrated example of FIGS. 1-10, the second support rail 148 of the inset region 110 includes an example upwardly-facing notch 810 configured to receive a portion of a downwardly-facing rim of the insertable accessory when the insertable accessory is inserted into and/or otherwise located within the inset region 110.

In the illustrated example of FIGS. 1-10, the second support rail 148 of the inset region 110 is coupled to (e.g., integrally formed with) and/or carried by the side support 106 of the accessory support frame 100. More specifically, the inner surface 128 of the side support 106 forms a portion of the second support rail 148. In other examples, the second support rail 148 of the inset region 110 can additionally or alternatively be coupled to the front support 102 and/or the rear support 104 of the accessory support frame 100. For example, an example first end 214 of the second support rail 148 can be coupled to the front support 102, and an example second end 216 of the second support rail 148 located opposite the first end 214 of the second support rail 148 can be coupled to the rear support 104. In such other examples, the second support rail 148 of the inset region 110 can be spaced apart from the side support 106. In the illustrated examples of FIGS. 1-10, the second support rail 148 of the inset region 110 is oriented parallel relative to the first support rail 146 of the inset region 110, relative to the side support 106, and/or relative to the accessory mounting segment 142 of the accessory rail 108. In other examples, the second support rail 148 of the inset region 110 can instead be oriented at an angle (e.g., non-parallel) relative to the first support rail 146 of the inset region 110, relative to the side support 106, and/or relative to the accessory mounting segment 142 of the accessory rail 108. In the illustrated example of FIGS. 1-10, the second support rail 148 of the inset region 110 is oriented perpendicular relative to the front support 102 and/or the rear support 104. In other examples, the second support rail 148 of the inset region 110 can instead be oriented at a non-perpendicular angle relative to the front support 102 and/or relative to the rear support 104.

In the illustrated example of FIGS. 1-10, the second support rail 148 of the inset region 110 is spaced apart from the first support rail 146 of the inset region 110 by an example width 218. In some examples, an insertable accessory disclosed herein is configured to occupy the width 218 (e.g., to fully occupy the entire width 218) when the insertable accessory is inserted into the inset region 110 of the accessory support frame 100. In the illustrated example of FIGS. 1-10, the rear support 104 of the accessory support frame 100 is spaced apart from the front support 102 of the accessory support frame 100 by an example depth 220. In some examples, an insertable accessory disclosed herein is configured to substantially occupy the depth 220 (e.g., to substantially occupy the entire depth 220) when the insertable accessory is inserted into the inset region 110 of the accessory support frame 100. In other examples, an insertable accessory disclosed herein is configured to occupy approximately one half of the depth 220 (e.g., to occupy approximately fifty percent of the entire depth 220) when the insertable accessory is inserted into the inset region 110 of the accessory support frame 100.

The accessory support frame 100 of FIGS. 1-10 further includes one or more mounting leg(s) configured to be received within and/or coupled to one or more support member(s) of a grill. In the illustrated example of FIGS. 1-10, the accessory support frame 100 includes two mounting legs (e.g., an example first mounting leg 150, and an example second mounting leg 152). In other examples, the accessory support frame 100 of FIGS. 1-10 can instead include a different number (e.g., 1, 3, 4, etc.) of mounting legs. In the illustrated example of FIGS. 1-10, the first mounting leg 150 and the second mounting leg 152 are each located proximate the side support 106 of the accessory support frame 100, with the first mounting leg 150 being further located proximate the front support 102 of the accessory support frame 100, and with the second mounting leg 152 being further located proximate the rear support 104 of the accessory support frame 100. The first mounting leg

150 and the second mounting leg 152 each extend below the inset region 110 of the accessory support frame 100 (e.g., below the lower boundary 406 of the inset region 110). In the illustrated example of FIGS. 1-10, the first mounting leg 150 is coupled to the front support 102 of the accessory support frame 100, and the second mounting leg 152 is coupled to the rear support 104 of the accessory support frame 100. In other examples, the first mounting leg 150 and/or the second mounting leg 152 can instead be coupled to the side support 106 of the accessory support frame 100.

The accessory support frame 100 of FIGS. 1-10 further includes one or more example mounting tab(s) configured to be coupled to one or more support member(s) of a grill. In the illustrated example of FIGS. 1-10, the accessory support frame 100 includes two mounting tabs (e.g., an example first mounting tab 154, and an example second mounting tab 156). In other examples, the accessory support frame 100 of FIGS. 1-10 can instead include a different number (e.g., 1, 3, 4, etc.) of mounting tabs. In the illustrated example of FIGS. 1-10, the first mounting tab 154 and the second mounting tab 156 are each located proximate the side support 106 of the accessory support frame 100, with the first mounting tab 154 being further located proximate the front support 102 of the accessory support frame 100, and with the second mounting tab 156 being further located proximate the rear support 104 of the accessory support frame 100. The first mounting tab 154 and the second mounting tab 156 each extend above the inset region 110 of the accessory support frame 100 (e.g., above the upper boundary 402 of the inset region 110). In the illustrated example of FIGS. 1-10, the first mounting tab 154 is coupled to the side support 106 of the accessory support frame 100, and the second mounting tab 156 is coupled to the rear support 104 of the accessory support frame 100. In other examples, the first mounting tab 154 can instead be coupled to the front support 102 of the accessory support frame 100, and/or the second mounting tab 156 can instead be coupled to the side support 106 of the accessory support frame 100.

As discussed above, the accessory support frame 100 of FIGS. 1-10 is configured to be coupled (e.g., via the first mounting leg 150, the second mounting leg 152, the first mounting tab 154, and/or the second mounting tab 156) to a grill. When the accessory support frame 100 of FIGS. 1-10 is coupled to a grill, the side support 106 of the accessory support frame 100 is oriented toward and/or located proximal relative to a cookbox and/or one or more support member(s) of the grill, and the accessory rail 108 of the accessory support frame 100 is oriented away from and/or located distal relative to the cookbox and/or the one or more support member(s) of the grill. Examples of the accessory support frame 100 of FIGS. 1-10 coupled to and/or otherwise implemented in combination with various grills are shown in FIGS. 55-65, as further described herein.

Figure 11:
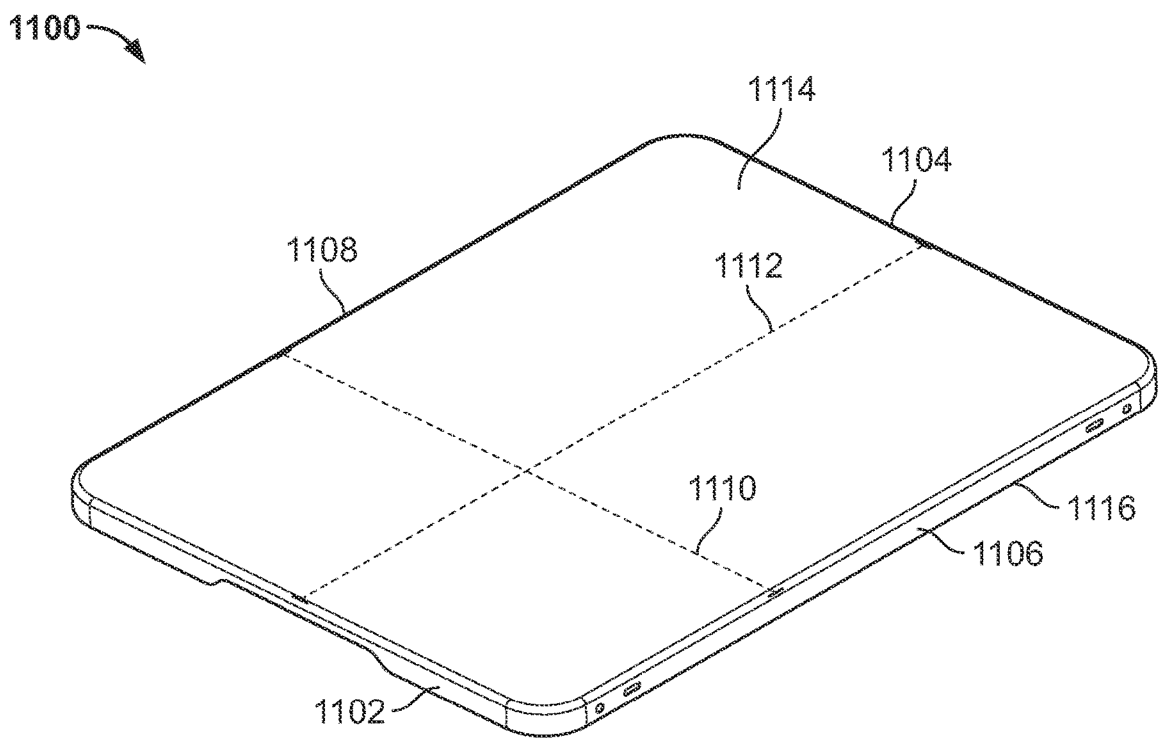
FIG. 11 is a first perspective view of an example tabletop constructed in accordance with the teachings of this disclosure.
Figure 12:
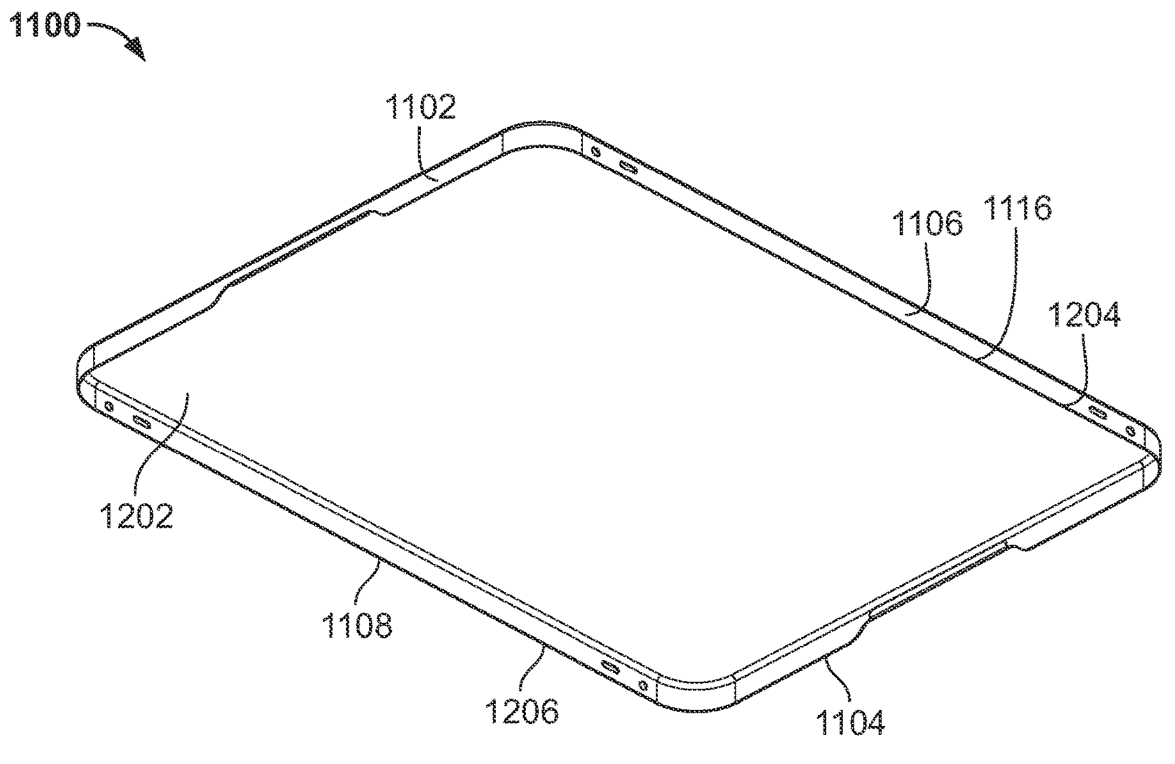
FIG. 12 is a second perspective view of the tabletop of FIG. 11.

FIG. 11 is a first perspective view of an example tabletop 1100 constructed in accordance with the teachings of this disclosure. FIG. 12 is a second perspective view of the tabletop 1100 of FIG. 11. In the illustrated example of FIGS. 11 and 12, the tabletop 1100 includes an example front edge 1102, an example rear edge 1104 located opposite the front edge 1102, an example right edge 1106 extending between the front edge 1102 and the rear edge 1104, and an example left edge 1108 located opposite the right edge 1106 and extending between the front edge 1102 and the rear edge 1104. The tabletop 1100 has an example width 1110 extending between and defined by the right edge 1106 and the left edge 1108 of the tabletop 1100, and an example depth 1112 extending between and defined by the front edge 1102 and the rear edge 1104 of the tabletop 1100. In the illustrated example of FIGS. 11 and 12, the tabletop 1100 has a generally rectangular profile defined by the front edge 1102, the rear edge 1104, the right edge 1106, and the left edge 1108 of the tabletop 1100. In other examples, the tabletop 1100 can instead have a profile that is non-rectangular (e.g., circular, oval, triangular, trapezoidal, hexagonal, etc.). The tabletop 1100 of FIGS. 11 and 12 further includes an example upper surface 1114 extending between the front edge 1102, the rear edge 1104, the right edge 1106, and the left edge 1108 of the tabletop 1100, as well as an example lower surface 1202 located opposite the upper surface 1114 and extending between the front edge 1102, the rear edge 1104, the right edge 1106, and the left edge 1108 of the tabletop 1100. The tabletop 1100 is configured such that the upper surface 1114 constitutes a surface for supporting one or more item(s) (e.g., food, tools, utensils, vessels, devices, etc.) placed in contact with the upper surface 1114.

In the illustrated example of FIGS. 11 and 12, the front edge 1102, the rear edge 1104, the right edge 1106, and the left edge 1108 of the tabletop 1100 form an example downwardly-facing rim 1116. An example first portion 1204 of the downwardly-facing rim 1116 located adjacent to and/or extending along the right edge 1106 of the tabletop 1100 of FIGS. 11 and 12 is configured to contact, engage, and/otherwise be supported by the first support rail 146 of the inset region 110 of the accessory support frame 100 of FIGS. 1-10 when the tabletop 1100 is inserted into and/or otherwise located within the inset region 110 of the accessory support frame 100. Similarly, an example first portion 1206 of the downwardly-facing rim 1116 located adjacent to and/or extending along the left edge 1108 of the tabletop 1100 of FIGS. 11 and 12 is configured to contact, engage, and/otherwise be supported by the second support rail 148 of the inset region 110 of the accessory support frame 100 of FIGS. 1-10 when the tabletop 1100 is inserted into and/or otherwise located within the inset region 110 of the accessory support frame 100. The tabletop 1100 of FIGS. 11 and 12 is further configured such that, when the tabletop 1100 is inserted into and/or otherwise located within the inset region 110 of the accessory support frame 100, the width 1110 of the tabletop 1100 occupies the width 218 (e.g., fully occupies the entire width 218) that extends between the first support rail 146 and the second support rail 148 of the inset region 110 of the accessory support frame 100, and the depth 1112 of the tabletop 1100 substantially occupies the depth 220 (e.g., substantially occupies the entire depth 220) that extends between the front support 102 and the rear support 104 of the accessory support frame 100.

Figure 13:
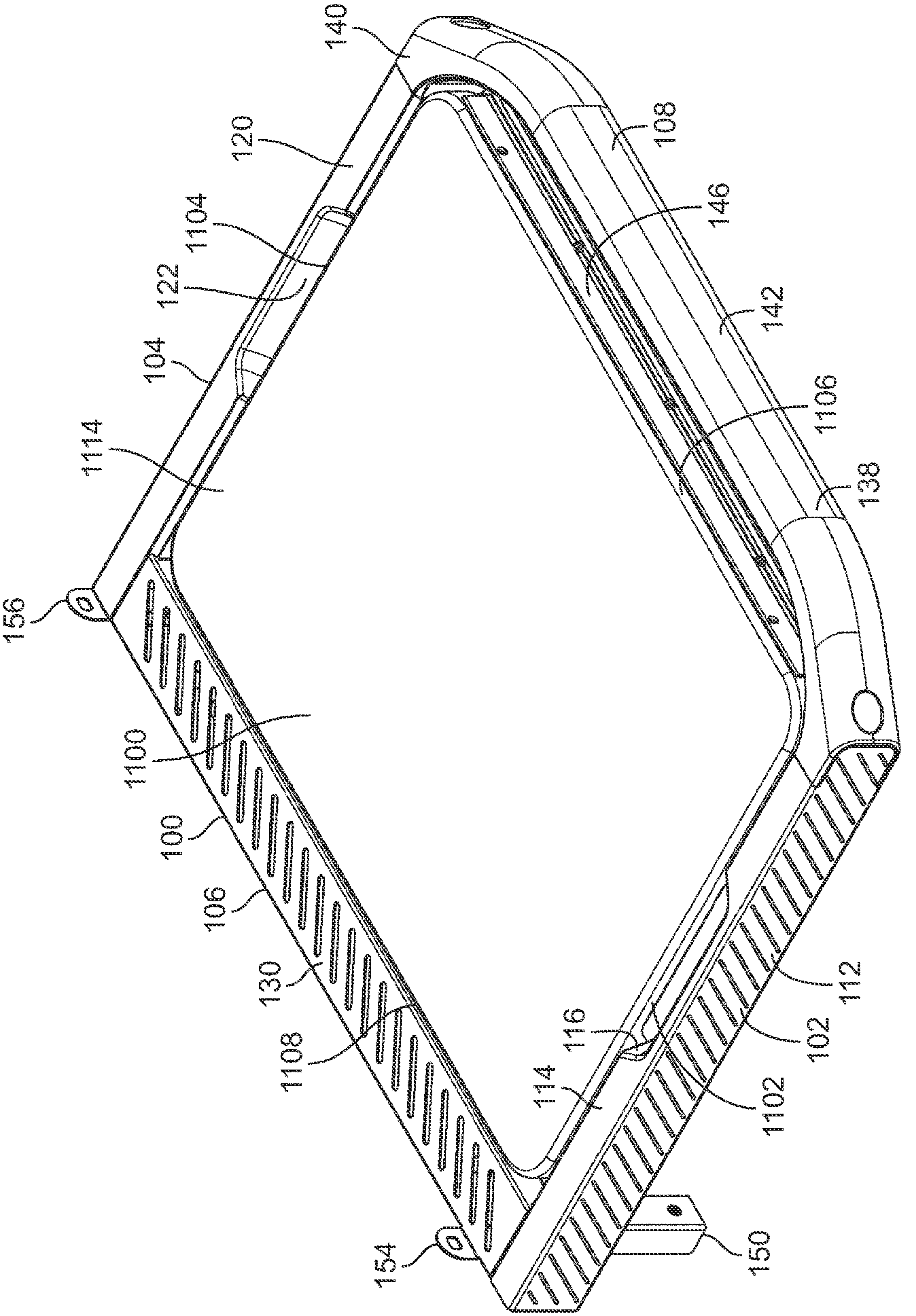
FIG. 13 is a perspective view of the accessory support frame of FIGS. 1-10, with the tabletop of FIGS. 11 and 12 shown inserted into the inset region of the accessory support frame.
Figure 14:
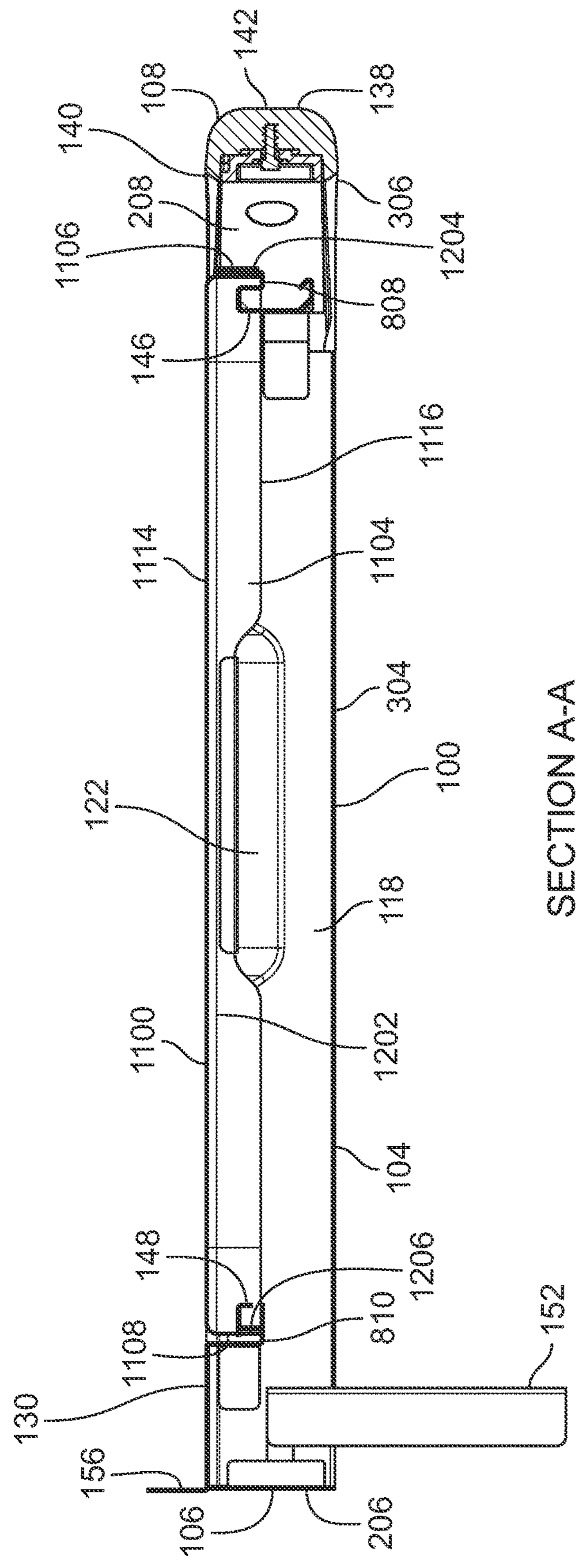
FIG. 14 is a cross-sectional view of the accessory support frame of FIGS. 1-10 and 13 taken along section A-A of FIG. 2, with the tabletop of FIGS. 11-13 shown inserted into the inset region of the accessory support frame.

FIG. 13 is a perspective view of the accessory support frame 100 of FIGS. 1-10, with the tabletop 1100 of FIGS. 11 and 12 shown inserted into the inset region 110 of the accessory support frame 100. FIG. 14 is a cross-sectional view of the accessory support frame 100 of FIGS. 1-10 and 13 taken along section A-A of FIG. 2, with the tabletop 1100 of FIGS. 11-13 shown inserted into the inset region 110 of the accessory support frame 100. In the illustrated example of FIGS. 13 and 14, the first portion 1204 of the downwardly-facing rim 1116 of the tabletop 1100 is seated on the first support rail 146 of the inset region 110 of the accessory support frame 100 such that the first support rail 146 contacts, engages, and/otherwise supports the first portion 1204 of the downwardly-facing rim 1116 of the tabletop 1100. For example, as shown in FIGS. 14, the first portion 1204 of the downwardly-facing rim 1116 of the tabletop 1100 is received within the upwardly-facing notch 808 of the first support rail 146 of the inset region 110 of the accessory support frame 100. Similarly, the second portion 1206 of the downwardly-facing rim 1116 of the tabletop 1100 is seated on the second support rail 148 of the inset region 110 of the accessory support frame 100 such that the second support rail 148 contacts, engages, and/otherwise supports the second portion 1206 of the downwardly-facing rim 1116 of the tabletop 1100. For example, as shown in FIGS. 14, the second portion 1206 of the downwardly-facing rim 1116 of the tabletop 1100 is received within the upwardly-facing notch 810 of the second support rail 148 of the inset region 110 of the accessory support frame 100. The first support rail 146 and the second support rail 148 of the inset region 110 respectively provide lateral boundaries and/or mechanical stops that restrict and/or prevent lateral movement and/or sliding of the tabletop 1100 relative to the inset region 110 and/or, more generally, relative to the accessory support frame 100.

As shown in FIGS. 13 and 14, the front edge 1102 of the tabletop 1100 faces toward and/or is adjacent to front support 102 of the accessory support frame 100, the rear edge 1104 of the tabletop 1100 faces toward and/or is adjacent to the rear support 104 of the accessory support frame 100, the right edge 1106 of the tabletop 1100 faces toward and/or is adjacent to the accessory rail 108 of the accessory support frame 100, and the left edge 1108 of the tabletop 1100 faces toward and/or is adjacent to the side support 106 of the accessory support frame 100 when the tabletop 1100 is inserted into and/or otherwise located within the inset region 110 of the accessory support frame 100. When the tabletop 1100 is inserted into and/or otherwise located within the inset region 110 of the accessory support frame 100 as shown in FIGS. 13 and 14, the width 1110 of the tabletop 1100 occupies the width 218 (e.g., fully occupies the entire width 218) that extends between the first support rail 146 and the second support rail 148 of the inset region 110 of the accessory support frame 100, and the depth 1112 of the tabletop 1100 substantially occupies the depth 220 (e.g., substantially occupies the entire depth 220) that extends between the front support 102 and the rear support 104 of the accessory support frame 100. Removal (e.g., manual removal) of the tabletop 1100 from the inset region 110 of the accessory support frame 100 can be accomplished via the recess 116 of the front support 102 of the accessory support frame 100 and/or via the recess 122 of the rear support 104 of the accessory support frame.

The tabletop 1100 of FIGS. 11-14 constitutes a first insertable accessory from among the plurality of insertable accessories described above, respective ones of which are configured to be interchangeably inserted into and/or received within the inset region 110 of the accessory support frame 100. Other insertable accessories from among the plurality of insertable accessories that are interchangeably insertable into and/or receivable within the inset region 110 of the accessory support frame 100 are further described herein.

Figure 15:
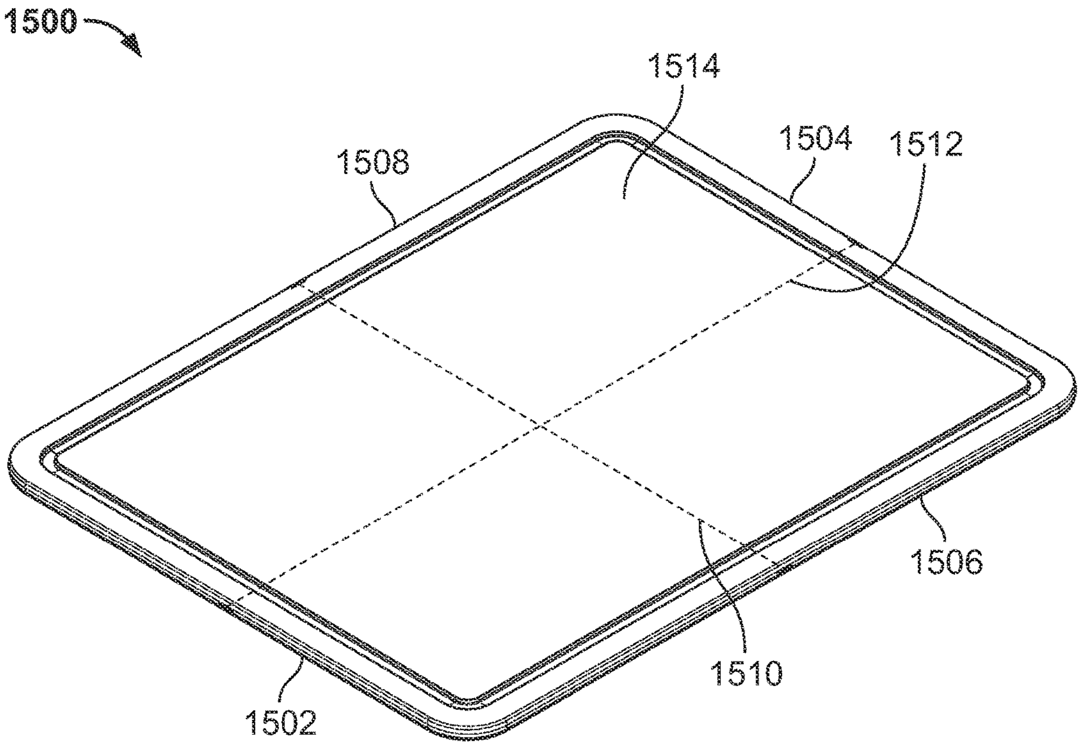
FIG. 15 is a first perspective view of an example cutting board constructed in accordance with the teachings of this disclosure.
Figure 16:
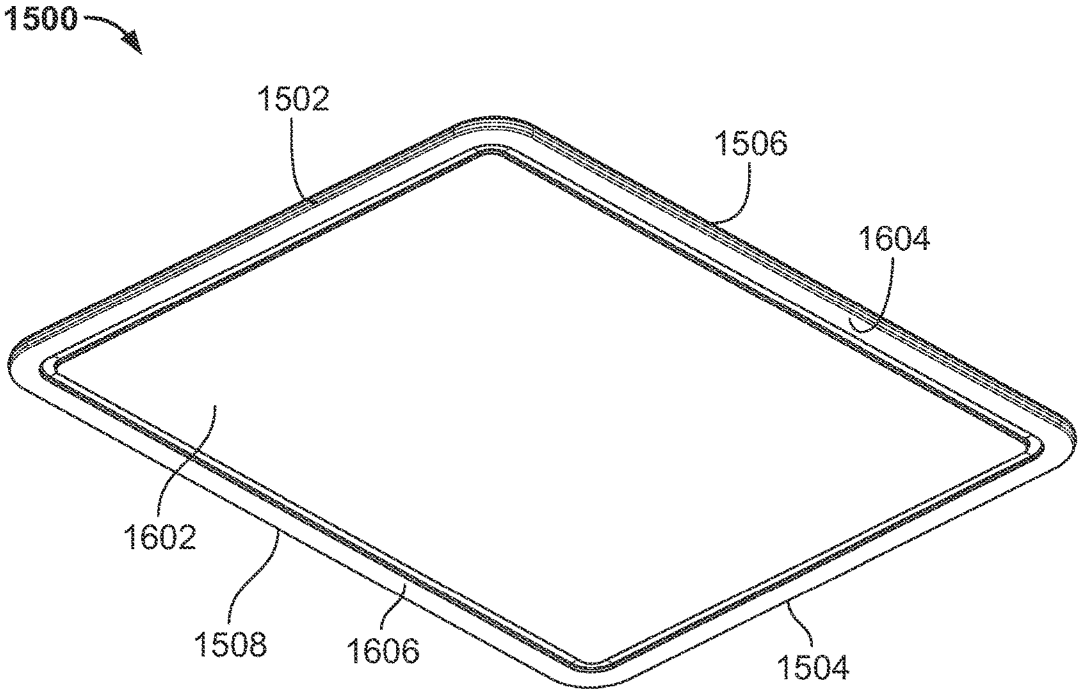
FIG. 16 is a second perspective view of the cutting board of FIG. 15.

FIG. 15 is a first perspective view of an example cutting board 1500 constructed in accordance with the teachings of this disclosure. FIG. 16 is a second perspective view of the cutting board 1500 of FIG. 15. In the illustrated example of FIGS. 15 and 16, the cutting board 1500 includes an example front edge 1502, an example rear edge 1504 located opposite the front edge 1502, an example right edge 1506 extending between the front edge 1502 and the rear edge 1504, and an example left edge 1508 located opposite the right edge 1506 and extending between the front edge 1502 and the rear edge 1504. The cutting board 1500 has an example width 1510 extending between and defined by the right edge 1506 and the left edge 1508 of the cutting board 1500, and an example depth 1512 extending between and defined by the front edge 1502 and the rear edge 1504 of the cutting board 1500. In the illustrated example of FIGS. 15 and 16, the cutting board 1500 has a generally rectangular profile defined by the front edge 1502, the rear edge 1504, the right edge 1506, and the left edge 1508 of the cutting board 1500. In other examples, the cutting board 1500 can instead have a profile that is non-rectangular (e.g., circular, oval, triangular, trapezoidal, hexagonal, etc.).

The cutting board 1500 of FIGS. 15 and 16 further includes an example upper surface 1514 extending between the front edge 1502, the rear edge 1504, the right edge 1506, and the left edge 1508 of the cutting board 1500, as well as an example lower surface 1602 located opposite the upper surface 1514 and extending between the front edge 1502, the rear edge 1504, the right edge 1506, and the left edge 1508 of the cutting board 1500. The cutting board 1500 is configured such that the upper surface 1514 constitutes a surface for cutting one or more item(s) of food (e.g., meat, vegetables, etc.) placed in contact with the upper surface 1514. In the illustrated example of FIGS. 15 and 16, the cutting board 1500 is configured to be reversible, such that the lower surface 1602 can be reoriented as the upper surface 1514, and vice-versa, with the reoriented lower surface 1602 then constituting a surface for cutting one or more item(s) of food (e.g., meat, vegetables, etc.) placed in contact with the reoriented lower surface 1602.

In the illustrated example of FIGS. 15 and 16, an example first portion 1604 of the lower surface 1602 of the cutting board 1500 located adjacent to and/or extending along the right edge 1506 of the cutting board 1500 of FIGS. 15 and 16 is configured to contact, engage, and/otherwise be supported by the first support rail 146 of the inset region 110 of the accessory support frame 100 of FIGS. 1-10 when the cutting board 1500 is inserted into and/or otherwise located within the inset region 110 of the accessory support frame 100. Similarly, an example second portion 1606 of the lower surface 1602 of the cutting board 1500 located adjacent to and/or extending along the left edge 1508 of the cutting board 1500 of FIGS. 15 and 16 is configured to contact, engage, and/otherwise be supported by the second support rail 148 of the inset region 110 of the accessory support frame 100 of FIGS. 1-10 when the cutting board 1500 is inserted into and/or otherwise located within the inset region 110 of the accessory support frame 100. The cutting board 1500 of FIGS. 15 and 16 is further configured such that, when the cutting board 1500 is inserted into and/or otherwise located within the inset region 110 of the accessory support frame 100, the width 1510 of the cutting board 1500 occupies the width 218 (e.g., fully occupies the entire width 218) that extends between the first support rail 146 and the second support rail 148 of the inset region 110 of the accessory support frame 100, and the depth 1512 of the cutting board 1500 substantially occupies the depth 220 (e.g., substantially occupies the entire depth 220) that extends between the front support 102 and the rear support 104 of the accessory support frame 100.

Figure 17:
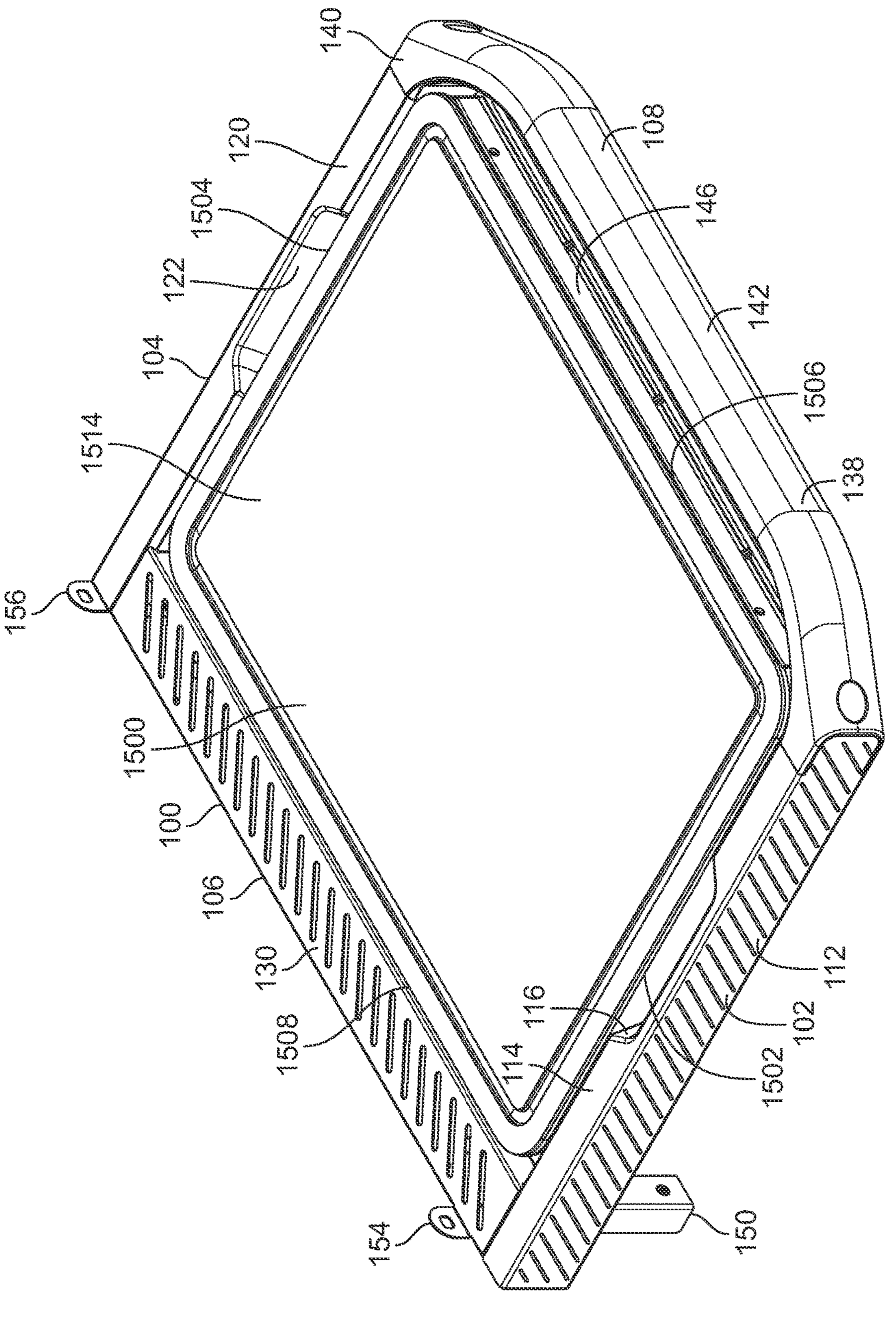
FIG. 17 is a perspective view of the accessory support frame of FIGS. 1-10, with the cutting board of FIGS. 15 and 16 shown inserted into the inset region of the accessory support frame.
Figure 18:
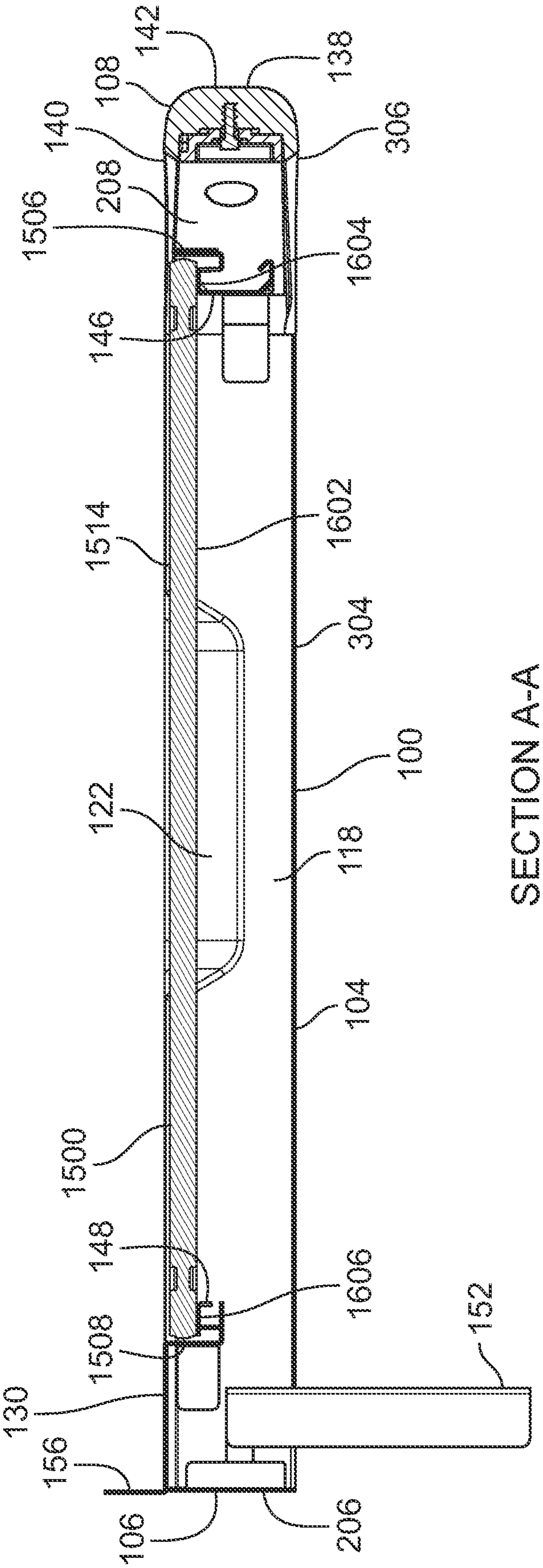
FIG. 18 is a cross-sectional view of the accessory support frame of FIGS. 1-10 and 17 taken along section A-A of FIG. 2, with the cutting board of FIGS. 15-17 shown inserted into the inset region of the accessory support frame.

FIG. 17 is a perspective view of the accessory support frame 100 of FIGS. 1-10, with the cutting board 1500 of FIGS. 15 and 16 shown inserted into the inset region 110 of the accessory support frame 100. FIG. 18 is a cross-sectional view of the accessory support frame 100 of FIGS. 1-10 and 17 taken along section A-A of FIG. 2, with the cutting board 1500 of FIGS. 15-17 shown inserted into the inset region 110 of the accessory support frame 100. In the illustrated example of FIGS. 17 and 18, the first portion 1604 of the lower surface 1602 of the cutting board 1500 is seated on the first support rail 146 of the inset region 110 of the accessory support frame 100 such that the first support rail 146 contacts, engages, and/otherwise supports the first portion 1604 of the lower surface 1602 of the cutting board 1500. Similarly, the second portion 1606 of the lower surface 1602 of the cutting board 1500 is seated on the second support rail 148 of the inset region 110 of the accessory support frame 100 such that the second support rail 148 contacts, engages, and/otherwise supports the second portion 1606 of the lower surface 1602 of the cutting board 1500. The first support rail 146 and the second support rail 148 of the inset region 110 respectively provide lateral boundaries and/or mechanical stops that restrict and/or prevent lateral movement and/or sliding of the cutting board 1500 relative to the inset region 110 and/or, more generally, relative to the accessory support frame 100.

As shown in FIGS. 17 and 18, the front edge 1502 of the cutting board 1500 faces toward and/or is adjacent to front support 102 of the accessory support frame 100, the rear edge 1504 of the cutting board 1500 faces toward and/or is adjacent to the rear support 104 of the accessory support frame 100, the right edge 1506 of the cutting board 1500 faces toward and/or is adjacent to the accessory rail 108 of the accessory support frame 100, and the left edge 1508 of the cutting board 1500 faces toward and/or is adjacent to the side support 106 of the accessory support frame 100 when the cutting board 1500 is inserted into and/or otherwise located within the inset region 110 of the accessory support frame 100. When the cutting board 1500 is inserted into and/or otherwise located within the inset region 110 of the accessory support frame 100 as shown in FIGS. 17 and 18, the width 1510 of the cutting board 1500 occupies the width 218 (e.g., fully occupies the entire width 218) that extends between the first support rail 146 and the second support rail 148 of the inset region 110 of the accessory support frame 100, and the depth 1512 of the cutting board 1500 substantially occupies the depth 220 (e.g., substantially occupies the entire depth 220) that extends between the front support 102 and the rear support 104 of the accessory support frame 100. Removal (e.g., manual removal) of the cutting board 1500 from the inset region 110 of the accessory support frame 100 can be accomplished via the recess 116 of the front support 102 of the accessory support frame 100 and/or via the recess 122 of the rear support 104 of the accessory support frame.

The cutting board 1500 of FIGS. 15-18 constitutes a second insertable accessory from among the plurality of insertable accessories described above, respective ones of which are configured to be interchangeably inserted into and/or received within the inset region 110 of the accessory support frame 100. For example, the tabletop 1100 of FIGS. 11-14 and the cutting board 1500 of FIGS. 15-18 constitute insertable accessories that are interchangeably insertable into and/or receivable within the inset region 110 of the accessory support frame 100. Other insertable accessories from among the plurality of insertable accessories that are interchangeably insertable into and/or receivable within the inset region 110 of the accessory support frame 100 are further described herein.

Figure 19:
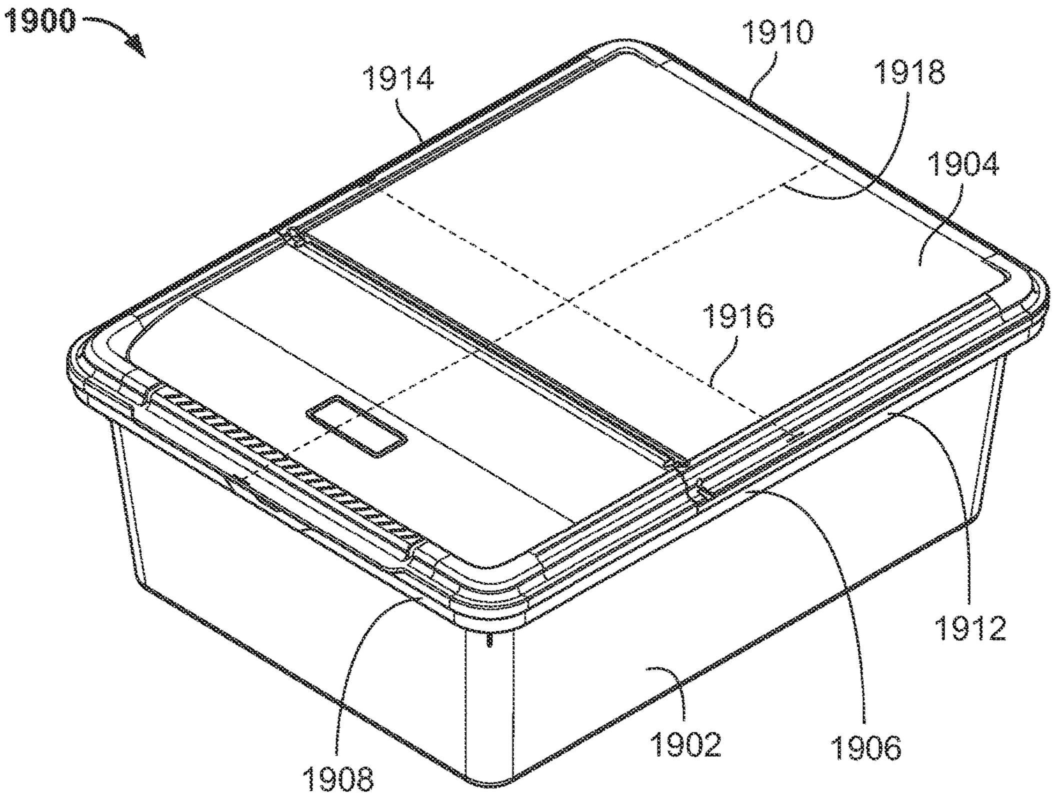
FIG. 19 is a first perspective view of an example storage bin constructed in accordance with the teachings of this disclosure.
Figure 20:
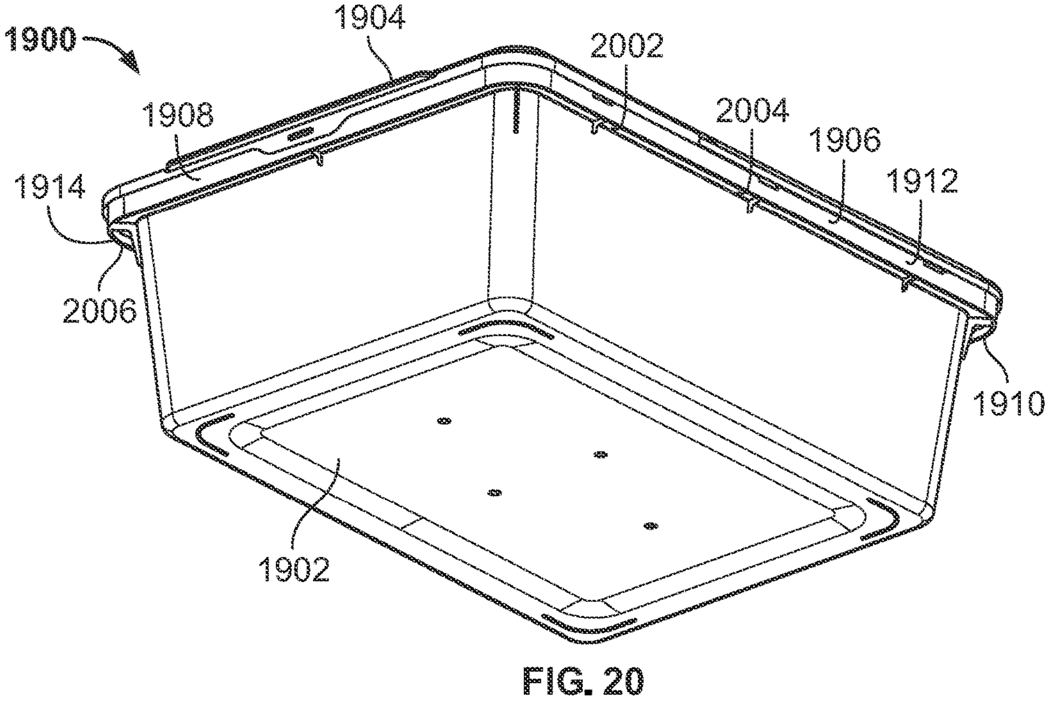
FIG. 20 is a second perspective view of the storage bin of FIG. 19.
Figure 21:
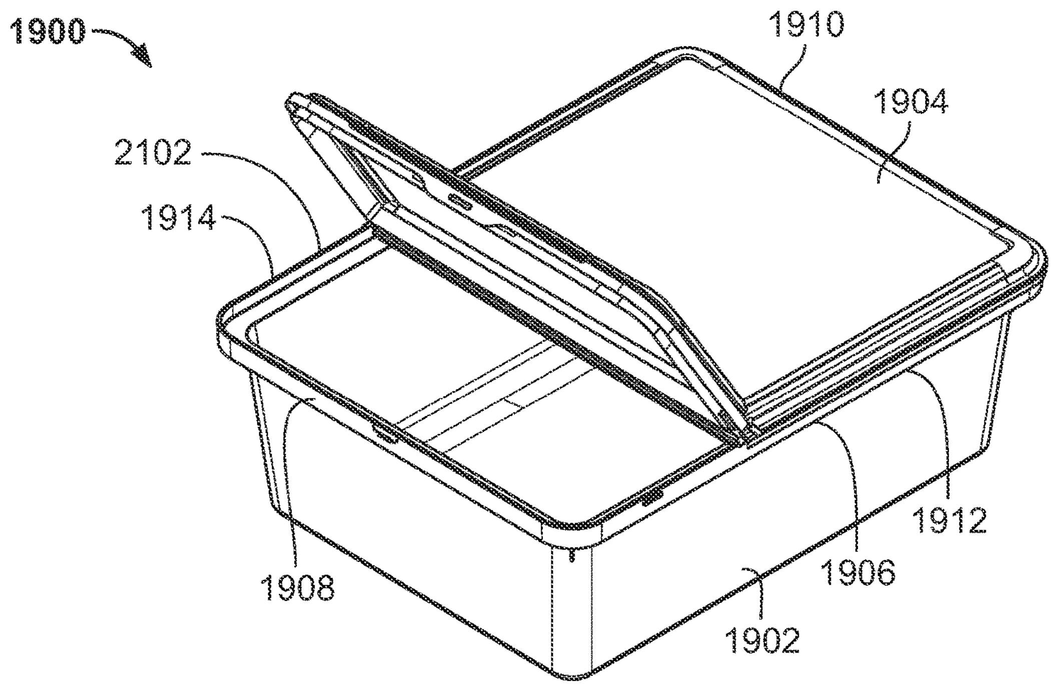
FIG. 21 is a third perspective view of the storage bin of FIGS. 19 and 20, with the lid of the storage bin shown in a partially open position.
Figure 22:
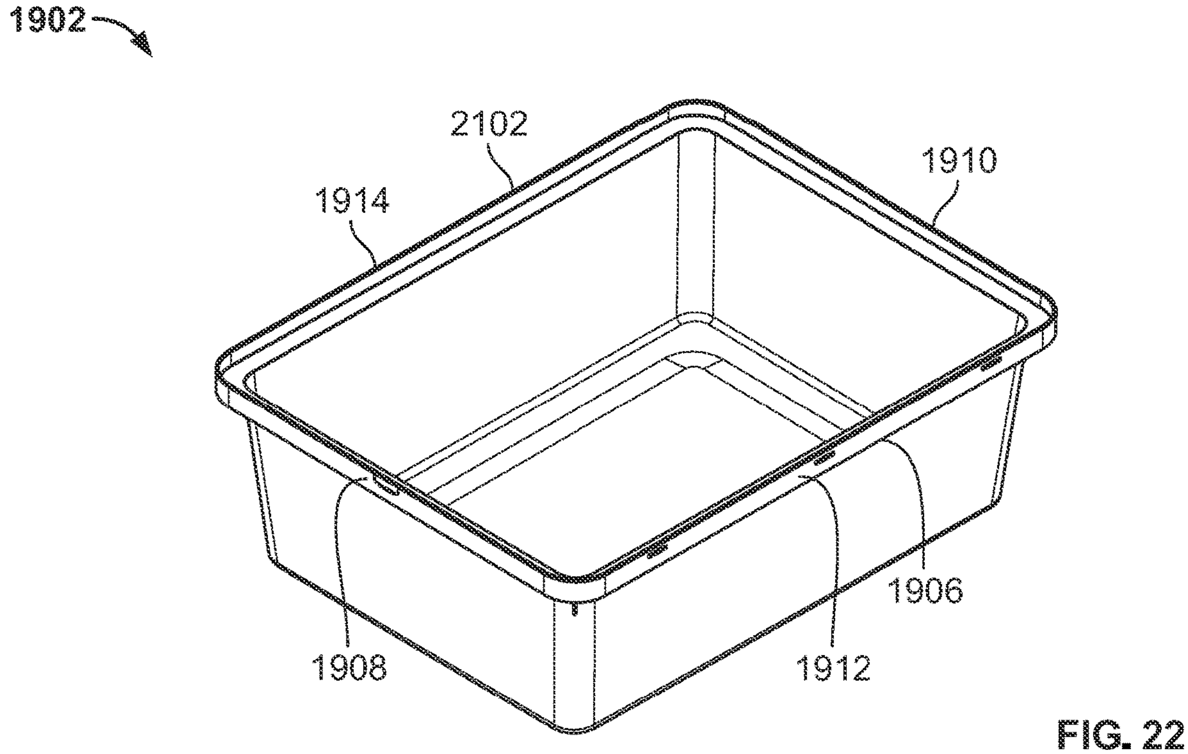
FIG. 22 is a fourth perspective view of the storage bin of FIGS. 19-21, with the lid of the storage bin removed.

FIG. 19 is a first perspective view of an example storage bin 1900 constructed in accordance with the teachings of this disclosure. FIG. 20 is a second perspective view of the storage bin 1900 of FIG. 19. As shown in FIGS. 19 and 20, the storage bin 1900 includes an example bin 1902 and an example lid 1904. The bin 1902 is configured to hold, carry, contain, and/or otherwise support one or more item(s) (e.g., containers, bottles, jars, cans, bags, packets, tools, utensils, vessels, etc.) that may be utilized in connection with preparing, cooking, and/or serving food. The lid 1904 is configured to selectively cover, close, and/or seal the bin 1902. In this regard, the lid 1904 can be partially and/or fully removed from the bin 1902 to facilitate access to the interior of the bin 1902. For example, FIG. 21 is a third perspective view of the storage bin 1900 of FIGS. 19 and 20, with the lid 1904 of the storage bin 1900 shown in a partially open position relative to the bin 1902. FIG. 22 is a fourth perspective view of the storage bin 1900 of FIGS. 19-21, with the lid 1904 of the storage bin 1900 removed.

The bin 1902 of FIGS. 19-22 includes an example rim 1906 on which the lid 1904 is seated when the lid 1904 is coupled to the bin 1902. In the illustrated example of FIGS. 19-22, the rim 1906 of the bin 1902 includes an example front edge 1908, an example rear edge 1910 located opposite the front edge 1908, an example right edge 1912 extending between the front edge 1908 and the rear edge 1910, and an example left edge 1914 located opposite the right edge 1912 and extending between the front edge 1908 and the rear edge 1910. The rim 1906 of the bin 1902 has an example width 1916 extending between and defined by the right edge 1912 and the left edge 1914 of the rim 1906 of the bin 1902, and an example depth 1918 extending between and defined by the front edge 1908 and the rear edge 1910 of the rim 1906 of the bin 1902. In the illustrated example of FIGS. 19-22, the rim 1906 of the bin 1902 has a generally rectangular profile defined by the front edge 1908, the rear edge 1910, the right edge 1912, and the left edge 1914 of the rim 1906 of the bin 1902. In other examples, the rim 1906 of the bin 1902 can instead have a profile that is non-rectangular (e.g., circular, oval, triangular, trapezoidal, hexagonal, etc.).

The rim 1906 of the bin 1902 of FIGS. 19-22 further includes an example upper surface 2102, and an example lower surface 2002 located opposite the upper surface 2102. In the illustrated example of FIGS. 19-22, an example first portion 2004 of the lower surface 2002 of the rim 1906 of the bin 1902 located adjacent to and/or extending along the right edge 1912 of the rim 1906 of the bin 1902 is configured to contact, engage, and/otherwise be supported by the first support rail 146 of the inset region 110 of the accessory support frame 100 of FIGS. 1-10 when the bin 1902 is inserted into and/or otherwise located within the inset region 110 of the accessory support frame 100. Similarly, an example second portion 2006 of the lower surface 2002 of the rim 1906 of the bin 1902 located adjacent to and/or extending along the left edge 1914 of the rim 1906 of the bin 1902 is configured to contact, engage, and/otherwise be supported by the second support rail 148 of the inset region 110 of the accessory support frame 100 of FIGS. 1-10 when the bin 1902 is inserted into and/or otherwise located within the inset region 110 of the accessory support frame 100. The bin 1902 of FIGS. 19-22 is further configured such that, when the bin 1902 is inserted into and/or otherwise located within the inset region 110 of the accessory support frame 100, the width 1916 of the rim 1906 of the bin 1902 occupies the width 218 (e.g., fully occupies the entire width 218) that extends between the first support rail 146 and the second support rail 148 of the inset region 110 of the accessory support frame 100, and the depth 1918 of the rim 1906 of the bin 1902 substantially occupies the depth 220 (e.g., substantially occupies the entire depth 220) that extends between the front support 102 and the rear support 104 of the accessory support frame 100.

Figure 23:
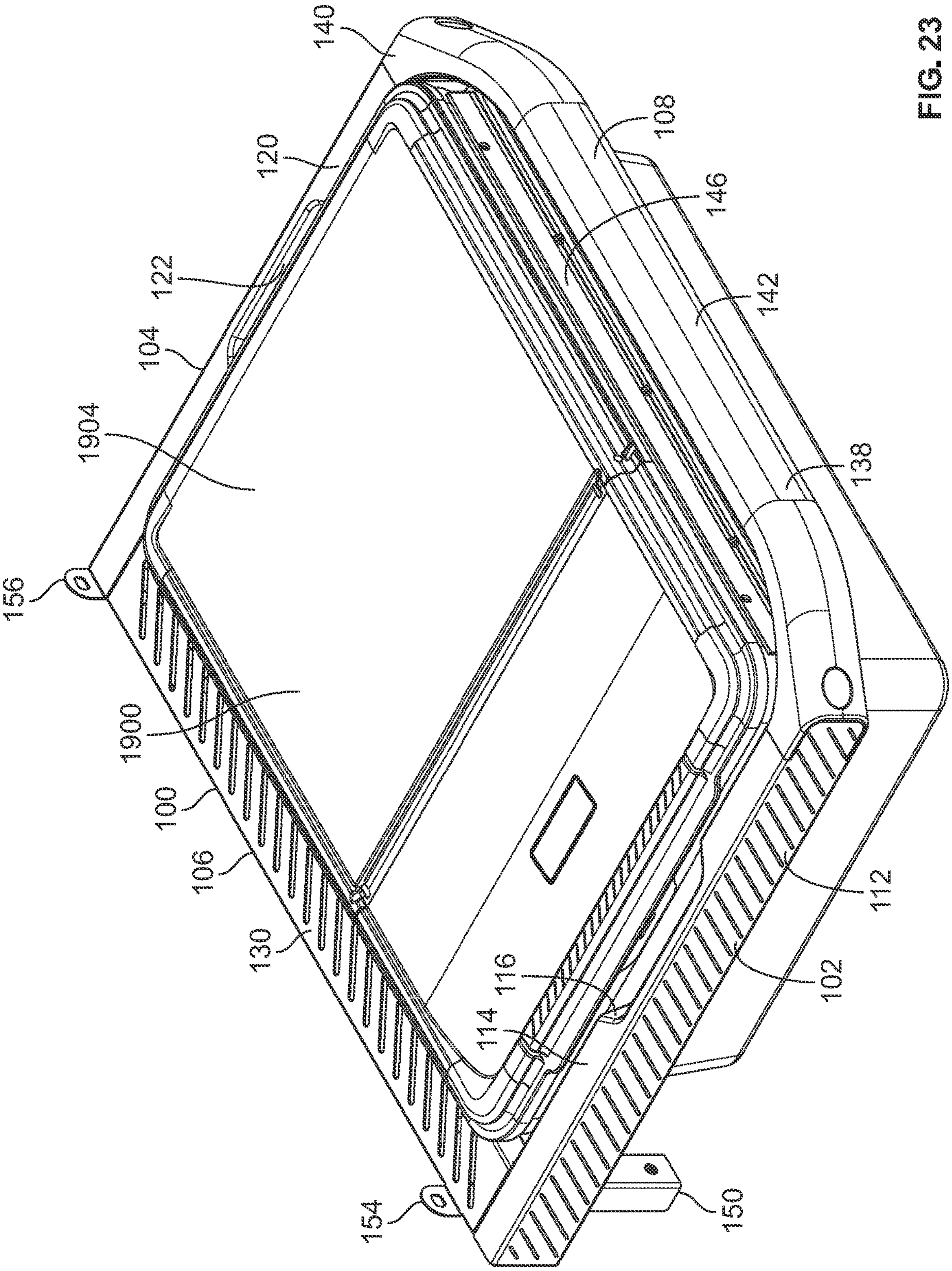
FIG. 23 is a perspective view of the accessory support frame of FIGS. 1-10, with the storage bin of FIGS. 19-22 shown inserted into the inset region of the accessory support frame.
Figure 24:
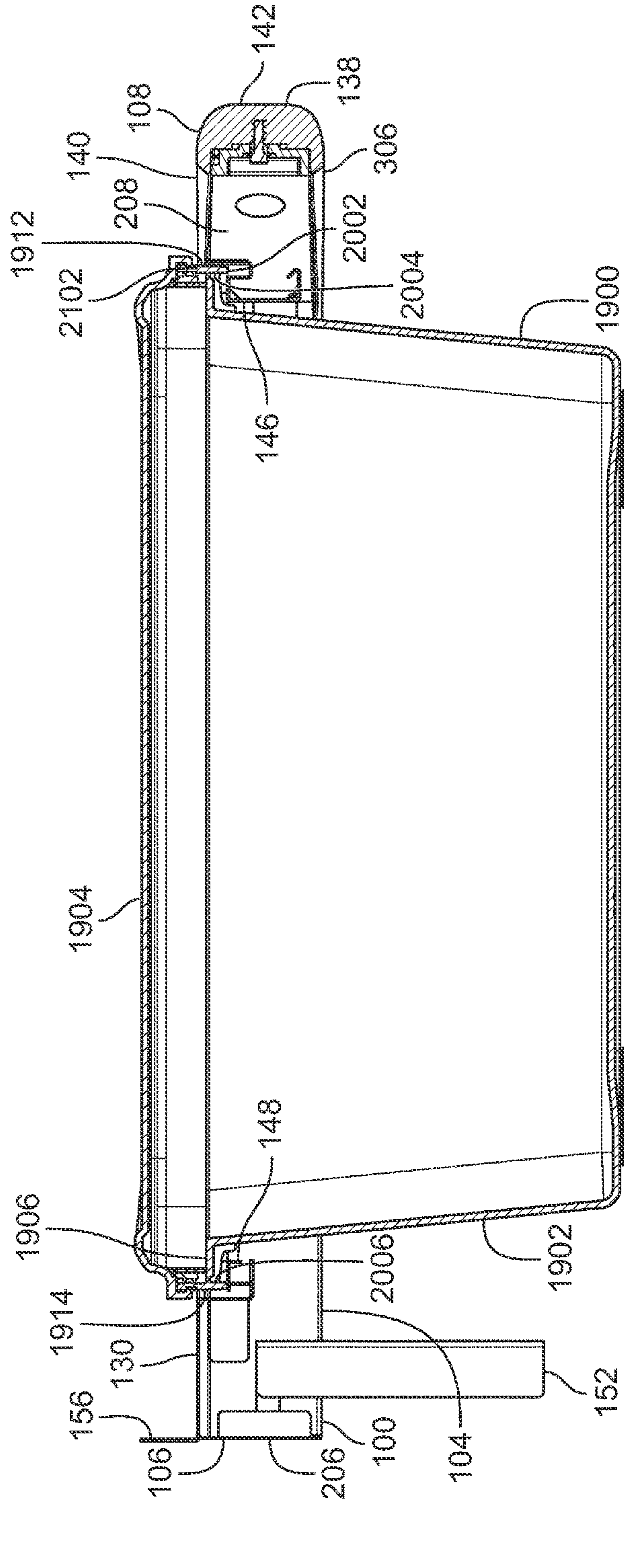
FIG. 24 is a cross-sectional view of the accessory support frame of FIGS. 1-10 and 23 taken along section A-A of FIG. 2, with the storage bin of FIGS. 19-23 shown inserted into the inset region of the accessory support frame.

FIG. 23 is a perspective view of the accessory support frame 100 of FIGS. 1-10, with the storage bin 1900 of FIGS. 19-22 shown inserted into the inset region 110 of the accessory support frame 100. FIG. 24 is a cross-sectional view of the accessory support frame 100 of FIGS. 1-10 and 23 taken along section A-A of FIG. 2, with the storage bin 1900 of FIGS. 19-23 shown inserted into the inset region 110 of the accessory support frame 100. In the illustrated example of FIGS. 23 and 24, the first portion 2004 of the lower surface 2002 of the rim 1906 of the bin 1902 is seated on the first support rail 146 of the inset region 110 of the accessory support frame 100 such that the first support rail 146 contacts, engages, and/otherwise supports the first portion 2004 of the lower surface 2002 of the rim 1906 of the bin 1902. Similarly, the second portion 2006 of the lower surface 2002 of the rim 1906 of the bin 1902 is seated on the second support rail 148 of the inset region 110 of the accessory support frame 100 such that the second support rail 148 contacts, engages, and/otherwise supports the second portion 2006 of the lower surface 2002 of the rim 1906 of the bin 1902. The first support rail 146 and the second support rail 148 of the inset region 110 respectively provide lateral boundaries and/or mechanical stops that restrict and/or prevent lateral movement and/or sliding of the rim 1906 of the bin 1902 relative to the inset region 110 and/or, more generally, relative to the accessory support frame 100.

As shown in FIGS. 23 and 24, the front edge 1908 of the rim 1906 of the bin 1902 faces toward and/or is adjacent to front support 102 of the accessory support frame 100, the rear edge 1910 of the rim 1906 of the bin 1902 faces toward and/or is adjacent to the rear support 104 of the accessory support frame 100, the right edge 1912 of the rim 1906 of the bin 1902 faces toward and/or is adjacent to the accessory rail 108 of the accessory support frame 100, and the left edge 1914 of the rim 1906 of the bin 1902 faces toward and/or is adjacent to the side support 106 of the accessory support frame 100 when the bin 1902 is inserted into and/or otherwise located within the inset region 110 of the accessory support frame 100. When the bin 1902 is inserted into and/or otherwise located within the inset region 110 of the accessory support frame 100 as shown in FIGS. 23 and 24, the width 1916 of the rim 1906 of the bin 1902 occupies the width 218 (e.g., fully occupies the entire width 218) that extends between the first support rail 146 and the second support rail 148 of the inset region 110 of the accessory support frame 100, and the depth 1512 of the rim 1906 of the bin 1902 substantially occupies the depth 220 (e.g., substantially occupies the entire depth 220) that extends between the front support 102 and the rear support 104 of the accessory support frame 100. Removal (e.g., manual removal) of the bin 1902 from the inset region 110 of the accessory support frame 100 can be accomplished via the recess 116 of the front support 102 of the accessory support frame 100 and/or via the recess 122 of the rear support 104 of the accessory support frame.

The storage bin 1900 of FIGS. 19-24 constitutes a third insertable accessory from among the plurality of insertable accessories described above, respective ones of which are configured to be interchangeably inserted into and/or received within the inset region 110 of the accessory support frame 100. For example, the tabletop 1100 of FIGS. 11-14, the cutting board 1500 of FIGS. 15-18, and the storage bin 1900 of FIGS. 19-24 constitute insertable accessories that are interchangeably insertable into and/or receivable within the inset region 110 of the accessory support frame 100. Other insertable accessories from among the plurality of insertable accessories that are interchangeably insertable into and/or receivable within the inset region 110 of the accessory support frame 100 are further described herein.

Figure 25:
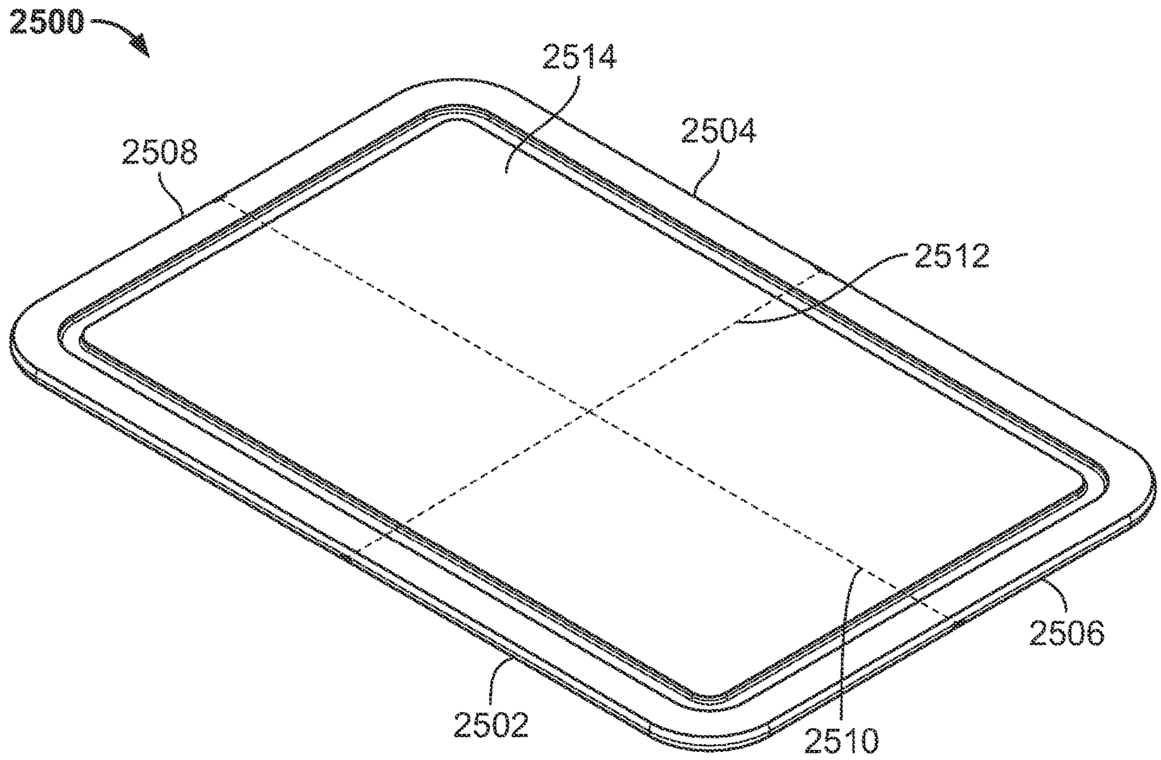
FIG. 25 is a first perspective view of an example cutting board constructed in accordance with the teachings of this disclosure.
Figure 26:
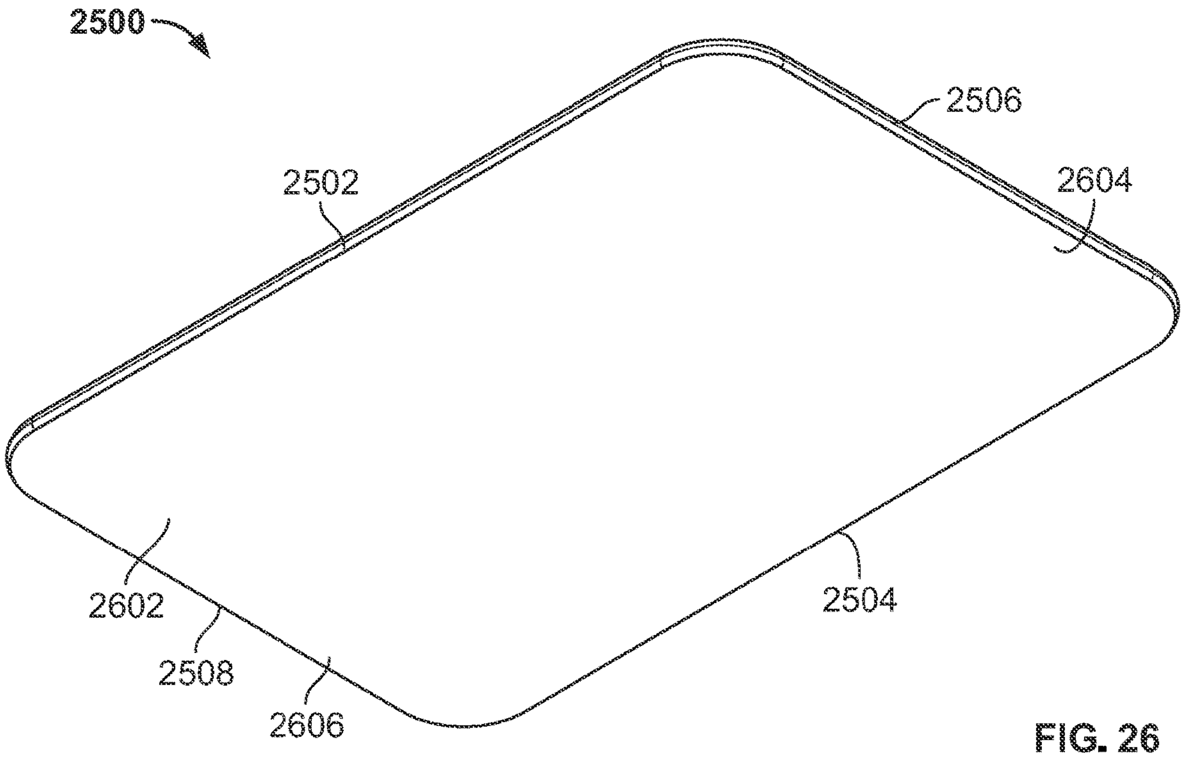
FIG. 26 is a second perspective view of the cutting board of FIG. 25.

FIG. 25 is a first perspective view of an example cutting board 2500 constructed in accordance with the teachings of this disclosure. FIG. 26 is a second perspective view of the cutting board 2500 of FIG. 25. In the illustrated example of FIGS. 25 and 26, the cutting board 2500 includes an example front edge 2502, an example rear edge 2504 located opposite the front edge 2502, an example right edge 2506 extending between the front edge 2502 and the rear edge 2504, and an example left edge 2508 located opposite the right edge 2506 and extending between the front edge 2502 and the rear edge 2504. The cutting board 2500 has an example width 2510 extending between and defined by the right edge 2506 and the left edge 2508 of the cutting board 2500, and an example depth 2512 extending between and defined by the front edge 2502 and the rear edge 2504 of the cutting board 2500. In the illustrated example of FIGS. 25 and 26, the cutting board 2500 has a generally rectangular profile defined by the front edge 2502, the rear edge 2504, the right edge 2506, and the left edge 2508 of the cutting board 2500. In other examples, the cutting board 2500 can instead have a profile that is non-rectangular (e.g., circular, oval, triangular, trapezoidal, hexagonal, etc.).

The cutting board 2500 of FIGS. 25 and 26 further includes an example upper surface 2514 extending between the front edge 2502, the rear edge 2504, the right edge 2506, and the left edge 2508 of the cutting board 2500, as well as an example lower surface 2602 located opposite the upper surface 2514 and extending between the front edge 2502, the rear edge 2504, the right edge 2506, and the left edge 2508 of the cutting board 2500. The cutting board 2500 is configured such that the upper surface 2514 constitutes a surface for cutting one or more item(s) of food (e.g., meat, vegetables, etc.) placed in contact with the upper surface 2514. In the illustrated example of FIGS. 25 and 26, the cutting board 2500 is configured to be reversible, such that the lower surface 2602 can be reoriented as the upper surface 2514, and vice-versa, with the reoriented lower surface 2602 then constituting a surface for cutting one or more item(s) of food (e.g., meat, vegetables, etc.) placed in contact with the reoriented lower surface 2602.

In the illustrated example of FIGS. 25 and 26, an example first portion 2604 of the lower surface 2602 of the cutting board 2500 located adjacent to and/or extending along the right edge 2506 of the cutting board 2500 of FIGS. 25 and 26 is configured to contact, engage, and/otherwise be supported by the first support rail 146 of the inset region 110 of the accessory support frame 100 of FIGS. 1-10 when the cutting board 2500 is inserted into and/or otherwise located within the inset region 110 of the accessory support frame 100. Similarly, an example second portion 2606 of the lower surface 2602 of the cutting board 2500 located adjacent to and/or extending along the left edge 2508 of the cutting board 2500 of FIGS. 25 and 26 is configured to contact, engage, and/otherwise be supported by the second support rail 148 of the inset region 110 of the accessory support frame 100 of FIGS. 1-10 when the cutting board 2500 is inserted into and/or otherwise located within the inset region 110 of the accessory support frame 100.

The cutting board 2500 of FIGS. 25 and 26 is further configured such that, when the cutting board 2500 is inserted into and/or otherwise located within the inset region 110 of the accessory support frame 100, the width 2510 of the cutting board 2500 occupies the width 218 (e.g., fully occupies the entire width 218) that extends between the first support rail 146 and the second support rail 148 of the inset region 110 of the accessory support frame 100, and the depth 2512 of the cutting board 1500 occupies approximately one half of the depth 220 (e.g., occupies approximately fifty percent of the entire depth 220) that extends between the front support 102 and the rear support 104 of the accessory support frame 100. The cutting board 2500 of FIGS. 25 and 26 is accordingly configured to be inserted into and/or otherwise located within the inset region 110 of the accessory support frame 100 in either a forward position (e.g., within a front half of the inset region 110, at a located proximate to the front support 102 of the accessory support frame 100) or a rearward position (e.g., within a rear half of the inset region 110, at a location proximate to the rear support 104 of the accessory support frame 100). Removal (e.g., manual removal) of the cutting board 2500 from the inset region 110 of the accessory support frame 100 can be accomplished via the recess 116 of the front support 102 of the accessory support frame 100 (e.g., when the cutting board 2500 is in the forward position within the inset region 110), or via the recess 122 of the rear support 104 of the accessory support frame (e.g., when the cutting board 2500 is in the rearward position within the inset region 110).

The cutting board 2500 of FIGS. 25 and 26 constitutes a fourth insertable accessory from among the plurality of insertable accessories described above, respective ones of which are configured to be interchangeably inserted into and/or received within the inset region 110 of the accessory support frame 100. For example, the tabletop 1100 of FIGS. 11-14, the cutting board 1500 of FIGS. 15-18, the storage bin 1900 of FIGS. 19-24, and the cutting board 2500 of FIGS. 25 and 26 constitute insertable accessories that are interchangeably insertable into and/or receivable within the inset region 110 of the accessory support frame 100. Other insertable accessories from among the plurality of insertable accessories that are interchangeably insertable into and/or receivable within the inset region 110 of the accessory support frame 100 are further described herein.

Figure 27:
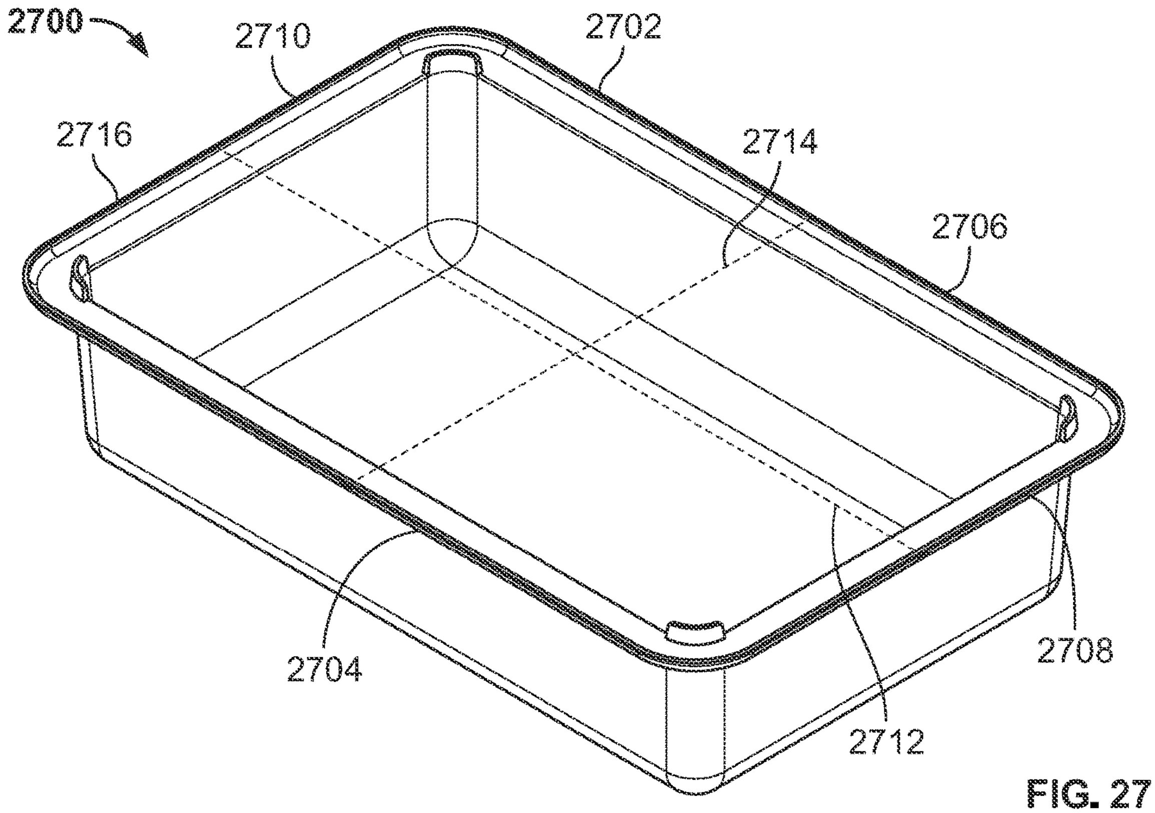
FIG. 27 is a first perspective view of an example basin constructed in accordance with the teachings of this disclosure.
Figure 28:
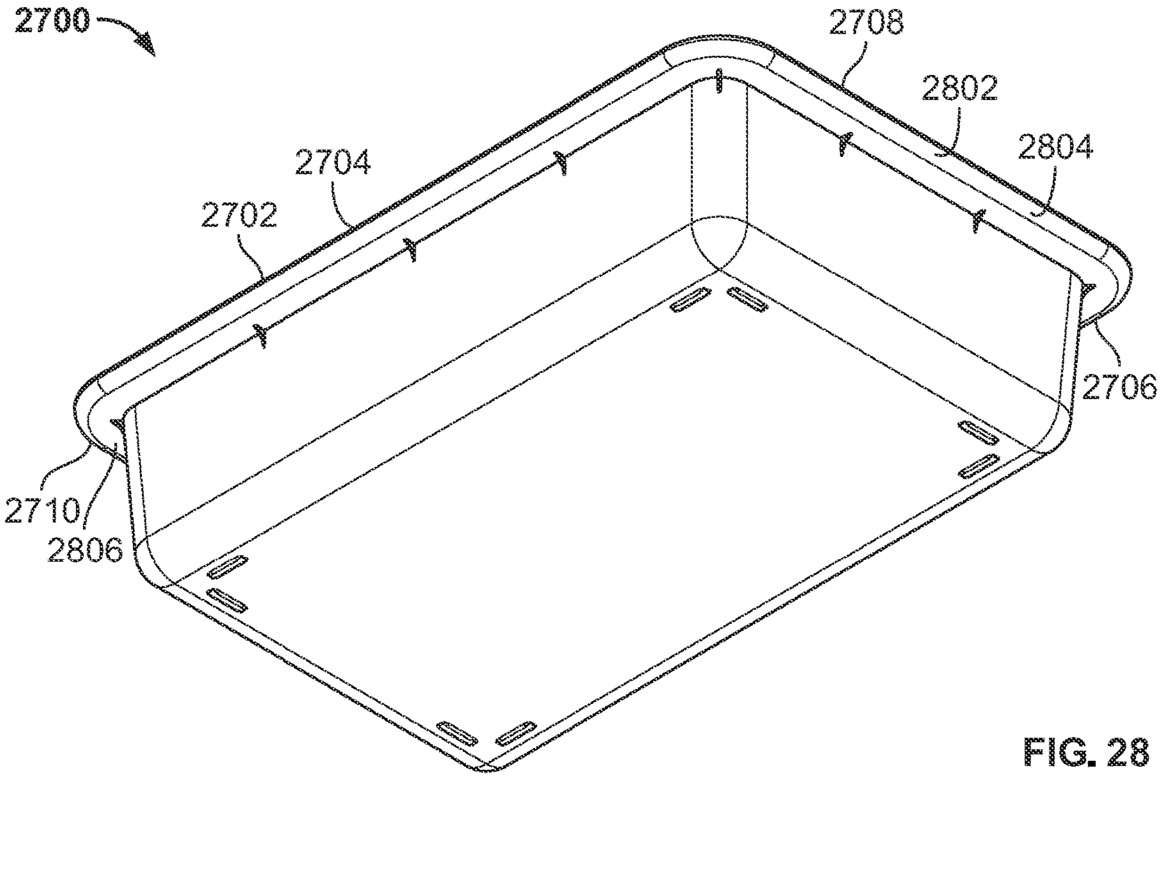
FIG. 28 is a second perspective view of the basin of FIG. 27.

FIG. 27 is a first perspective view of an example basin 2700 constructed in accordance with the teachings of this disclosure. FIG. 28 is a second perspective view of the basin 2700 of FIG. 27. The basin 2700 of FIGS. 27 and 28 is configured to hold, carry, contain, and/or otherwise support one or more item(s) of food (e.g., whole, sliced, chopped, and/or diced pieces of meats, vegetables, etc.), including one or more item(s) of food that may be moved into the basin 2700 from a cutting board such as the cutting board 2500 of FIGS. 25 and 26 described above. The basin 2700 of FIGS. 27 and 28 includes an example rim 2702. In the illustrated example of FIGS. 27 and 28, the rim 2702 of the basin 2700 includes an example front edge 2704, an example rear edge 2706 located opposite the front edge 2704, an example right edge 2708 extending between the front edge 2704 and the rear edge 2706, and an example left edge 2710 located opposite the right edge 2708 and extending between the front edge 2704 and the rear edge 2706. The rim 2702 of the basin 2700 has an example width 2712 extending between and defined by the right edge 2708 and the left edge 2710 of the rim 2702 of the basin 2700, and an example depth 2714 extending between and defined by the front edge 2704 and the rear edge 2706 of the rim 2702 of the basin 2700. In the illustrated example of FIGS. 27 and 28, the rim 2702 of the basin 2700 has a generally rectangular profile defined by the front edge 2704, the rear edge 2706, the right edge 2708, and the left edge 2710 of the rim 2702 of the basin 2700. In other examples, the rim 2702 of the basin 2700 can instead have a profile that is non-rectangular (e.g., circular, oval, triangular, trapezoidal, hexagonal, etc.).

The rim 2702 of the basin 2700 of FIGS. 27 and 28 further includes an example upper surface 2716, and an example lower surface 2802 located opposite the upper surface 2716. In the illustrated example of FIGS. 27 and 28, an example first portion 2804 of the lower surface 2802 of the rim 2702 of the basin 2700 located adjacent to and/or extending along the right edge 2708 of the rim 2702 of the basin 2700 is configured to contact, engage, and/otherwise be supported by the first support rail 146 of the inset region 110 of the accessory support frame 100 of FIGS. 1-10 when the basin 2700 is inserted into and/or otherwise located within the inset region 110 of the accessory support frame 100. Similarly, an example second portion 2806 of the lower surface 2802 of the rim 2702 of the basin 2700 located adjacent to and/or extending along the left edge 2710 of the rim 2702 of the basin 2700 is configured to contact, engage, and/otherwise be supported by the second support rail 148 of the inset region 110 of the accessory support frame 100 of FIGS. 1-10 when the basin 2700 is inserted into and/or otherwise located within the inset region 110 of the accessory support frame 100.

The basin 2700 of FIGS. 27 and 28 is further configured such that, when the basin 2700 is inserted into and/or otherwise located within the inset region 110 of the accessory support frame 100, the width 2712 of the rim 2702 of the basin 2700 occupies the width 218 (e.g., fully occupies the entire width 218) that extends between the first support rail 146 and the second support rail 148 of the inset region 110 of the accessory support frame 100, and the depth 2714 of the rim 2702 of the basin 2700 occupies approximately one half of the depth 220 (e.g., occupies approximately fifty percent of the entire depth 220) that extends between the front support 102 and the rear support 104 of the accessory support frame 100. The basin 2700 of FIGS. 27 and 28 is accordingly configured to be inserted into and/or otherwise located within the inset region 110 of the accessory support frame 100 in either a forward position (e.g., within a front half of the inset region 110, at a located proximate to the front support 102 of the accessory support frame 100) or a rearward position (e.g., within a rear half of the inset region 110, at a location proximate to the rear support 104 of the accessory support frame 100). Removal (e.g., manual removal) of the basin 2700 from the inset region 110 of the accessory support frame 100 can be accomplished via the recess 116 of the front support 102 of the accessory support frame 100 (e.g., when the basin 2700 is in the forward position within the inset region 110), or via the recess 122 of the rear support 104 of the accessory support frame (e.g., when the basin 2700 is in the rearward position within the inset region 110).

The basin 2700 of FIGS. 27 and 28 constitutes a fifth insertable accessory from among the plurality of insertable accessories described above, respective ones of which are configured to be interchangeably inserted into and/or received within the inset region 110 of the accessory support frame 100. For example, the tabletop 1100 of FIGS. 11-14, the cutting board 1500 of FIGS. 15-18, the storage bin 1900 of FIGS. 19-24, the cutting board 2500 of FIGS. 25 and 26, and the basin 2700 of FIGS. 27 and 28 constitute insertable accessories that are interchangeably insertable into and/or receivable within the inset region 110 of the accessory support frame 100. Other insertable accessories from among the plurality of insertable accessories that are interchangeably insertable into and/or receivable within the inset region 110 of the accessory support frame 100 are further described herein.

Figure 29:
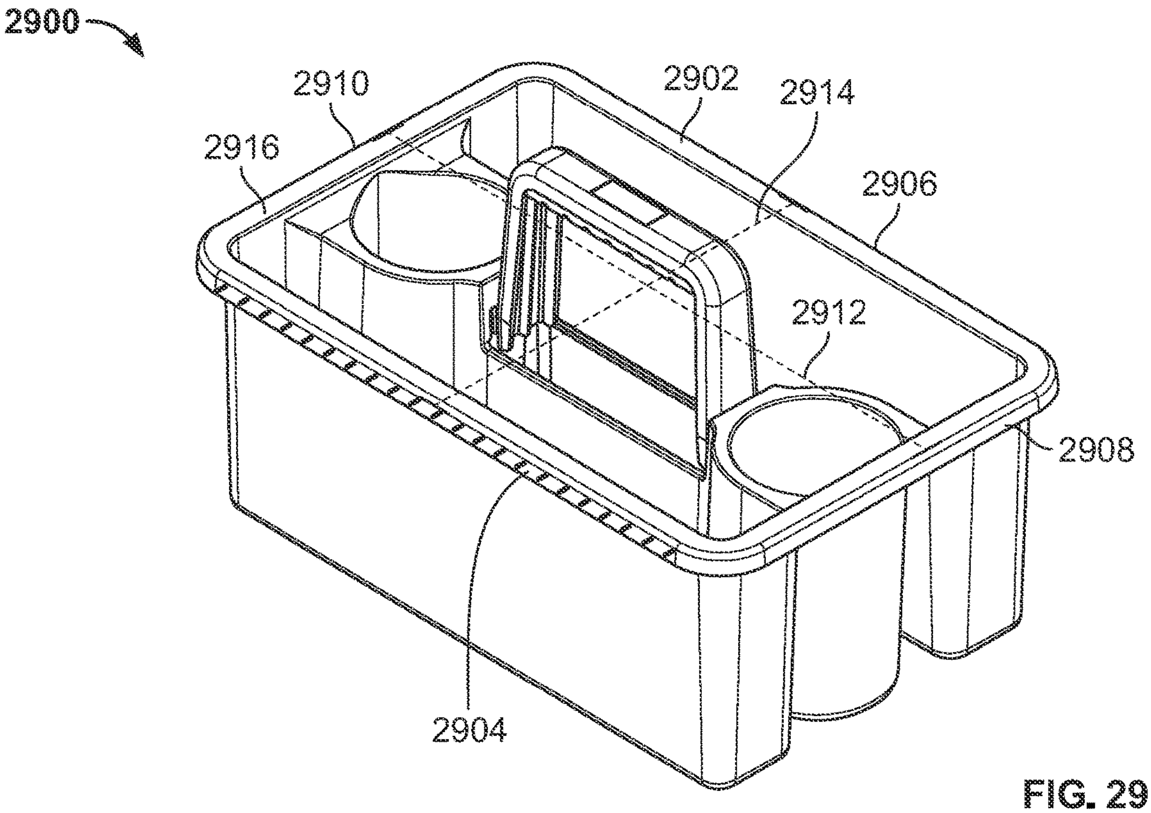
FIG. 29 is a first perspective view of an example caddy constructed in accordance with the teachings of this disclosure.
Figure 30:
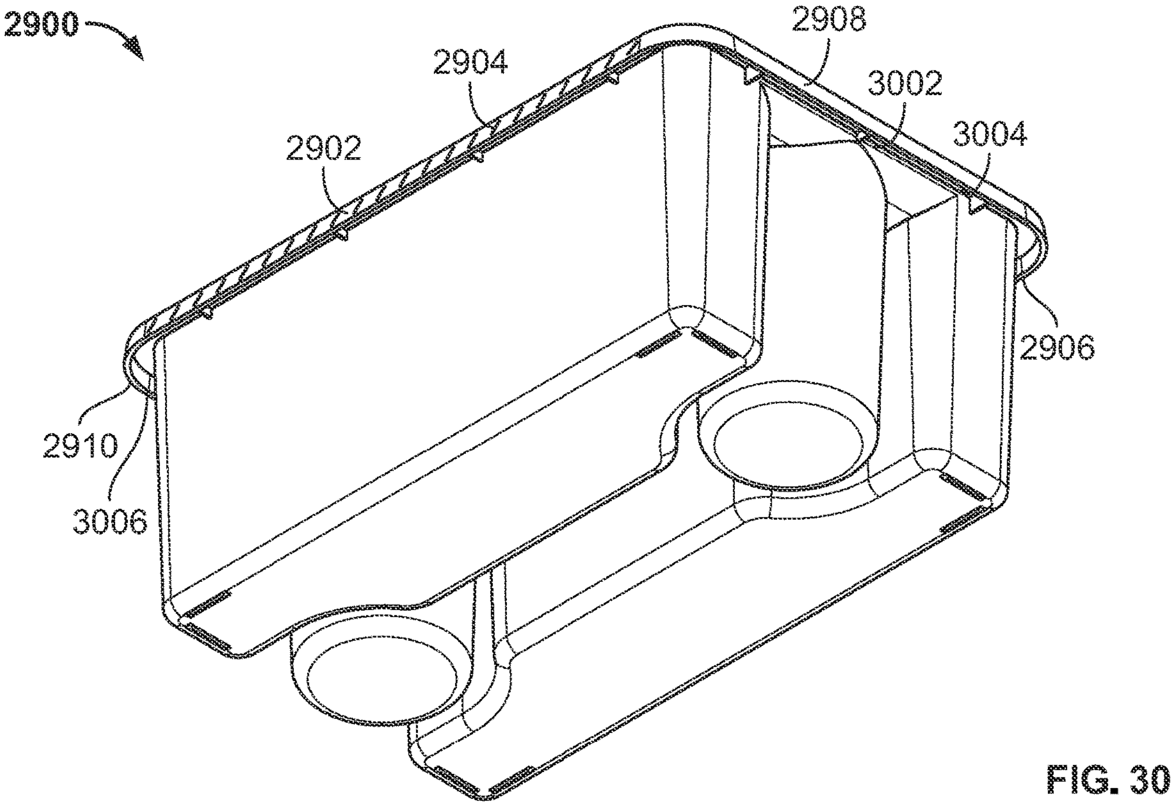
FIG. 30 is a second perspective view of the caddy of FIG. 30.

FIG. 29 is a first perspective view of an example caddy 2900 constructed in accordance with the teachings of this disclosure. FIG. 30 is a second perspective view of the caddy

2900 of FIG. 30. The caddy 2900 of FIGS. 29 and 30 is configured to hold, carry, contain, and/or otherwise support one or more item(s) (e.g., bottles, jars, cans, bags, packets, utensils, napkins, etc.) that may be utilized in connection with preparing, cooking, and/or serving food. The caddy 2900 of FIGS. 29 and 30 includes an example rim 2902. In the illustrated example of FIGS. 29 and 30, the rim 2902 of the caddy 2900 includes an example front edge 2904, an example rear edge 2906 located opposite the front edge 2904, an example right edge 2908 extending between the front edge 2904 and the rear edge 2906, and an example left edge 2910 located opposite the right edge 2908 and extending between the front edge 2904 and the rear edge 2906. The rim 2902 of the caddy 2900 has an example width 2912 extending between and defined by the right edge 2908 and the left edge 2910 of the rim 2902 of the caddy 2900, and an example depth 2914 extending between and defined by the front edge 2904 and the rear edge 2906 of the rim 2902 of the caddy 2900. In the illustrated example of FIGS. 29 and 30, the rim 2902 of the caddy 2900 has a generally rectangular profile defined by the front edge 2904, the rear edge 2906, the right edge 2908, and the left edge 2910 of the rim 2902 of the caddy 2900. In other examples, the rim 2902 of the caddy 2900 can instead have a profile that is non-rectangular (e.g., circular, oval, triangular, trapezoidal, hexagonal, etc.).

The rim 2902 of the caddy 2900 of FIGS. 29 and 30 further includes an example upper surface 2916, and an example lower surface 3002 located opposite the upper surface 2916. In the illustrated example of FIGS. 29 and 30, an example first portion 3004 of the lower surface 3002 of the rim 2902 of the caddy 2900 located adjacent to and/or extending along the right edge 2908 of the rim 2902 of the caddy 2900 is configured to contact, engage, and/otherwise be supported by the first support rail 146 of the inset region 110 of the accessory support frame 100 of FIGS. 1-10 when the caddy 2900 is inserted into and/or otherwise located within the inset region 110 of the accessory support frame 100. Similarly, an example second portion 3006 of the lower surface 3002 of the rim 2902 of the caddy 2900 located adjacent to and/or extending along the left edge 2910 of the rim 2902 of the caddy 2900 is configured to contact, engage, and/otherwise be supported by the second support rail 148 of the inset region 110 of the accessory support frame 100 of FIGS. 1-10 when the caddy 2900 is inserted into and/or otherwise located within the inset region 110 of the accessory support frame 100.

The caddy 2900 of FIGS. 29 and 30 is further configured such that, when the caddy 2900 is inserted into and/or otherwise located within the inset region 110 of the accessory support frame 100, the width 2912 of the rim 2902 of the caddy 2900 occupies the width 218 (e.g., fully occupies the entire width 218) that extends between the first support rail 146 and the second support rail 148 of the inset region 110 of the accessory support frame 100, and the depth 2914 of the rim 2902 of the caddy 2900 occupies approximately one half of the depth 220 (e.g., occupies approximately fifty percent of the entire depth 220) that extends between the front support 102 and the rear support 104 of the accessory support frame 100. The caddy 2900 of FIGS. 29 and 30 is accordingly configured to be inserted into and/or otherwise located within the inset region 110 of the accessory support frame 100 in either a forward position (e.g., within a front half of the inset region 110, at a located proximate to the front support 102 of the accessory support frame 100) or a rearward position (e.g., within a rear half of the inset region 110, at a location proximate to the rear support 104 of the accessory support frame 100). Removal (e.g., manual removal) of the caddy 2900 from the inset region 110 of the accessory support frame 100 can be accomplished via the recess 116 of the front support 102 of the accessory support frame 100 (e.g., when the caddy 2900 is in the forward position within the inset region 110), or via the recess 122 of the rear support 104 of the accessory support frame (e.g., when the caddy 2900 is in the rearward position within the inset region 110).

The caddy 2900 of FIGS. 29 and 30 constitutes a sixth insertable accessory from among the plurality of insertable accessories described above, respective ones of which are configured to be interchangeably inserted into and/or received within the inset region 110 of the accessory support frame 100. For example, the tabletop 1100 of FIGS. 11-14, the cutting board 1500 of FIGS. 15-18, the storage bin 1900 of FIGS. 19-24, the cutting board 2500 of FIGS. 25 and 26, the basin 2700 of FIGS. 27 and 28, and the caddy 2900 of FIGS. 29 and 30 constitute insertable accessories that are interchangeably insertable into and/or receivable within the inset region 110 of the accessory support frame 100. Other insertable accessories from among the plurality of insertable accessories that are interchangeably insertable into and/or receivable within the inset region 110 of the accessory support frame 100 are further described herein.

Figure 31:
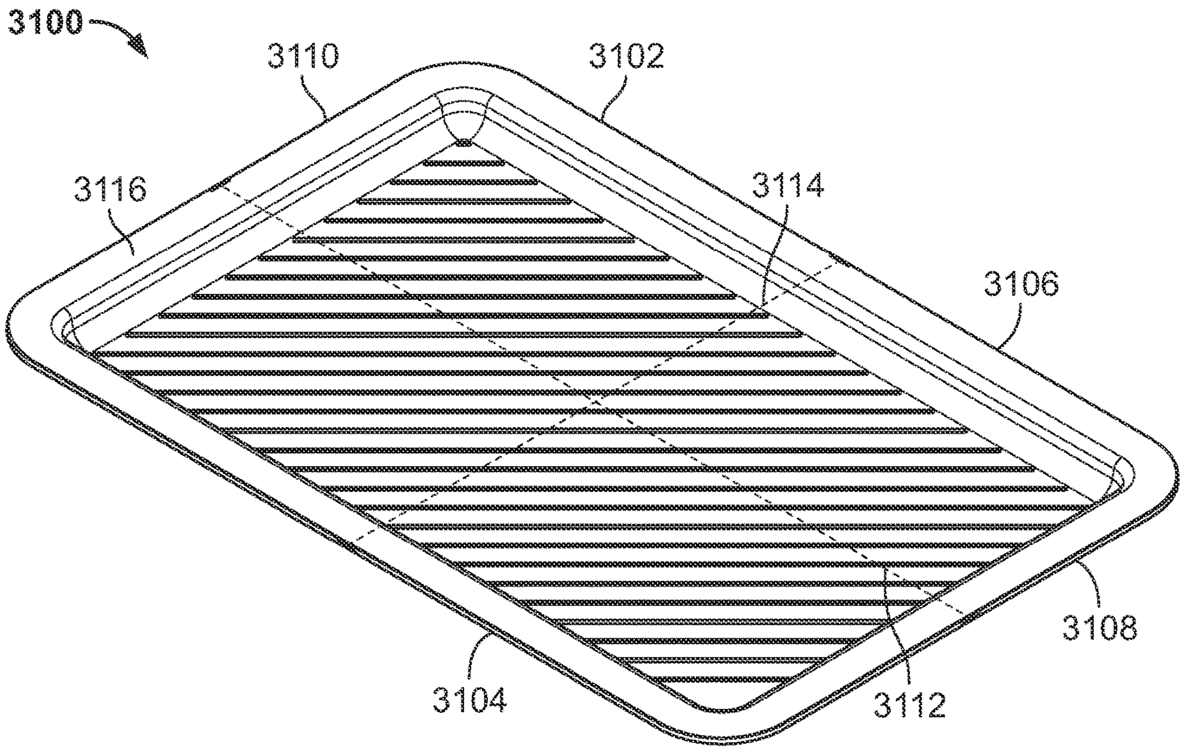
FIG. 31 is a first perspective view of an example tray constructed in accordance with the teachings of this disclosure.
Figure 32:
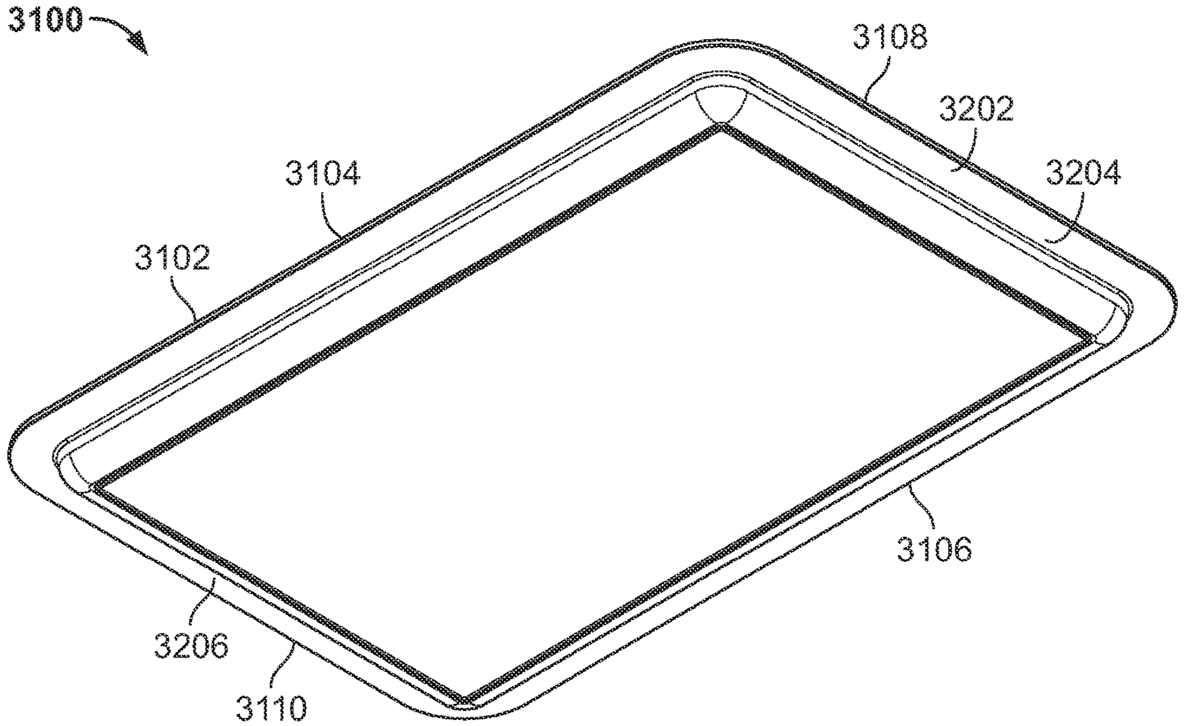
FIG. 32 is a second perspective view of the tray of FIG. 31.

FIG. 31 is a first perspective view of an example tray 3100 constructed in accordance with the teachings of this disclosure. FIG. 32 is a second perspective view of the tray 3100 of FIG. 31. The tray 3100 of FIGS. 31 and 32 is configured to hold, carry, contain, and/or otherwise support one or more item(s) of food (e.g., whole, sliced, chopped, and/or diced pieces of meats, vegetables, etc.). The tray 3100 of FIGS. 31 and 32 includes an example rim 3102. In the illustrated example of FIGS. 31 and 32, the rim 3102 of the tray 3100 includes an example front edge 3104, an example rear edge 3106 located opposite the front edge 3104, an example right edge 3108 extending between the front edge 3104 and the rear edge 3106, and an example left edge 3110 located opposite the right edge 3108 and extending between the front edge 3104 and the rear edge 3106. The rim 3102 of the tray 3100 has an example width 3112 extending between and defined by the right edge 3108 and the left edge 3110 of the rim 3102 of the tray 3100, and an example depth 3114 extending between and defined by the front edge 3104 and the rear edge 3106 of the rim 3102 of the tray 3100. In the illustrated example of FIGS. 31 and 32, the rim 3102 of the tray 3100 has a generally rectangular profile defined by the front edge 3104, the rear edge 3106, the right edge 3108, and the left edge 3110 of the rim 3102 of the tray 3100. In other examples, the rim 3102 of the tray 3100 can instead have a profile that is non-rectangular (e.g., circular, oval, triangular, trapezoidal, hexagonal, etc.).

The rim 3102 of the tray 3100 of FIGS. 31 and 32 further includes an example upper surface 3116, and an example lower surface 3202 located opposite the upper surface 3116. In the illustrated example of FIGS. 31 and 32, an example first portion 3204 of the lower surface 3202 of the rim 3102 of the tray 3100 located adjacent to and/or extending along the right edge 3108 of the rim 3102 of the tray 3100 is configured to contact, engage, and/otherwise be supported by the first support rail 146 of the inset region 110 of the accessory support frame 100 of FIGS. 1-10 when the tray 3100 is inserted into and/or otherwise located within the inset region 110 of the accessory support frame 100. Similarly, an example second portion 3206 of the lower surface 3202 of the rim 3102 of the tray 3100 located adjacent to and/or extending along the left edge 3110 of the rim 3102 of the tray 3100 is configured to contact, engage, and/otherwise be supported by the second support rail 148 of the inset region 110 of the accessory support frame 100 of FIGS. 1-10 when the tray 3100 is inserted into and/or otherwise located within the inset region 110 of the accessory support frame 100.

The tray 3100 of FIGS. 31 and 32 is further configured such that, when the tray 3100 is inserted into and/or otherwise located within the inset region 110 of the accessory support frame 100, the width 3112 of the rim 3102 of the tray 3100 occupies the width 218 (e.g., fully occupies the entire width 218) that extends between the first support rail 146 and the second support rail 148 of the inset region 110 of the accessory support frame 100, and the depth 3114 of the rim 3102 of the tray 3100 occupies approximately one half of the depth 220 (e.g., occupies approximately fifty percent of the entire depth 220) that extends between the front support 102 and the rear support 104 of the accessory support frame 100. The tray 3100 of FIGS. 31 and 32 is accordingly configured to be inserted into and/or otherwise located within the inset region 110 of the accessory support frame 100 in either a forward position (e.g., within a front half of the inset region 110, at a located proximate to the front support 102 of the accessory support frame 100) or a rearward position (e.g., within a rear half of the inset region 110, at a location proximate to the rear support 104 of the accessory support frame 100). Removal (e.g., manual removal) of the tray 3100 from the inset region 110 of the accessory support frame 100 can be accomplished via the recess 116 of the front support 102 of the accessory support frame 100 (e.g., when the tray 3100 is in the forward position within the inset region 110), or via the recess 122 of the rear support 104 of the accessory support frame (e.g., when the tray 3100 is in the rearward position within the inset region 110).

The tray 3100 of FIGS. 31 and 32 constitutes a seventh insertable accessory from among the plurality of insertable accessories described above, respective ones of which are configured to be interchangeably inserted into and/or received within the inset region 110 of the accessory support frame 100. For example, the tabletop 1100 of FIGS. 11-14, the cutting board 1500 of FIGS. 15-18, the storage bin 1900 of FIGS. 19-24, the cutting board 2500 of FIGS. 25 and 26, the basin 2700 of FIGS. 27 and 28, the caddy 2900 of FIGS. 29 and 30, and the tray 3100 of FIGS. 31 and 32 constitute insertable accessories that are interchangeably insertable into and/or receivable within the inset region 110 of the accessory support frame 100. Other insertable accessories not expressly described herein can also be included among the plurality of insertable accessories that are interchangeably insertable into and/or receivable within the inset region 110 of the accessory support frame 100. Such other insertable accessories will typically be configured to have a width that occupies the width 218 (e.g., fully occupies the entire width 218) that extends between the first support rail 146 and the second support rail 148 of the inset region 110 of the accessory support frame 100, and a depth that occupies at least a portion (e.g., one half) of the depth 220 that extends between the front support 102 and the rear support 104 of the accessory support frame 100

As discussed above, the cutting board 2500 of FIGS. 25 and 26, the basin 2700 of FIGS. 27 and 28, the caddy 2900 of FIGS. 29 and 30, and the tray 3100 of FIGS. 31 and 32 each have a depth that occupies approximately one half of the depth 220 (e.g., occupies approximately fifty percent of the entire depth 220) that extends between the front support 102 and the rear support 104 of the accessory support frame 100. Each one of the cutting board 2500 of FIGS. 25 and 26, the basin 2700 of FIGS. 27 and 28, the caddy 2900 of FIGS. 29 and 30, and the tray 3100 of FIGS. 31 and 32 is accordingly insertable into and/or otherwise locatable within the inset region 110 of the accessory support frame 100 in either the forward position (e.g., within a front half of the inset region 110, at a located proximate to the front support 102 of the accessory support frame 100) or the rearward position (e.g., within a rear half of the inset region 110, at a location proximate to the rear support 104 of the accessory support frame 100). Numerous combinations and/or arrangements of the cutting board 2500 of FIGS. 25 and 26, the basin 2700 of FIGS. 27 and 28, the caddy 2900 of FIGS. 29 and 30, and the tray 3100 of FIGS. 31 and 32 within the inset region 110 of the accessory support frame 100 are accordingly possible.

Figure 33:
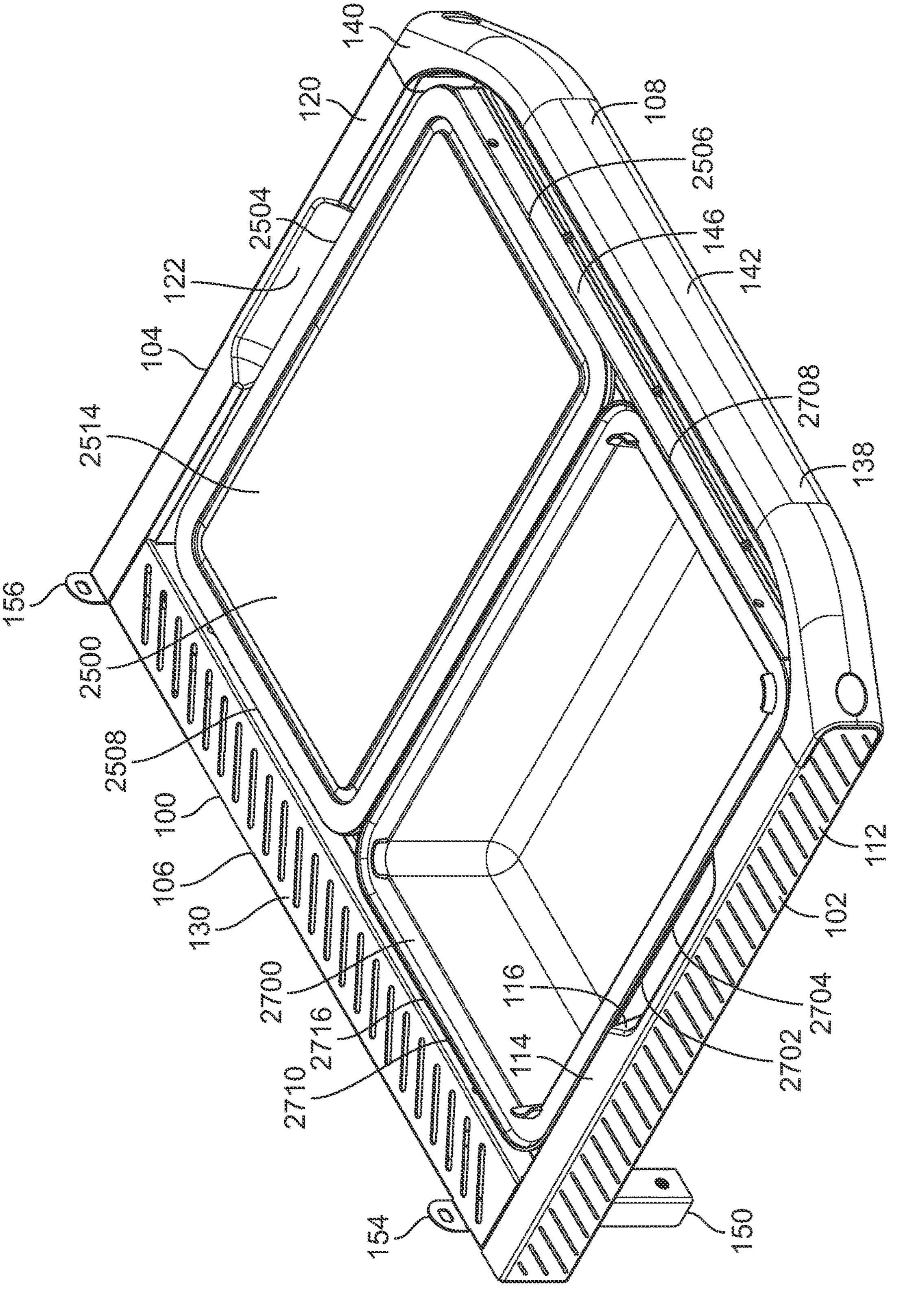
FIG. 33 is a perspective view of the accessory support frame of FIGS. 1-10, with the cutting board of FIGS. 25 and 26 and the basin of FIGS. 27 and 28 shown inserted into the inset region of the accessory support frame.

For example, FIG. 33 is a perspective view of the accessory support frame 100 of FIGS. 1-10, with the cutting board 2500 of FIGS. 25 and 26 and the basin 2700 of FIGS. 27 and 28 shown inserted into the inset region 110 of the accessory support frame 100. In the illustrated example of FIG. 33, the basin 2700 is located in the forward position within the inset region 110 of the accessory support frame 100, and the cutting board 2500 is located in the rearward position within the inset region 110 of the accessory support frame 100. In other examples, the respective positions of the cutting board 2500 and the basin 2700 can be reversed such that the cutting board 2500 is located in the forward position within the inset region 110 of the accessory support frame 100, and the basin 2700 is located in the rearward position within the inset region 110 of the accessory support frame 100. In still other examples, the cutting board 2500 can be replaced by the caddy 2900 of FIGS. 29 and 30, or by the tray 3100 of FIGS. 31 and 32. Similarly, the basin 2700 can be replaced by the caddy 2900 of FIGS. 29 and 30, or by the tray 3100 of FIGS. 31 and 32.

In the illustrated example of FIG. 33, the first portion 2604 of the lower surface 2602 of the cutting board 2500 is seated on the first support rail 146 of the inset region 110 of the accessory support frame 100 such that the first support rail 146 contacts, engages, and/otherwise supports the first portion 2604 of the lower surface 2602 of the cutting board 2500. Similarly, the second portion 2606 of the lower surface 2602 of the cutting board 2500 is seated on the second support rail 148 of the inset region 110 of the accessory support frame 100 such that the second support rail 148 contacts, engages, and/otherwise supports the second portion 2606 of the lower surface 2602 of the cutting board 2500. As further shown in FIG. 33, the first portion 2804 of the lower surface 2802 of the rim 2702 of the basin 2700 is seated on the first support rail 146 of the inset region 110 of the accessory support frame 100 such that the first support rail 146 contacts, engages, and/otherwise supports the first portion 2804 of the lower surface 2802 of the rim 2702 of the basin 2700. Similarly, the second portion 2806 of the lower surface 2802 of the rim 2702 of the basin 2700 is seated on the second support rail 148 of the inset region 110 of the accessory support frame 100 such that the second support rail 148 contacts, engages, and/otherwise supports the second portion 2806 of the lower surface 2802 of the rim 2702 of the basin 2700. The first support rail 146 and the second support rail 148 of the inset region 110 respectively provide lateral boundaries and/or mechanical stops that restrict and/or prevent lateral movement and/or sliding of the cutting board 2500 and/or the basin 2700 relative to the inset region 110 and/or, more generally, relative to the accessory support frame 100.

When the cutting board 2500 and the basin 2700 are inserted into and/or otherwise located within the inset region 110 of the accessory support frame 100 as shown in FIG. 33, the front edge 2704 of the rim 2702 of the basin 2700 faces toward and/or is adjacent to front support 102 of the accessory support frame 100, the rear edge 2504 of the cutting board 2500 faces toward and/or is adjacent to the rear support 104 of the accessory support frame 100, the right edge 2506 of the cutting board 2500 and the right edge 2708 of the rim 2702 of the basin 2700 face toward and/or are adjacent to the accessory rail 108 of the accessory support frame 100, and the left edge 2508 of the cutting board 2500 and the left edge 2710 of the rim 2702 of the basin 2700 face toward and/or are adjacent to the side support 106 of the accessory support frame 100. When the cutting board 2500 and the basin 2700 are inserted into and/or otherwise located within the inset region 110 of the accessory support frame 100 as shown in FIG. 33, the width 2510 of the cutting board 2500 and the width 2712 of the rim 2702 of the basin 2700 each occupy the width 218 (e.g., fully occupy the entire width 218) that extends between the first support rail 146 and the second support rail 148 of the inset region 110 of the accessory support frame 100. As further shown in FIG. 33, the depth 2512 of the cutting board 2500 and the depth 2714 of the rim 2702 of the basin 2700 each occupy approximately one half of the depth 220 (e.g., occupy approximately fifty percent of the entire depth 220) that extends between the front support 102 and the rear support 104 of the accessory support frame 100, with the basin 2700 occupying the front half of the inset region 110 and the cutting board 2500 occupying the rear half of the inset region 110. Removal of the basin 2700 from the inset region 110 of the accessory support frame 100 can be accomplished via the recess 116 of the front support 102 of the accessory support frame 100, and removal of the cutting board 2500 from the inset region 110 of the accessory support frame 100 can be accomplished via the recess 122 of the rear support 104 of the accessory support frame.

Figure 34:
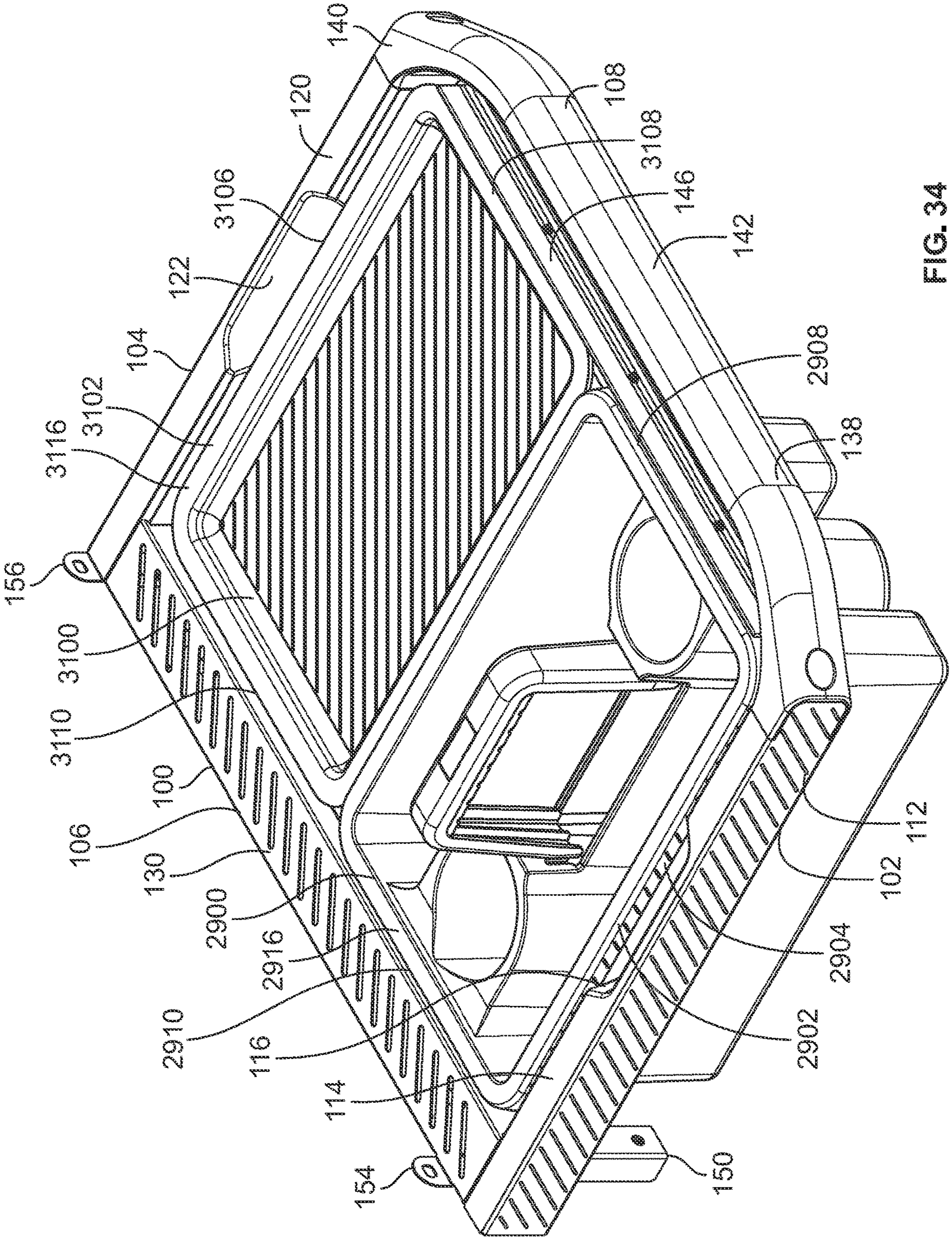
FIG. 34 is a perspective view of the accessory support frame of FIGS. 1-10, with the caddy of FIGS. 29 and 30 and the tray of FIGS. 31 and 32 shown inserted into the inset region of the accessory support frame.

As another example, FIG. 34 is a perspective view of the accessory support frame 100 of FIGS. 1-10, with the caddy 2900 of FIGS. 29 and 30 and the tray 3100 of FIGS. 31 and 32 shown inserted into the inset region 110 of the accessory support frame 100. In the illustrated example of FIG. 34, the caddy 2900 is located in the forward position within the inset region 110 of the accessory support frame 100, and the tray 3100 is located in the rearward position within the inset region 110 of the accessory support frame 100. In other examples, the respective positions of the caddy 2900 and the tray 3100 can be reversed such that the tray 3100 is located in the forward position within the inset region 110 of the accessory support frame 100, and the caddy 2900 is located in the rearward position within the inset region 110 of the accessory support frame 100. In still other examples, the caddy 2900 can be replaced by the cutting board 2500 of FIGS. 25 and 26, or by the basin 2700 of FIGS. 27 and 28. Similarly, the tray 3100 can be replaced by the cutting board 2500 of FIGS. 25 and 26, or by the basin 2700 of FIGS. 27 and 28.

In the illustrated example of FIG. 34, the first portion 3004 of the lower surface 3002 of the rim 2902 of the caddy 2900 is seated on the first support rail 146 of the inset region 110 of the accessory support frame 100 such that the first support rail 146 contacts, engages, and/otherwise supports the first portion 3004 of the lower surface 3002 of the rim 2902 of the caddy 2900. Similarly, the second portion 3006 of the lower surface 3002 of the rim 2902 of the caddy 2900 is seated on the second support rail 148 of the inset region 110 of the accessory support frame 100 such that the second support rail 148 contacts, engages, and/otherwise supports the second portion 3006 of the lower surface 3002 of the rim 2902 of the caddy 2900. As further shown in FIG. 34, the first portion 3204 of the lower surface 3202 of the rim 3102 of the tray 3100 is seated on the first support rail 146 of the inset region 110 of the accessory support frame 100 such that the first support rail 146 contacts, engages, and/otherwise supports the first portion 3204 of the lower surface 3202 of the rim 3102 of the tray 3100. Similarly, the second portion 3206 of the lower surface 3202 of the rim 3102 of the tray 3100 is seated on the second support rail 148 of the inset region 110 of the accessory support frame 100 such that the second support rail 148 contacts, engages, and/otherwise supports the second portion 3206 of the lower surface 3202 of the rim 3102 of the tray 3100. The first support rail 146 and the second support rail 148 of the inset region 110 respectively provide lateral boundaries and/or mechanical stops that restrict and/or prevent lateral movement and/or sliding of the caddy 2900 and/or the tray 3100 relative to the inset region 110 and/or, more generally, relative to the accessory support frame 100.

When the caddy 2900 and the tray 3100 are inserted into and/or otherwise located within the inset region 110 of the accessory support frame 100 as shown in FIG. 34, the front edge 2904 of the rim 2902 of the caddy 2900 faces toward and/or is adjacent to front support 102 of the accessory support frame 100, the rear edge 3106 of the rim 3102 of the tray 3100 faces toward and/or is adjacent to the rear support 104 of the accessory support frame 100, the right edge 2908 of the rim 2902 of the caddy 2900 and the right edge 3108 of the rim 3102 of the tray 3100 face toward and/or are adjacent to the accessory rail 108 of the accessory support frame 100, and the left edge 2910 of the rim 2902 of the caddy 2900 and the left edge 3110 of the rim 3102 of the tray 3100 face toward and/or are adjacent to the side support 106 of the accessory support frame 100. When the caddy 2900 and the tray 3100 are inserted into and/or otherwise located within the inset region 110 of the accessory support frame 100 as shown in FIG. 34, the width 2912 of the rim 2902 of the caddy 2900 and the width 3112 of the rim 3102 of the tray 3100 each occupy the width 218 (e.g., fully occupy the entire width 218) that extends between the first support rail 146 and the second support rail 148 of the inset region 110 of the accessory support frame 100. As further shown in FIG. 34, the depth 2914 of the rim 2902 of the caddy 2900 and the depth 3114 of the rim 3102 of the tray 3100 each occupy approximately one half of the depth 220 (e.g., occupy approximately fifty percent of the entire depth 220) that extends between the front support 102 and the rear support 104 of the accessory support frame 100, with the caddy 2900 occupying the front half of the inset region 110 and the tray 3100 occupying the rear half of the inset region 110. Removal of the caddy 2900 from the inset region 110 of the accessory support frame 100 can be accomplished via the recess 116 of the front support 102 of the accessory support frame 100, and removal of the tray 3100 from the inset region 110 of the accessory support frame 100 can be accomplished via the recess 122 of the rear support 104 of the accessory support frame.

Other combinations and/or arrangements of the cutting board 2500 of FIGS. 25 and 26, the basin 2700 of FIGS. 27 and 28, the caddy 2900 of FIGS. 29 and 30, and/or the tray 3100 of FIGS. 31 and 32 are also possible. For example, the cutting board 2500 can be paired with any one of the basin 2700, the caddy 2900, or the tray 3100 at any given time, with the cutting board 2500 being located in either the forward position or the rearward position within the inset region 110 of the accessory support frame 100. As another example, the basin 2700 can be paired with any one of the cutting board 2500, the caddy 2900, or the tray 3100 at any given time, with the basin 2700 being located in either the forward position or the rearward position within the inset region 110 of the accessory support frame 100. As another example, the caddy 2900 can be paired with any one of the cutting board 2500, the basin 2700, or the tray 3100 at any given time, with the caddy 2900 being located in either the forward position or the rearward position within the inset region 110 of the accessory support frame 100. As another example, the tray 3100 can be paired with any one of the cutting board 2500, the basin, or the caddy 2900 at any given time, with the tray 3100 being located in either the forward position or the rearward position within the inset region 110 of the accessory support frame 100.

Figure 35:
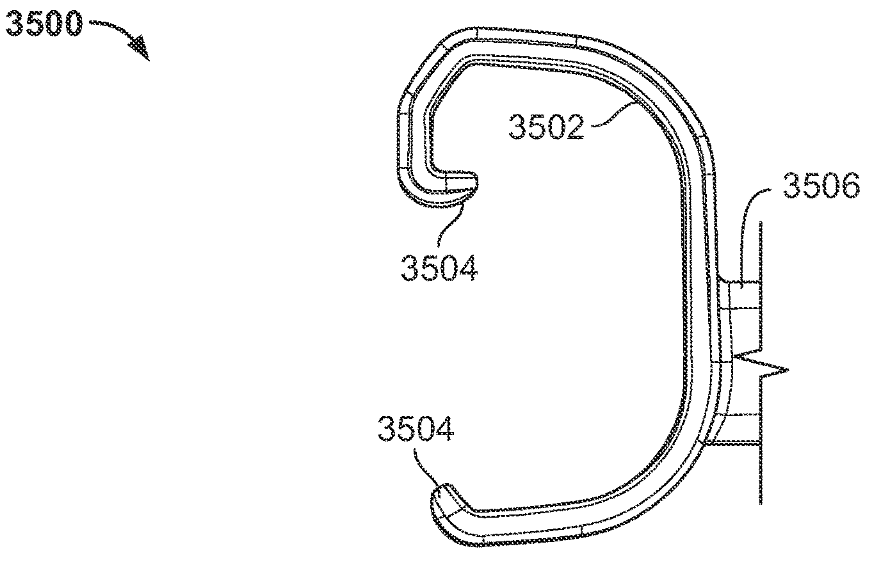
FIG. 35 is a side view of an example connector constructed in accordance with the teachings of this disclosure.

FIG. 35 is a side view of an example connector 3500 constructed in accordance with the teachings of this disclosure. The connector 3500 of FIG. 35 can be incorporated into (e.g., integrally formed with) various snap fit accessories (e.g., a tool hook, a caddy, a bottle holder, a bag holder, a roll holder, etc.) to facilitate removably coupling the snap fit accessory to the accessory mounting segment 142 of the accessory rail 108 of the accessory support frame 100 of FIGS. 1-10. In the illustrated example of FIG. 35, the connector 3500 includes an example contoured inner surface 3502, one or more example engagement tab(s) 3504, and a coupler 3506. The contoured inner surface 3502 of the connector 3500 is configured to be complementary in size and shape relative to the contoured outer surface 802 of the accessory mounting segment 142 of the accessory rail 108 of the accessory support frame 100. The engagement tab(s) 3504 of the connector 3500 is/are configured to contact corresponding ones of the engagement surface(s) 806 of the accessory mounting segment 142 of the accessory rail 108 of the accessory support frame 100. The coupler 3506 of the connector 3500 is configured to facilitate attachment and/or integration of the connector 3500 to a surface (e.g., a side surface) of an accessory, thereby forming a snap fit accessory.

Figure 36:
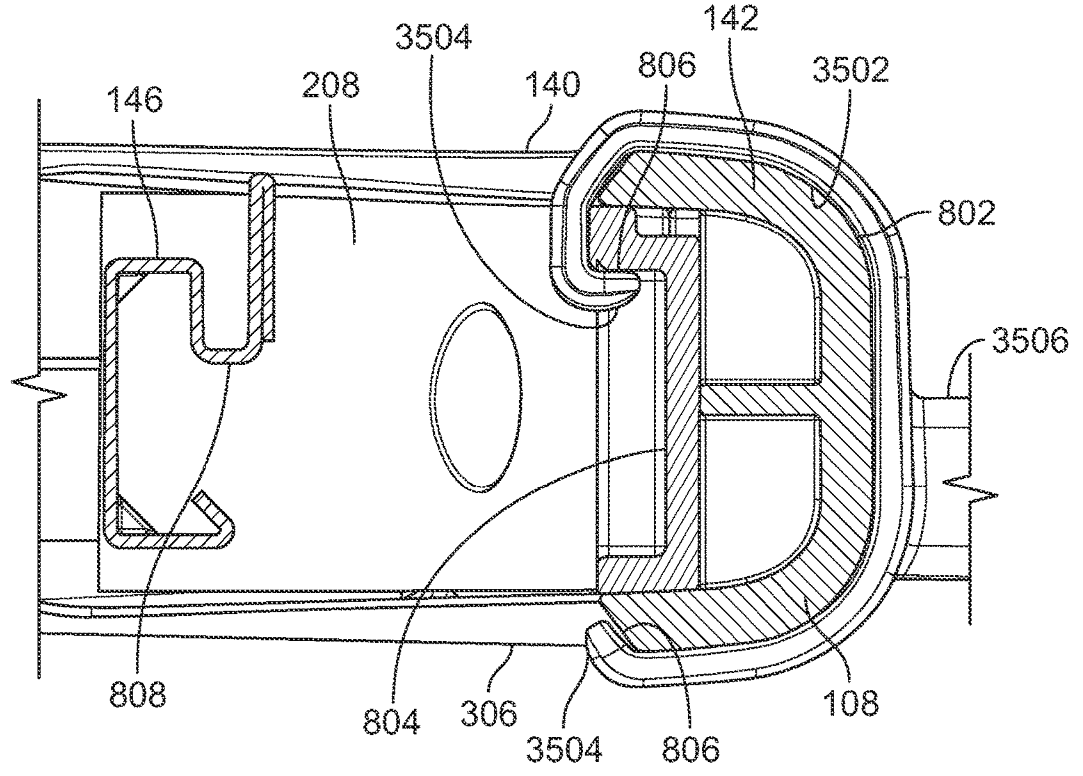
FIG. 36 is a cross-sectional view of the accessory support frame of FIGS. 1-10 taken along section C-C of FIG. 2, with the connector of FIG. 35 shown coupled to the accessory rail of the accessory support frame.

FIG. 36 is a cross-sectional view of the accessory support frame 100 of FIGS. 1-10 taken along section C-C of FIG. 2, with the connector 3500 of FIG. 35 shown coupled to the accessory rail 108 of the accessory support frame 100. In the illustrated example of FIG. 36, the contoured inner surface 3502 of the connector 3500 contacts and/or otherwise engages the contoured outer surface 802 of the accessory mounting segment 142 of the accessory rail 108 of the accessory support frame 100. As further shown in FIG. 36, the engagement tab(s) 3504 of the connector 3500 contact and/or otherwise engage corresponding ones of the engagement surface(s) 806 of the accessory mounting segment 1422 of the accessory rail 108 of the accessory support frame 100, thereby removably coupling (e.g., via a snap fit) the connector 3500 to the accessory mounting segment 142 of the accessory rail 108 of the accessory support frame 100.

Figure 37:
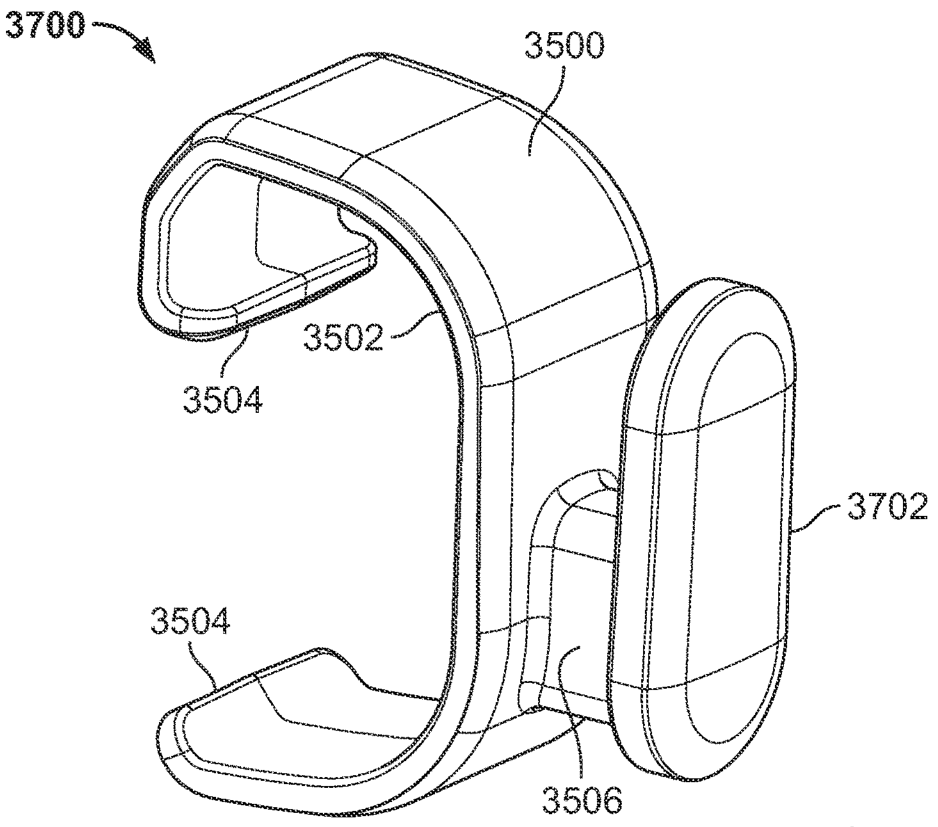
FIG. 37 is a perspective view of an example tool hook constructed in accordance with the teachings of this disclosure.
Figure 38:
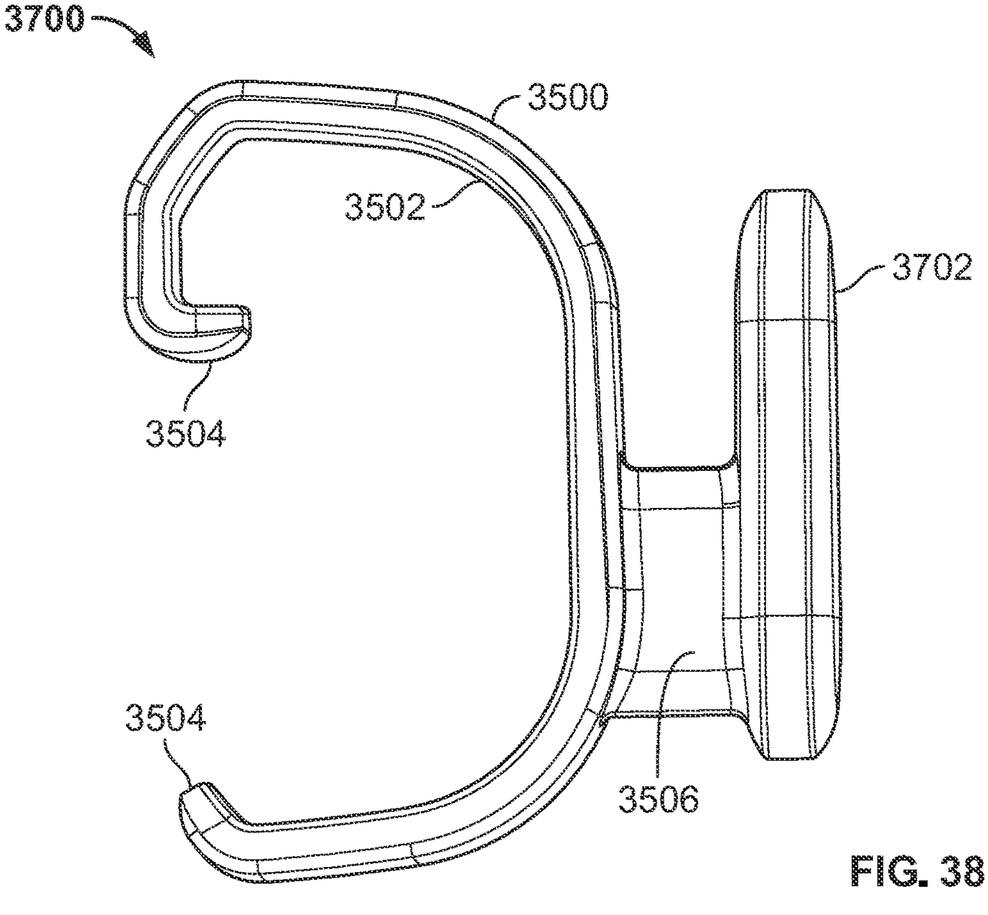
FIG. 38 is a side view of the tool hook of FIG. 37.

FIG. 37 is a perspective view of an example tool hook 3700 constructed in accordance with the teachings of this disclosure. FIG. 38 is a side view of the tool hook 3700 of FIG. 37. In the illustrated example of FIGS. 37 and 38, the tool hook 3700 includes an instance of the connector 3500 of FIG. 35, including the contoured inner surface 3502, the engagement tab(s) 3504, and the coupler 3506 thereof. The tool hook 3700 further includes an example hook portion 3702 extending from the coupler 3506 of the connector 3500. The coupler 3506 and the hook portion 3702 of the tool hook 3700 of FIGS. 37 and 38 are configured to support a variety of tools and/or utensils in a suspended manner (e.g., via a string or a hook of the tool or utensil), such that the tool or the utensil hangs downwardly from the coupler 3506 and/or from the hook portion 3702.

The contoured inner surface 3502 of the connector 3500 of the tool hook 3700 of FIGS. 37 and 38 is configured to contact and/or otherwise engage the contoured outer surface 802 of the accessory mounting segment 142 of the accessory rail 108 of the accessory support frame 100. The engagement tab(s) 3504 of the connector 3500 of the tool hook 3700 of FIGS. 37 and 38 is/are configured to contact and/or otherwise engage corresponding ones of the engagement surface(s) 806 of the accessory mounting segment 142 of the accessory rail 108 of the accessory support frame 100. The tool hook 3700 of FIGS. 37 and 38 can accordingly be removably coupled (e.g., via a snap fit) to the accessory mounting segment 142 of the accessory rail 108 of the accessory support frame 100.

Figure 39:
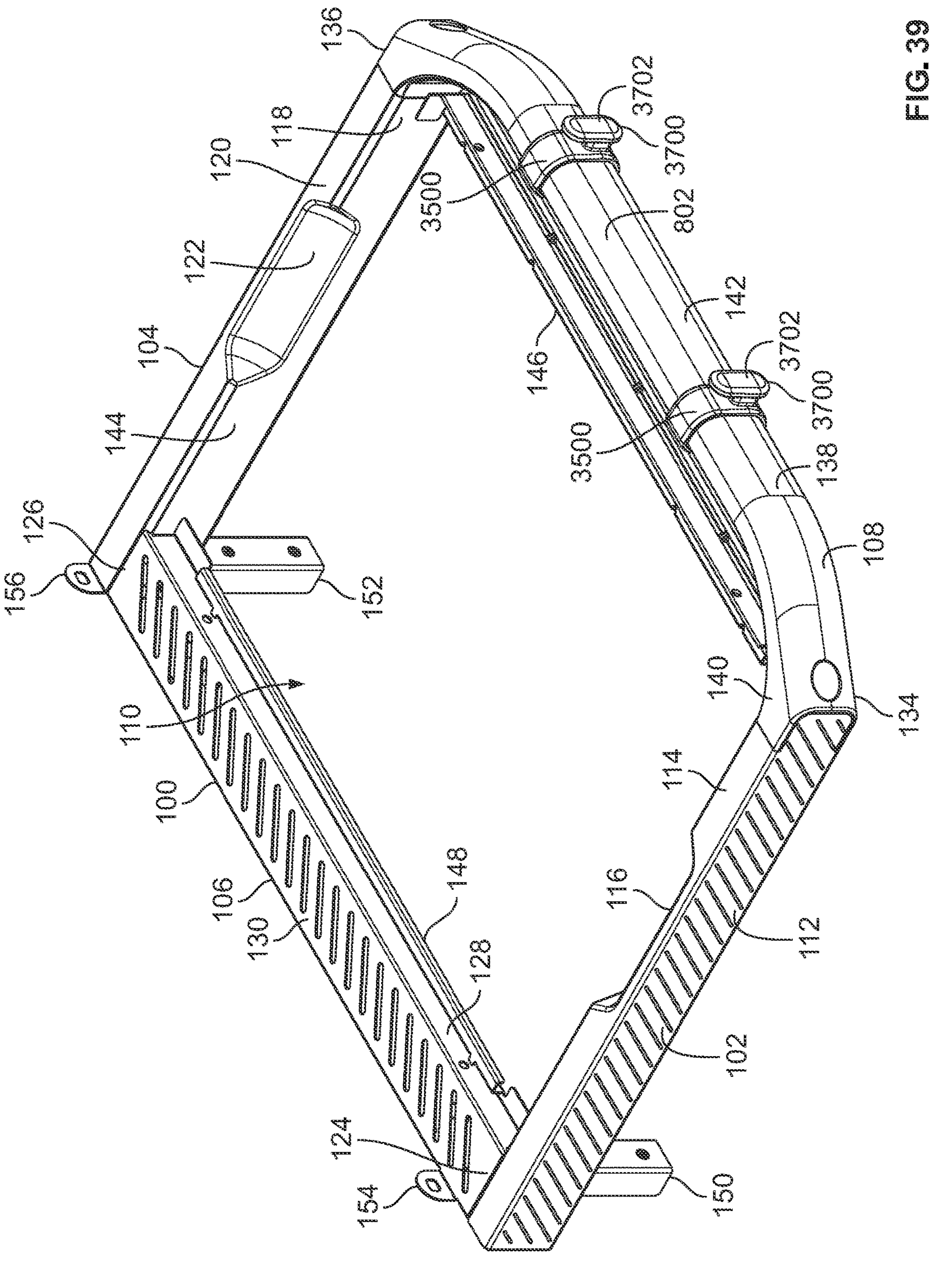
FIG. 39 is a perspective view of the accessory support frame of FIGS. 1-10, with two instances of the tool hook of FIGS. 37 and 38 shown coupled to the accessory rail of the accessory support frame.

FIG. 39 is a perspective view of the accessory support frame 100 of FIGS. 1-10, with two instances of the tool hook 3700 of FIGS. 37 and 38 shown coupled to the accessory rail 108 of the accessory support frame 100. In the illustrated example of FIG. 39, for each instance of the tool hook 3700, the contoured inner surface 3502 of the connector 3500 of the tool hook 3700 contacts and/or otherwise engages the contoured outer surface 802 of the accessory mounting segment 142 of the accessory rail 108 of the accessory support frame 100. Furthermore, the engagement tab(s) 3504 of the connector 3500 of the tool hook 3700 contact and/or otherwise engage corresponding ones of the engagement surface(s) 806 of the accessory mounting segment 142 of the accessory rail 108 of the accessory support frame 100. As shown in FIG. 39, for each instance of the tool hook 3700, the tool hook 3700 is removably coupled (e.g., via a snap fit) to the accessory mounting segment 142 of the accessory rail 108 of the accessory support frame 100.

The tool hook 3700 of FIGS. 37-39 constitutes a first snap fit accessory from among a plurality of snap fit accessories, respective ones of which are configured to be interchangeably removably coupled to the accessory mounting segment 142 of the accessory rail 108 of the accessory support frame 100. Other snap fit accessories from among the plurality of snap fit accessories that are interchangeably removably couplable to the accessory mounting segment 142 of the accessory rail 108 of the accessory support frame 100 are further described herein.

Figure 40:
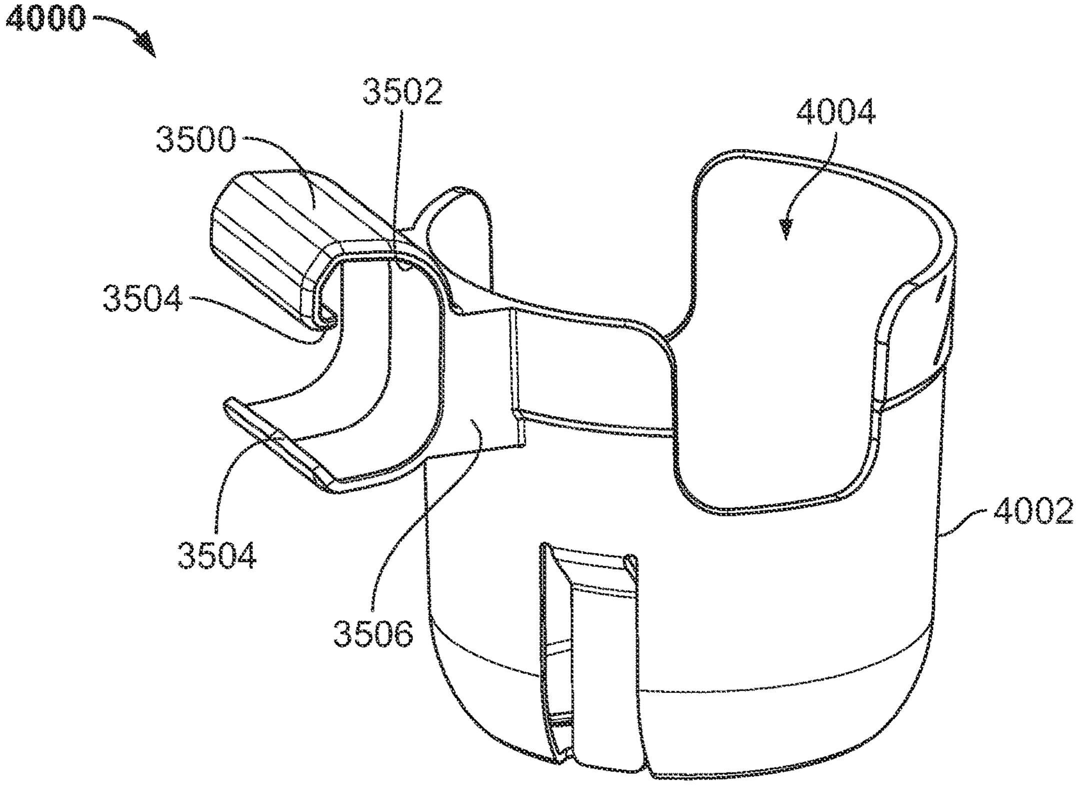
FIG. 40 is a perspective view of an example bottle holder constructed in accordance with the teachings of this disclosure.
Figure 41:
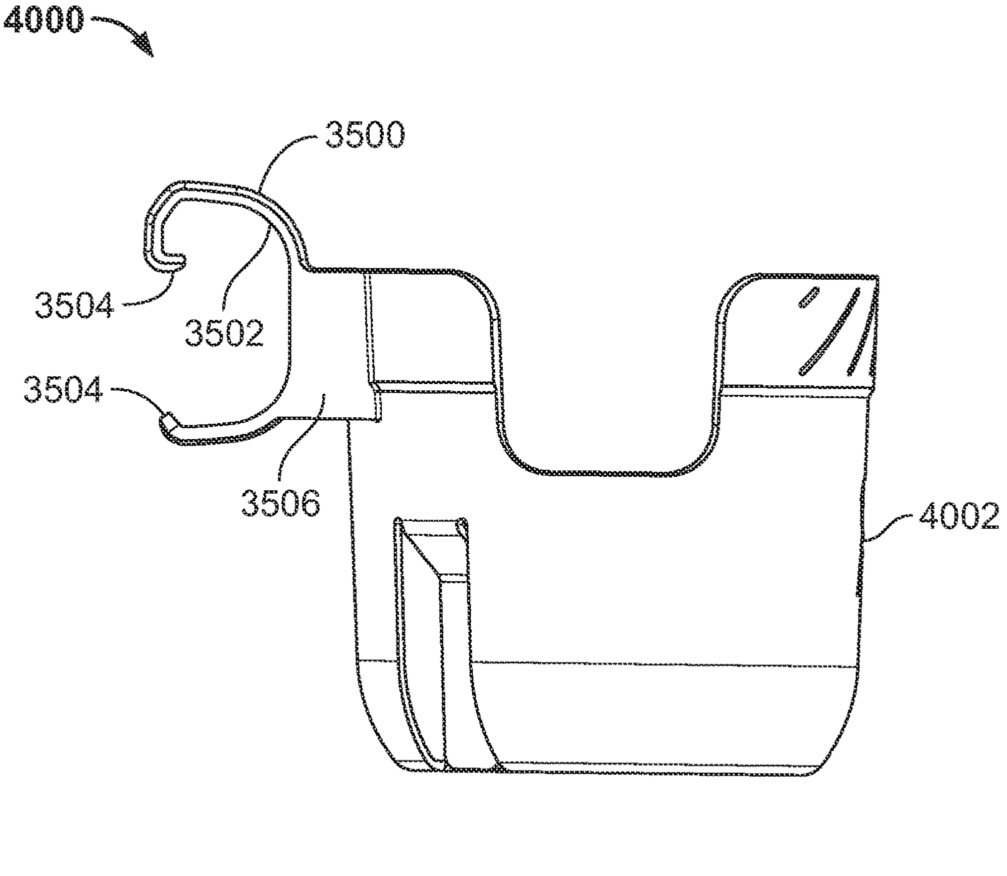
FIG. 41 is a side view of the bottle holder of FIG. 40.

FIG. 40 is a perspective view of an example bottle holder 4000 constructed in accordance with the teachings of this disclosure. FIG. 41 is a side view of the bottle holder 4000 of FIG. 40. In the illustrated example of FIGS. 40 and 41, the bottle holder 4000 includes an instance of the connector 3500 of FIG. 35, including the contoured inner surface 3502, the engagement tab(s) 3504, and the coupler 3506 thereof. The bottle holder 4000 further includes an example holder portion 4002 extending from the coupler 3506 of the connector 3500. The holder portion 4002 of the bottle holder 4000 of FIGS. 40 and 41 includes an example interior cavity 4004 having a generally cylindrical shape configured to hold, carry, and/or otherwise support a variety of bottles, cans, and/or other vessels having a complementary cylindrical shape that is receivable within the interior cavity 4004 of the holder portion 4002 of the bottle holder 4000.

The contoured inner surface 3502 of the connector 3500 of the bottle holder 4000 of FIGS. 40 and 41 is configured to contact and/or otherwise engage the contoured outer surface 802 of the accessory mounting segment 142 of the accessory rail 108 of the accessory support frame 100. The engagement tab(s) 3504 of the connector 3500 of the bottle holder 4000 of FIGS. 40 and 41 is/are configured to contact and/or otherwise engage corresponding ones of the engagement surface(s) 806 of the accessory mounting segment 142 of the accessory rail 108 of the accessory support frame 100. The bottle holder 4000 of FIGS. 40 and 41 can accordingly be removably coupled (e.g., via a snap fit) to the accessory mounting segment 142 of the accessory rail 108 of the accessory support frame 100.

Figure 42:
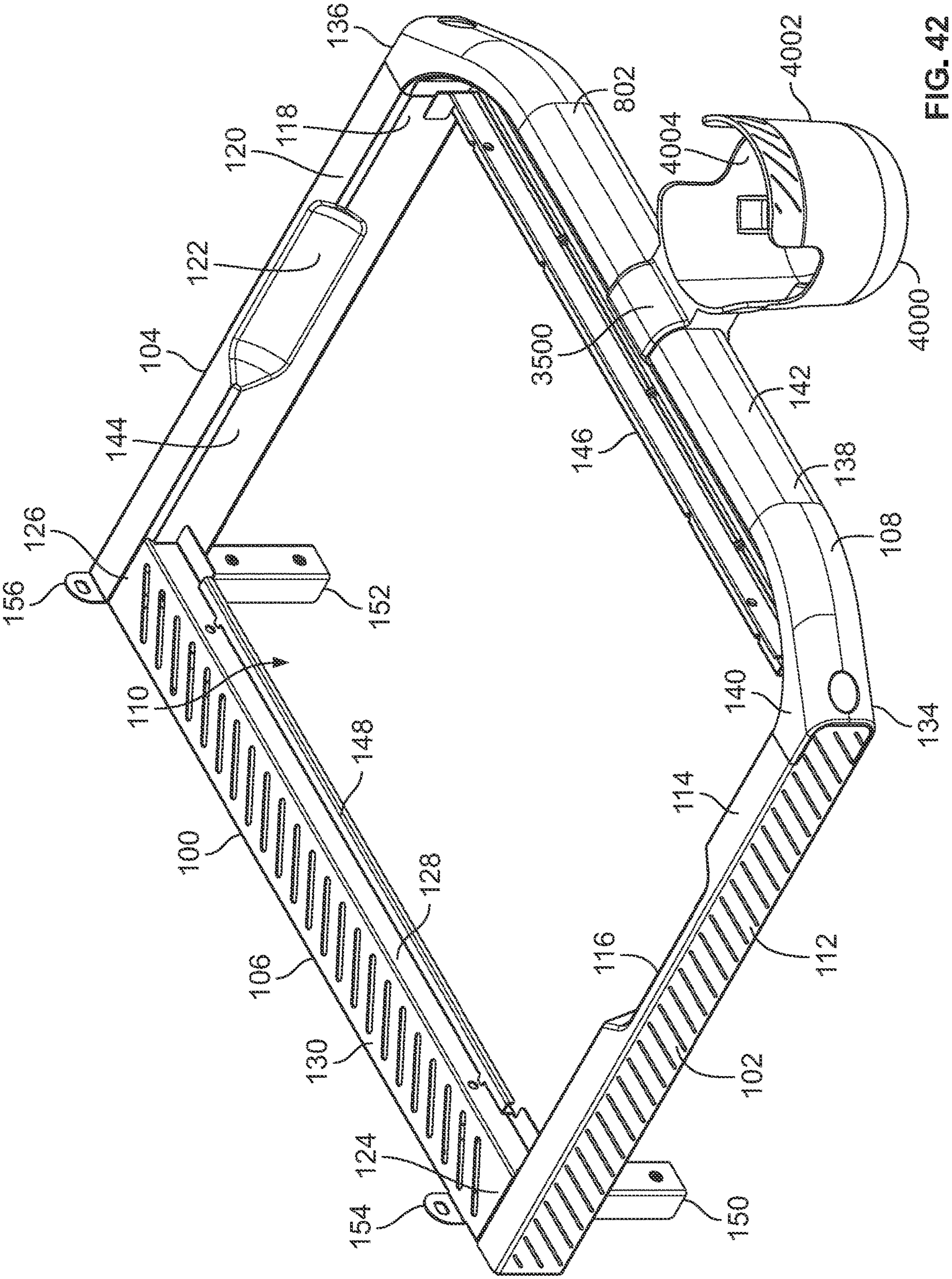
FIG. 42 is a perspective view of the accessory support frame of FIGS. 1-10, with the bottle holder of FIGS. 40 and 41 shown coupled to the accessory rail of the accessory support frame.

FIG. 42 is a perspective view of the accessory support frame 100 of FIGS. 1-10, with the bottle holder 4000 of FIGS. 40 and 41 shown coupled to the accessory rail 108 of the accessory support frame 100. In the illustrated example of FIG. 42, the contoured inner surface 3502 of the connector 3500 of the bottle holder 4000 contacts and/or otherwise engages the contoured outer surface 802 of the accessory mounting segment 142 of the accessory rail 108 of the accessory support frame 100. Furthermore, the engagement tab(s) 3504 of the connector 3500 of the bottle holder 4000 contact and/or otherwise engage corresponding ones of the engagement surface(s) 806 of the accessory mounting segment 142 of the accessory rail 108 of the accessory support frame 100. As shown in FIG. 42, the bottle holder 4000 is removably coupled (e.g., via a snap fit) to the accessory mounting segment 142 of the accessory rail 108 of the accessory support frame 100.

The bottle holder 4000 of FIGS. 40-42 constitutes a second snap fit accessory from among the plurality of snap fit accessories described above, respective ones of which are configured to be interchangeably removably coupled to the accessory mounting segment 142 of the accessory rail 108 of the accessory support frame 100. For example, the tool hook 3700 of FIGS. 37-39 and the bottle holder 4000 of FIGS. 40-42 constitute snap fit accessories that are interchangeably removably couplable to the accessory mounting segment 142 of the accessory rail 108 of the accessory support frame 100. Other snap fit accessories from among the plurality of snap fit accessories that are interchangeably removably couplable to the accessory mounting segment 142 of the accessory rail 108 of the accessory support frame 100 are further described herein.

Figure 43:
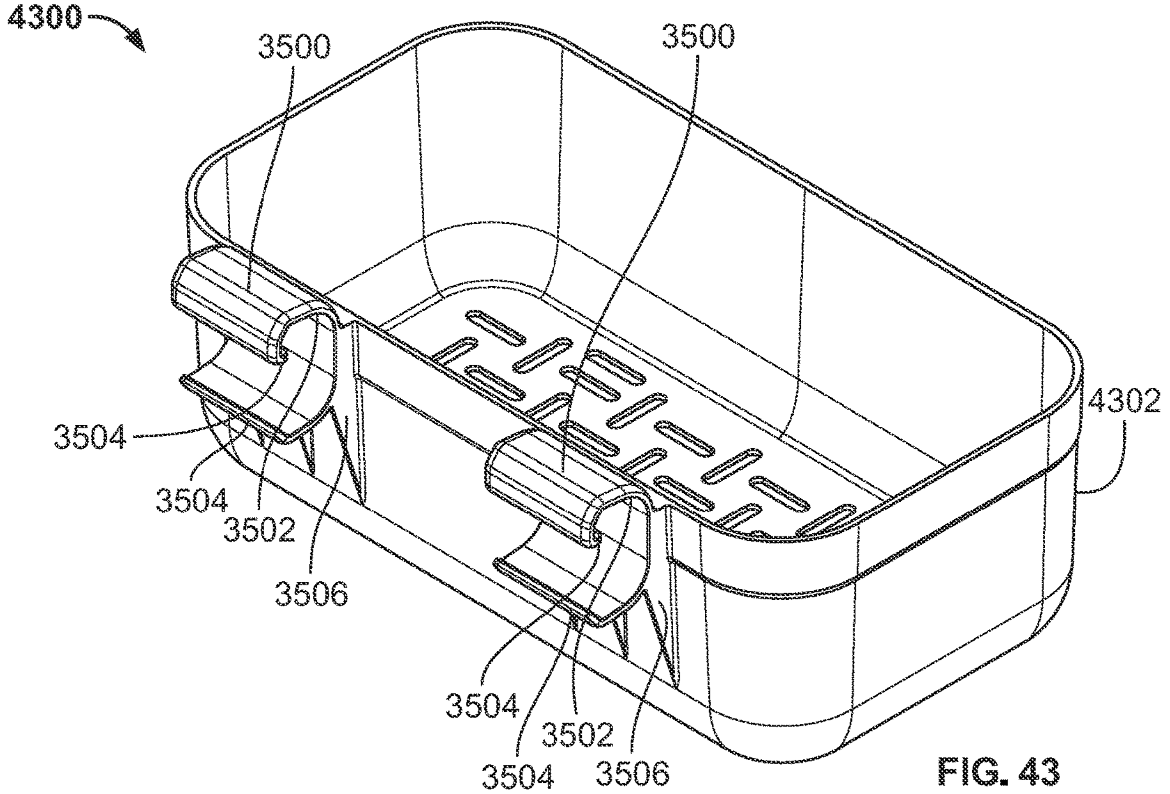
FIG. 43 is a perspective view of an example caddy constructed in accordance with the teachings of this disclosure.
Figure 44:
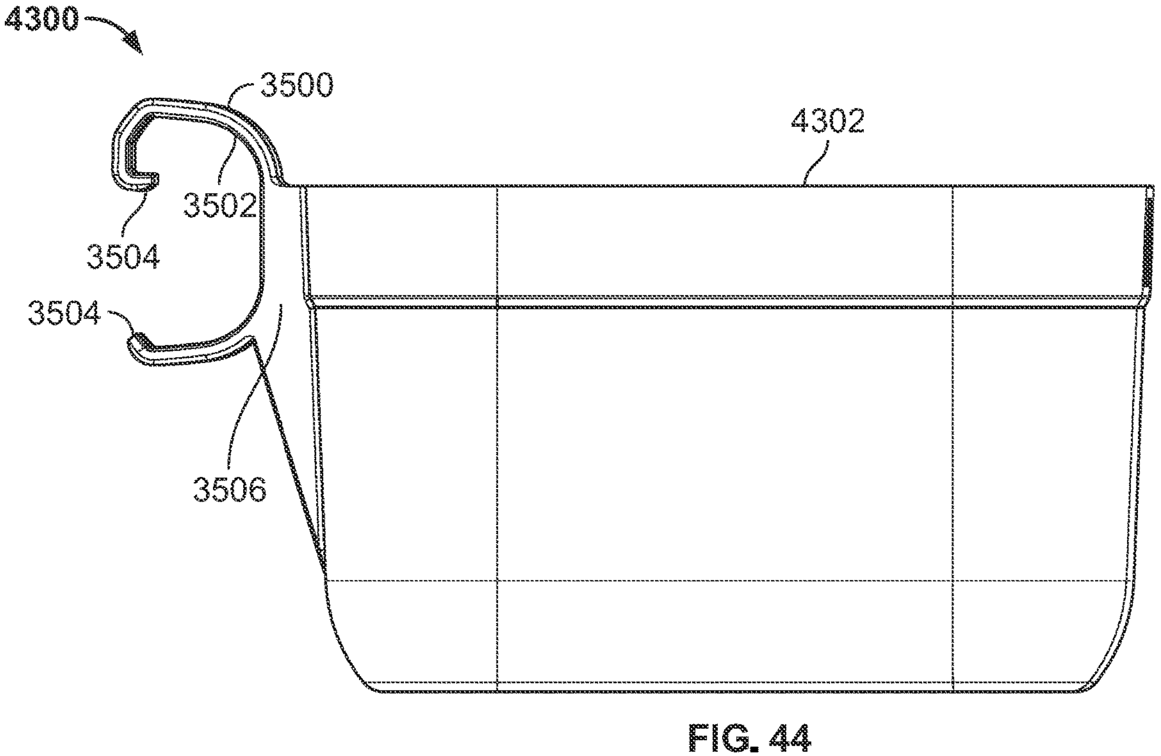
FIG. 44 is a side view of the caddy of FIG. 43.

FIG. 43 is a perspective view of an example caddy 4300 constructed in accordance with the teachings of this disclosure. FIG. 44 is a side view of the caddy 4300 of FIG. 43. In the illustrated example of FIGS. 43 and 44, the caddy 4300 includes two instances of the connector 3500 of FIG. 35, with each such instance of the connector 3500 including the contoured inner surface 3502, the engagement tab(s) 3504, and the coupler 3506 thereof. The caddy 4300 further includes an example basket portion 4302 extending from the coupler 3506 of each connector 3500. The basket portion 4302 of the caddy 4300 is configured to hold, carry, contain, and/or otherwise support one or more item(s) (e.g., bottles, jars, cans, bags, packets, utensils, napkins, etc.) that may be utilized in connection with preparing, cooking, and/or serving food.

The contoured inner surface 3502 of each connector 3500 of the caddy 4300 of FIGS. 43 and 44 is configured to contact and/or otherwise engage the contoured outer surface 802 of the accessory mounting segment 142 of the accessory rail 108 of the accessory support frame 100. The engagement tab(s) 3504 of each connector 3500 of the caddy 4300 of FIGS. 43 and 44 is/are configured to contact and/or otherwise engage corresponding ones of the engagement surface(s) 806 of the accessory mounting segment 142 of the accessory rail 108 of the accessory support frame 100. The caddy 4300 of FIGS. 43 and 44 can accordingly be removably coupled (e.g., via a snap fit) to the accessory mounting segment 142 of the accessory rail 108 of the accessory support frame 100.

Figure 45:
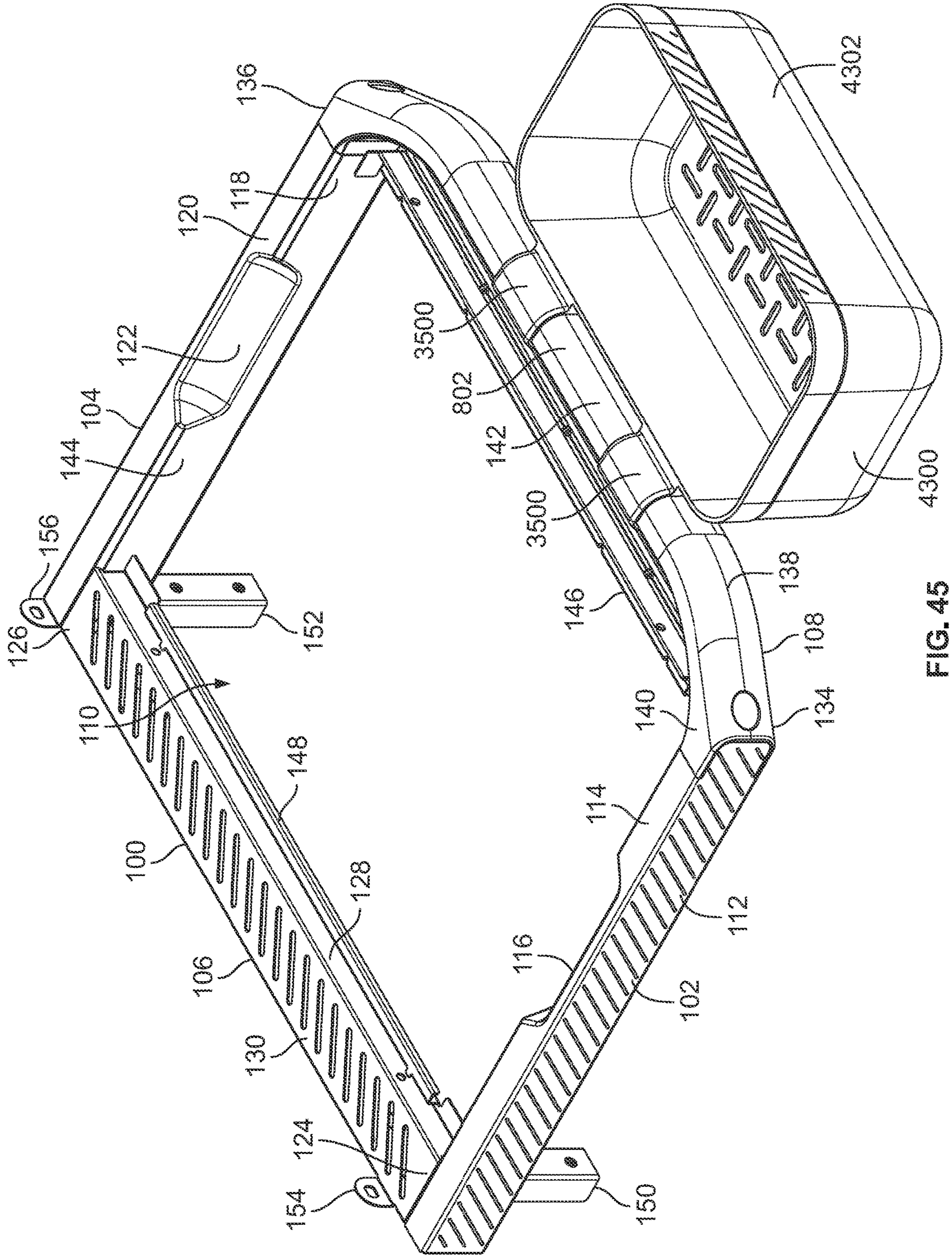
FIG. 45 is a perspective view of the accessory support frame of FIGS. 1-10, with the caddy of FIGS. 43 and 44 shown coupled to the accessory rail of the accessory support frame.

FIG. 45 is a perspective view of the accessory support frame 100 of FIGS. 1-10, with the caddy 4300 of FIGS. 43 and 44 shown coupled to the accessory rail 108 of the accessory support frame 100. In the illustrated example of FIG. 45, the contoured inner surface 3502 of each connector 3500 of the caddy 4300 contacts and/or otherwise engages the contoured outer surface 802 of the accessory mounting segment 142 of the accessory rail 108 of the accessory support frame 100. Furthermore, the engagement tab(s) 3504 of each connector 3500 of the caddy 4300 contact and/or otherwise engage corresponding ones of the engagement surface(s) 806 of the accessory mounting segment 142 of the accessory rail 108 of the accessory support frame 100. As shown in FIG. 45, the caddy 4300 is removably coupled (e.g., via a snap fit) to the accessory mounting segment 142 of the accessory rail 108 of the accessory support frame 100.

The caddy 4300 of FIGS. 43-45 constitutes a third snap fit accessory from among the plurality of snap fit accessories described above, respective ones of which are configured to be interchangeably removably coupled to the accessory mounting segment 142 of the accessory rail 108 of the accessory support frame 100. For example, the tool hook 3700 of FIGS. 37-39, the bottle holder 4000 of FIGS. 40-42, and the caddy 4300 of FIGS. 43-45 constitute snap fit accessories that are interchangeably removably couplable to the accessory mounting segment 142 of the accessory rail 108 of the accessory support frame 100. Other snap fit accessories from among the plurality of snap fit accessories that are interchangeably removably couplable to the accessory mounting segment 142 of the accessory rail 108 of the accessory support frame 100 are further described herein.

Figure 46:
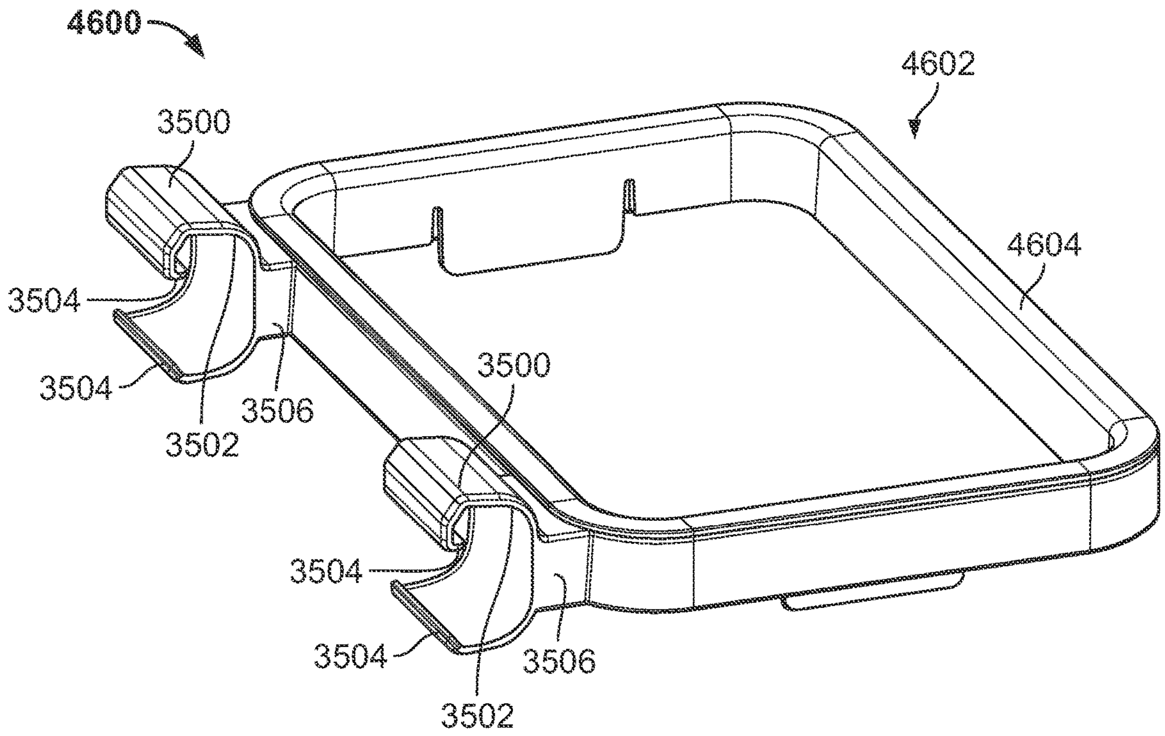
FIG. 46 is a perspective view of an example bag holder constructed in accordance with the teachings of this disclosure.
Figure 47:
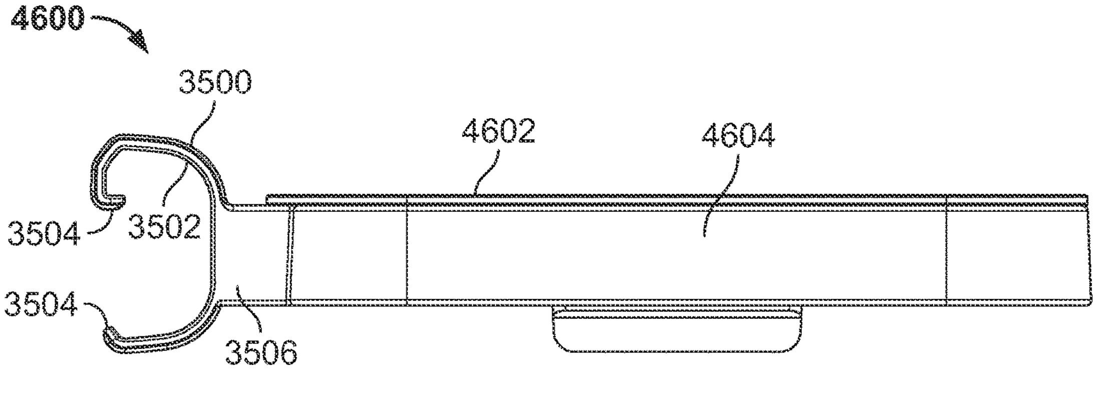
FIG. 47 is a side view of the bag holder of FIG. 46.

FIG. 46 is a perspective view of an example bag holder 4600 constructed in accordance with the teachings of this disclosure. FIG. 47 is a side view of the bag holder 4600 of FIG. 46. In the illustrated example of FIGS. 46 and 47, the bag holder 4600 includes two instances of the connector 3500 of FIG. 35, with each such instance of the connector 3500 including the contoured inner surface 3502, the engagement tab(s) 3504, and the coupler 3506 thereof. The bag holder 4600 further includes an example holder portion 4602 extending from the coupler 3506 of each connector 3500. The holder portion 4602 of the bag holder 4600 of FIGS. 46 and 47 includes an example frame 4604 configured to hold, carry, and/or otherwise support a bag (e.g., a plastic waste disposal bag) that is receivable within, on, and/or around the frame 4604 of the holder portion 4602 of the bag holder 4600. In the illustrated example of FIGS. 46 and 47, the frame 4604 of the holder portion 4602 of the bag holder 4600 has a generally rectangular shape. In other examples, the frame 4604 of the holder portion 4602 of the bag holder 4600 can instead have a shape that is non-rectangular (e.g., circular, oval, triangular, trapezoidal, hexagonal, etc.).

The contoured inner surface 3502 of each connector 3500 of the bag holder 4600 of FIGS. 46 and 47 is configured to contact and/or otherwise engage the contoured outer surface 802 of the accessory mounting segment 142 of the accessory rail 108 of the accessory support frame 100. The engagement tab(s) 3504 of each connector 3500 of the bag holder 4600 of FIGS. 46 and 47 is/are configured to contact and/or otherwise engage corresponding ones of the engagement surface(s) 806 of the accessory mounting segment 142 of the accessory rail 108 of the accessory support frame 100. The bag holder 4600 of FIGS. 46 and 47 can accordingly be removably coupled (e.g., via a snap fit) to the accessory mounting segment 142 of the accessory rail 108 of the accessory support frame 100.

Figure 48:
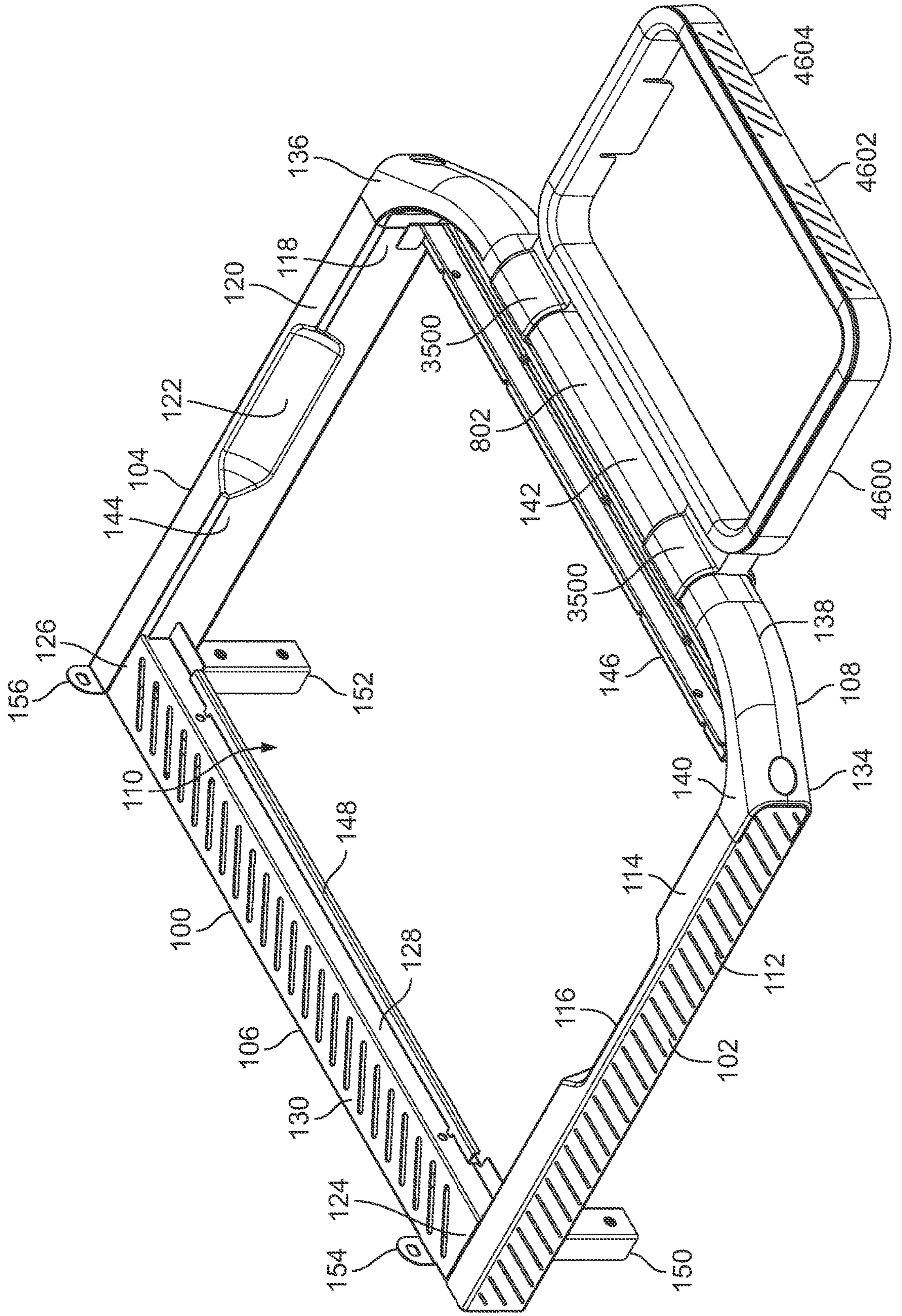
FIG. 48 is a perspective view of the accessory support frame of FIGS. 1-10, with the bag holder of FIGS. 46 and 47 shown coupled to the accessory rail of the accessory support frame.

FIG. 48 is a perspective view of the accessory support frame 100 of FIGS. 1-10, with the bag holder 4600 of FIGS. 46 and 47 shown coupled to the accessory rail 108 of the accessory support frame 100. In the illustrated example of FIG. 48, the contoured inner surface 3502 of each connector 3500 of the bag holder 4600 contacts and/or otherwise engages the contoured outer surface 802 of the accessory mounting segment 142 of the accessory rail 108 of the accessory support frame 100. Furthermore, the engagement tab(s) 3504 of each connector 3500 of the bag holder 4600 contact and/or otherwise engage corresponding ones of the engagement surface(s) 806 of the accessory mounting segment 142 of the accessory rail 108 of the accessory support frame 100. As shown in FIG. 48, the bag holder 4600 is removably coupled (e.g., via a snap fit) to the accessory mounting segment 142 of the accessory rail 108 of the accessory support frame 100.

The bag holder 4600 of FIGS. 46-48 constitutes a fourth snap fit accessory from among the plurality of snap fit accessories described above, respective ones of which are configured to be interchangeably removably coupled to the accessory mounting segment 142 of the accessory rail 108 of the accessory support frame 100. For example, the tool hook 3700 of FIGS. 37-39, the bottle holder 4000 of FIGS. 40-42, the caddy 4300 of FIGS. 43-45, and the bag holder 4600 of FIGS. 46-48 constitute snap fit accessories that are interchangeably removably couplable to the accessory mounting segment 142 of the accessory rail 108 of the accessory support frame 100. Other snap fit accessories from among the plurality of snap fit accessories that are interchangeably removably couplable to the accessory mounting segment 142 of the accessory rail 108 of the accessory support frame 100 are further described herein.

Figure 49:
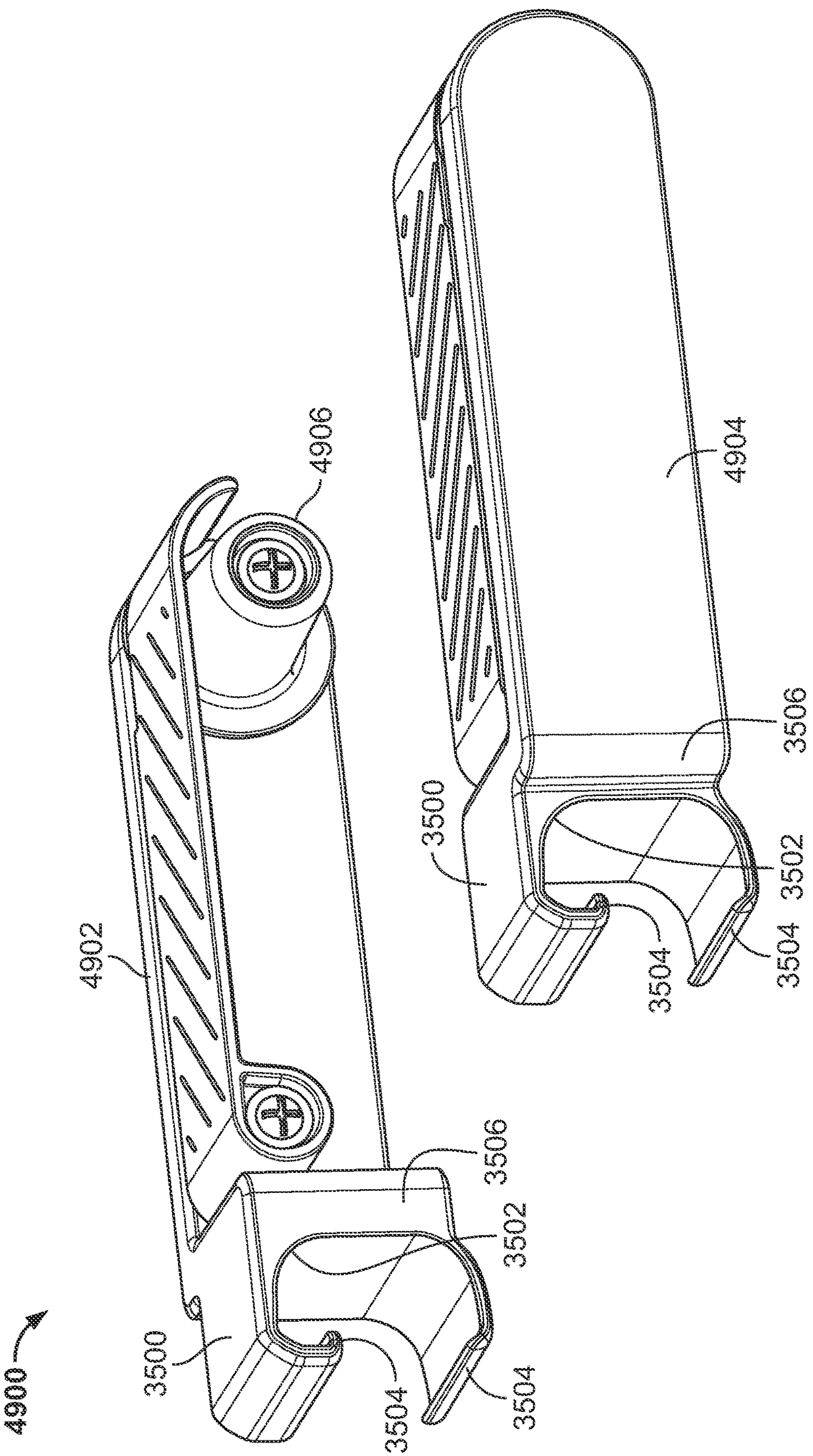
FIG. 49 is a perspective view of an example roll holder constructed in accordance with the teachings of this disclosure.
Figure 50:
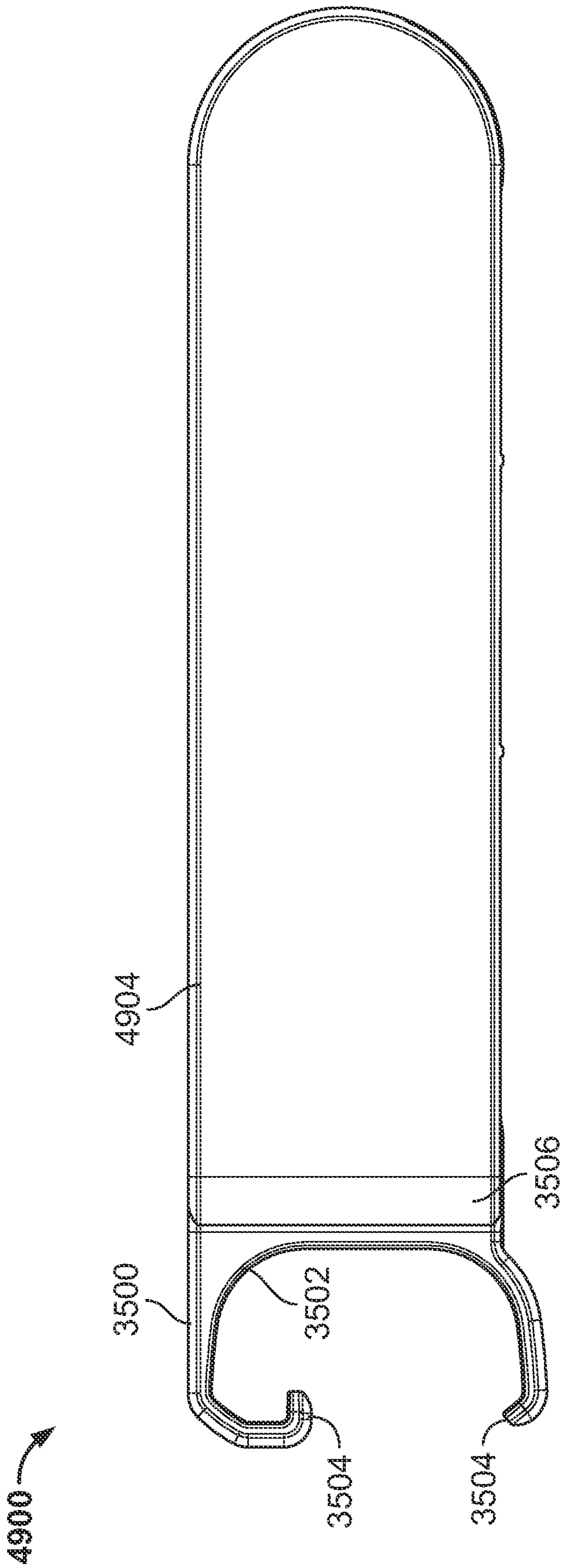
FIG. 50 is a side view of the roll holder of FIG. 49.

FIG. 49 is a perspective view of an example roll holder 4900 constructed in accordance with the teachings of this disclosure. FIG. 50 is a side view of the roll holder 4900 of FIG. 49. In the illustrated example of FIGS. 49 and 50, the roll holder 4900 includes two instances of the connector 3500 of FIG. 35, with each such instance of the connector 3500 including the contoured inner surface 3502, the engagement tab(s) 3504, and the coupler 3506 thereof. The roll holder 4900 further includes an example first holding arm 4902 extending from the coupler 3506 of a first one of the two connectors 3500, and an example second holding arm 4904 (e.g., separate from the first holding arm 4902) extending from the coupler 3506 of a second one of the two connectors 3500. The first holding arm 4902 and the second holding arm 4904 of the roll holder 4900 of FIGS. 49 and 50 each include an example spindle 4906 configured to hold, carry, and/or otherwise support a roll of material (e.g., a paper towel roll, a butcher paper roll, etc.). When installed on the roll holder 4900 of FIGS. 49 and 50, the roll of material is located between the first holding arm 4902 and the second holding arm 4904 of the roll holder 4900 such that each spindle 4906 of the first holding arm 4902 and the second holding arm 4904 is disposed within a corresponding open end (e.g., a first open end or a second open end) of the roll of material, and such that the roll of material is rotatable relative to the first holding arm 4902 and the second holding arm 4904 about an axis of rotation defined by the spindles 4906 of the first holding arm 4902 and the second holding arm 4904.

The contoured inner surface 3502 of each connector 3500 of the roll holder 4900 of FIGS. 49 and 50 is configured to contact and/or otherwise engage the contoured outer surface 802 of the accessory mounting segment 142 of the accessory rail 108 of the accessory support frame 100. The engagement tab(s) 3504 of each connector 3500 of the roll holder 4900 of FIGS. 49 and 50 is/are configured to contact and/or otherwise engage corresponding ones of the engagement surface(s) 806 of the accessory mounting segment 142 of the accessory rail 108 of the accessory support frame 100. The roll holder 4900 of FIGS. 49 and 50 can accordingly be removably coupled (e.g., via a snap fit) to the accessory mounting segment 142 of the accessory rail 108 of the accessory support frame 100.

Figure 51:
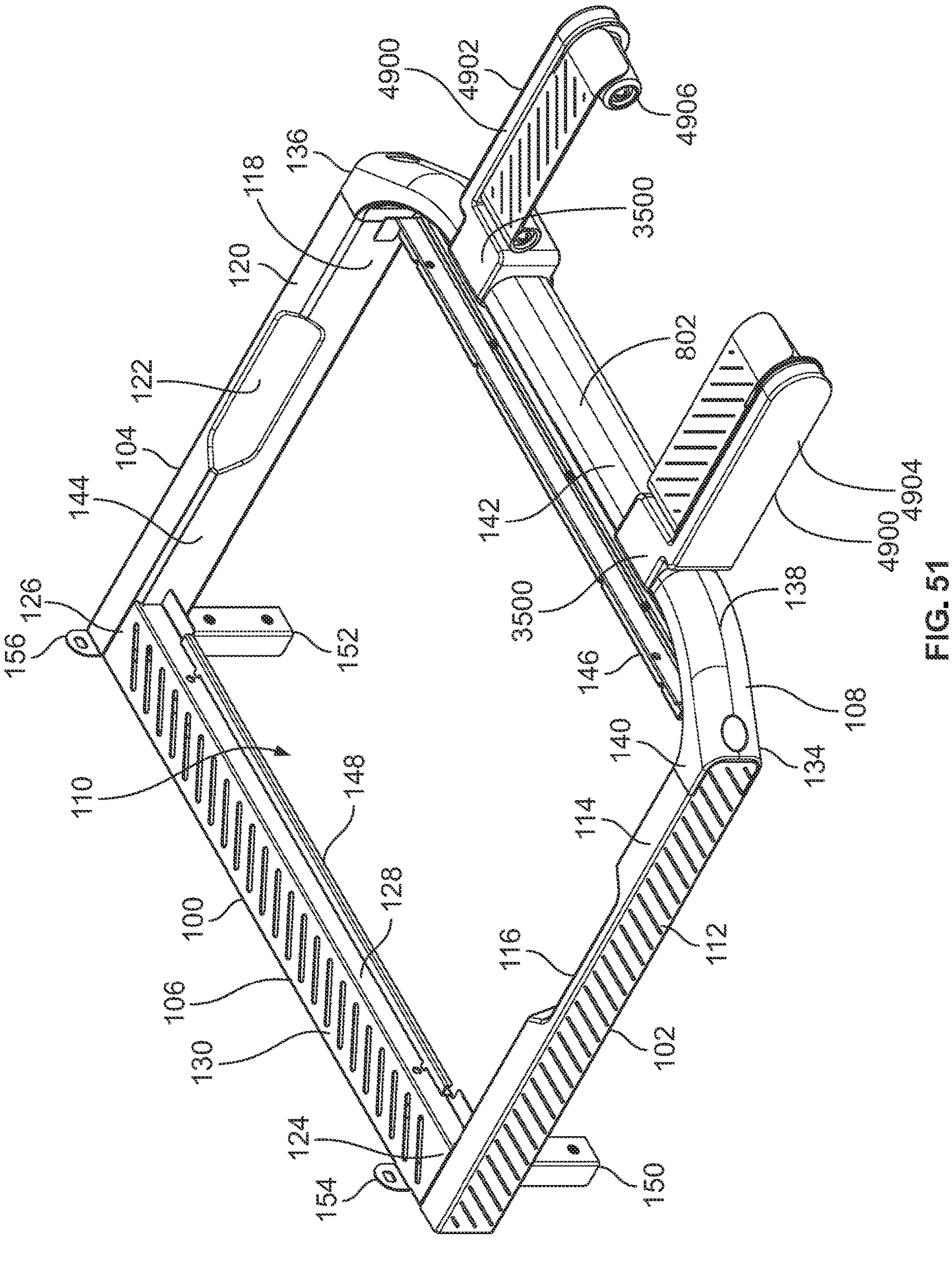
FIG. 51 is a perspective view of the accessory support frame of FIGS. 1-10, with the roll holder of FIGS. 49 and 50 shown coupled to the accessory rail of the accessory support frame.

FIG. 51 is a perspective view of the accessory support frame 100 of FIGS. 1-10, with the roll holder 4900 of FIGS. 49 and 50 shown coupled to the accessory rail 108 of the accessory support frame 100. In the illustrated example of FIG. 51, the contoured inner surface 3502 of each connector 3500 of the roll holder 4900 contacts and/or otherwise engages the contoured outer surface 802 of the accessory mounting segment 142 of the accessory rail 108 of the accessory support frame 100. Furthermore, the engagement tab(s) 3504 of each connector 3500 of the roll holder 4900 contact and/or otherwise engage corresponding ones of the engagement surface(s) 806 of the accessory mounting segment 142 of the accessory rail 108 of the accessory support frame 100. As shown in FIG. 51, the roll holder 4900 is removably coupled (e.g., via a snap fit) to the accessory mounting segment 142 of the accessory rail 108 of the accessory support frame 100.

The roll holder 4900 of FIGS. 49-51 constitutes a fifth snap fit accessory from among the plurality of snap fit accessories described above, respective ones of which are configured to be interchangeably removably coupled to the accessory mounting segment 142 of the accessory rail 108 of the accessory support frame 100. For example, the tool hook 3700 of FIGS. 37-39, the bottle holder 4000 of FIGS. 40-42, the caddy 4300 of FIGS. 43-45, the bag holder 4600 of FIGS. 46-48, and the roll holder 4900 of FIGS. 49-51 constitute snap fit accessories that are interchangeably removably couplable to the accessory mounting segment 142 of the accessory rail 108 of the accessory support frame 100. Other snap fit accessories not expressly described herein can also be included among the plurality of snap fit accessories that are interchangeably removably couplable to the accessory mounting segment 142 of the accessory rail 108 of the accessory support frame 100. Such other snap fit accessories can be constructed by integrating, attaching, and/or otherwise incorporating one or more instance(s) of the connector 3500 of FIG. 35 to a surface (e.g., a side surface) of an accessory, thereby forming a snap fit accessory that is interchangeably removably couplable to the accessory mounting segment 142 of the accessory rail 108 of the accessory support frame 100.

The ability of the accessory support frame 100 to interchangeably receive (e.g., via the inset region 110) respective ones of the above-described insertable accessories (e.g., the tabletop 1100 of FIGS. 11-14, the cutting board 1500 of FIGS. 15-18, the storage bin 1900 of FIGS. 19-24, the cutting board 2500 of FIGS. 25 and 26, the basin 2700 of FIGS. 27 and 28, the caddy 2900 of FIGS. 29 and 30, and the tray 3100 of FIGS. 31 and 32), and to interchangeably removably couple (e.g., via the accessory mounting segment 142 of the accessory rail 108) respective ones of the above-described snap fit accessories (e.g., the tool hook 3700 of FIGS. 37-39, the bottle holder 4000 of FIGS. 40-42, the caddy 4300 of FIGS. 43-45, the bag holder 4600 of FIGS. 46-48, and the roll holder 4900 of FIGS. 49-51) advantageously facilitates a myriad of accessory combinations and/or accessory arrangements. The example accessory combinations and/or accessory arrangements described herein are representative in nature, and are not intended to exhaustively address the many accessory combinations and/or accessory arrangements that are made possible by the disclosed accessory support frame 100, the disclosed insertable accessories, and/or the disclosed snap fit accessories.

Figure 52:
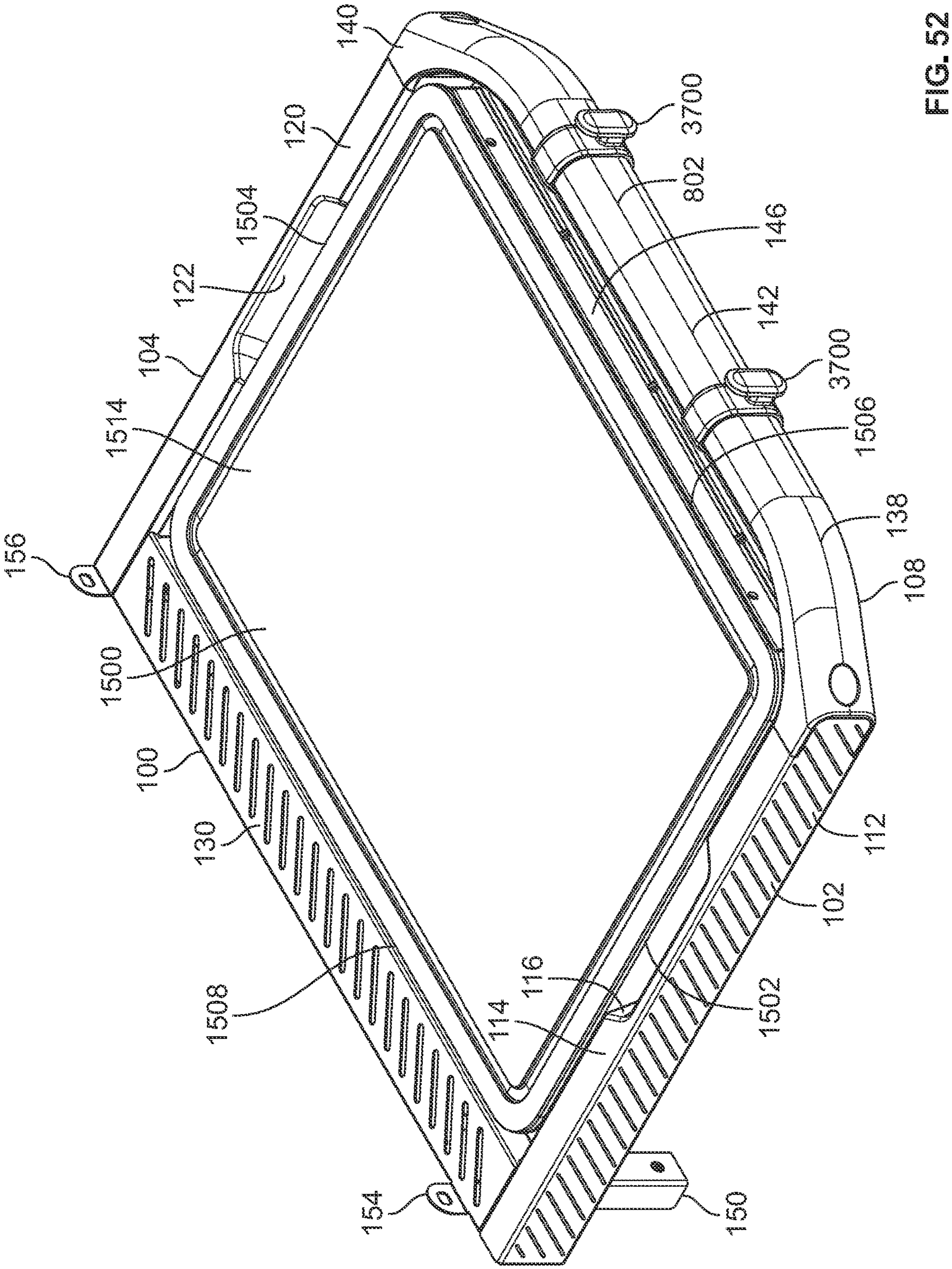
FIG. 52 is a perspective view of the accessory support frame of FIGS. 1-10, with the cutting board of FIGS. 15-18 shown inserted into the inset region of the accessory support frame, and with the tool hook of FIGS. 37-39 shown coupled to the accessory rail of the accessory support frame.

FIG. 52 is a perspective view of the accessory support frame 100 of FIGS. 1-10, with the cutting board 1500 of FIGS. 15-18 shown inserted into the inset region 110 of the accessory support frame 100, and with two instances of the tool hook 3700 of FIGS. 37-39 shown coupled to the accessory rail 108 of the accessory support frame 100. In the illustrated example of FIG. 52, either instance of the tool hook 3700 can be removed from the accessory mounting segment 142 of the accessory rail 108 of the accessory support frame 100 while the cutting board 1500 remains inserted into and/or otherwise located within the inset region 110 of the accessory support frame 100. Conversely, the cutting board 1500 can be removed from the inset region 110 of the accessory support frame 100 while either or both instances of the tool hook 3700 remain(s) coupled to the accessory mounting segment 142 of the accessory rail 108 of the accessory support frame 100.

Figure 53:
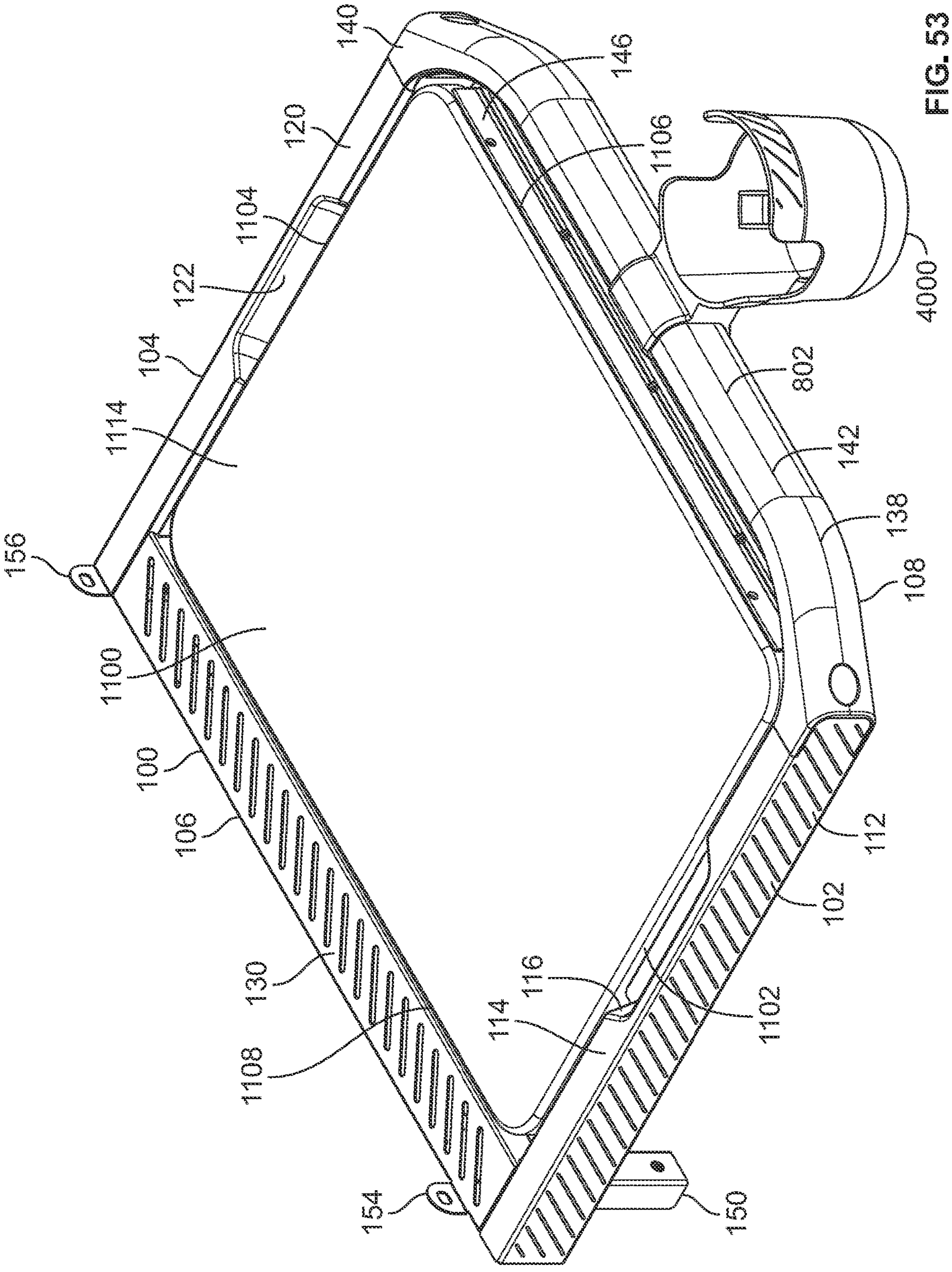
FIG. 53 is a perspective view of the accessory support frame of FIGS. 1-10, with the tabletop of FIGS. 11-14 shown inserted into the inset region of the accessory support frame, and with the bottle holder of FIGS. 40-42 shown coupled to the accessory rail of the accessory support frame.

FIG. 53 is a perspective view of the accessory support frame 100 of FIGS. 1-10, with the tabletop 1100 of FIGS. 11-14 shown inserted into the inset region 110 of the accessory support frame 100, and with the bottle holder 4000 of FIGS. 40-42 shown coupled to the accessory rail 108 of the accessory support frame 100. In the illustrated example of FIG. 53, the bottle holder 4000 can be removed from the accessory mounting segment 142 of the accessory rail 108 of the accessory support frame 100 while the tabletop 1100 remains inserted into and/or otherwise located within the inset region 110 of the accessory support frame 100. Conversely, the tabletop 1100 can be removed from the inset region 110 of the accessory support frame 100 while the bottle holder 4000 remain(s) coupled to the accessory mounting segment 142 of the accessory rail 108 of the accessory support frame 100.

Figure 54:
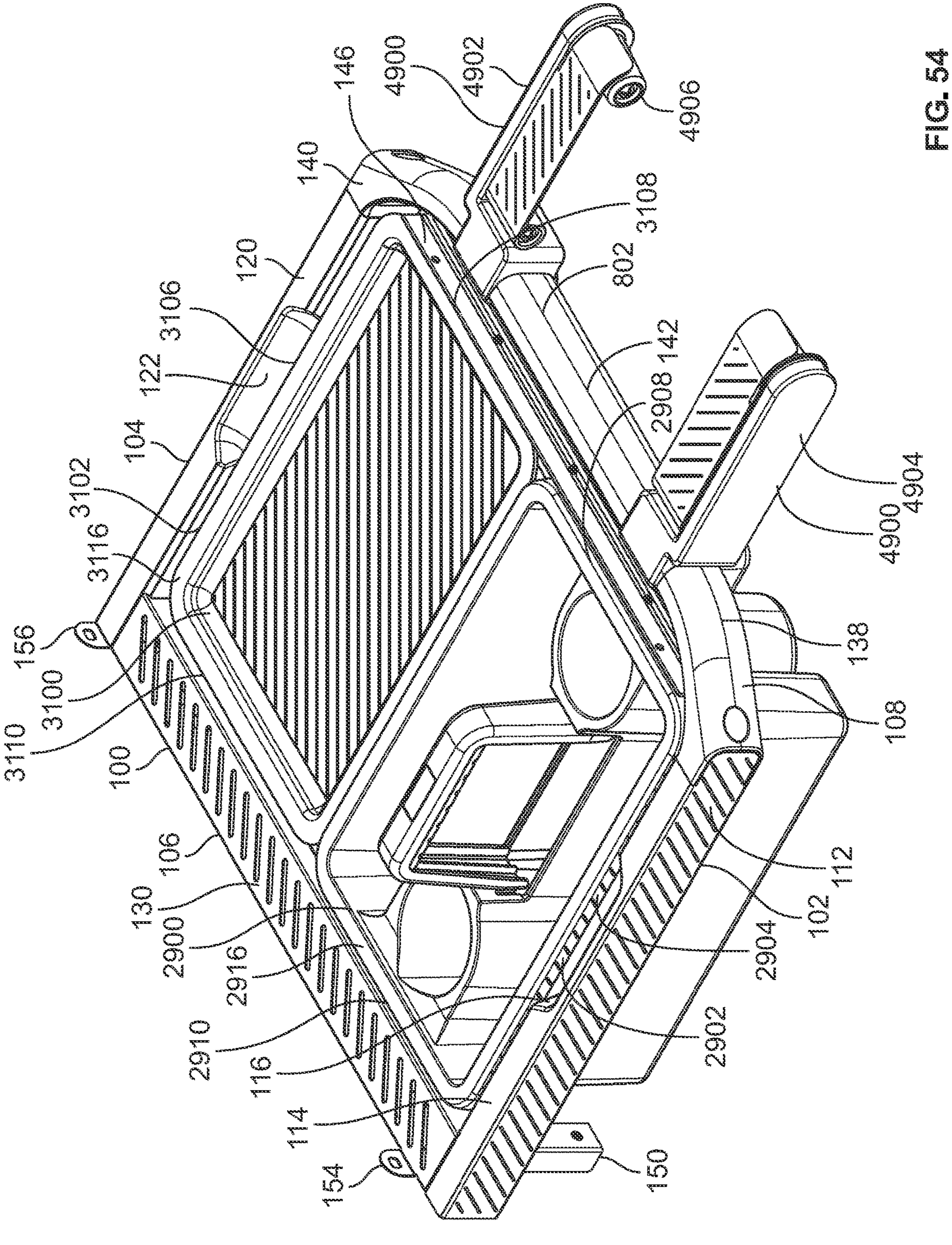
FIG. 54 is a perspective view of the accessory support frame of FIGS. 1-10, with the caddy of FIGS. 29, 30, and 33 and the tray of FIGS. 31-33 shown inserted into the inset region of the accessory support frame, and with the roll holder of FIGS. 49-51 shown coupled to the accessory rail of the accessory support frame.

FIG. 54 is a perspective view of the accessory support frame 100 of FIGS. 1-10, with the caddy 2900 of FIGS. 29, 30, and 33 and the tray 3100 of FIGS. 31-33 shown inserted into the inset region 110 of the accessory support frame 100, and with the roll holder 4900 of FIGS. 49-51 shown coupled to the accessory rail 108 of the accessory support frame 100. In the illustrated example of FIG. 54, the roll holder 4900 can be removed from the accessory mounting segment 142 of the accessory rail 108 of the accessory support frame 100 while the caddy 2900 and/or the tray 3100 remain(s) inserted into and/or otherwise located within the inset region 110 of the accessory support frame 100. Conversely, the caddy 2900 and/or the tray 3100 can be removed from the inset region 110 of the accessory support frame 100 while the roll holder 4900 remains coupled to the accessory mounting segment 142 of the accessory rail 108 of the accessory support frame 100.

The accessory support frame 100 of FIGS. 1-10 is configured to be coupled to a grill at a position that might conventionally be occupied by a side table of the grill. For example, as shown and described above, the accessory support frame 100 of FIGS. 1-10 is configured to be coupled to a right side of a grill at a position that might conventionally be occupied by a right side table of the grill. In some examples, a second accessory support frame constructed as a mirror image of the accessory support frame 100 of FIGS. 1-10 is configured to be coupled to a left side of a grill at a position that might conventionally be occupied by a left side table of the grill. The accessory support frame 100 of FIGS. 1-10 can be coupled to any type of grill (e.g., a gas grill, a charcoal grill, a pellet grill, an electric grill, etc.). Example grills incorporating at least one instance of the accessory support frame 100 of FIGS. 1-10 are described herein in connection with FIGS. 55-65. In such examples, it is to be understood that the accessory support frame 100, once coupled to the grill, can include, carry, and/or otherwise support any combinations, configurations, and/or arrangements of (1) the above-described insertable accessories (e.g., the tabletop 1100 of FIGS. 11-14, the cutting board 1500 of FIGS. 15-18, the storage bin 1900 of FIGS. 19-24, the cutting board 2500 of FIGS. 25 and 26, the basin 2700 of FIGS. 27 and 28, the caddy 2900 of FIGS. 29 and 30, and the tray 3100 of FIGS. 31 and 32) that are interchangeably insertable into and/or locatable within the inset region 110 of the accessory support frame 100, and/or (2) the above-described interchangeable snap fit accessories (e.g., the tool hook 3700 of FIGS. 37-39, the bottle holder 4000 of FIGS. 40-42, the caddy 4300 of FIGS. 43-45, the bag holder 4600 of FIGS. 46-48, and the roll holder 4900 of FIGS. 49-51) that are interchangeably removably couplable to the accessory mounting segment 142 of the accessory rail 108 of the accessory support frame 100.

Figure 55:
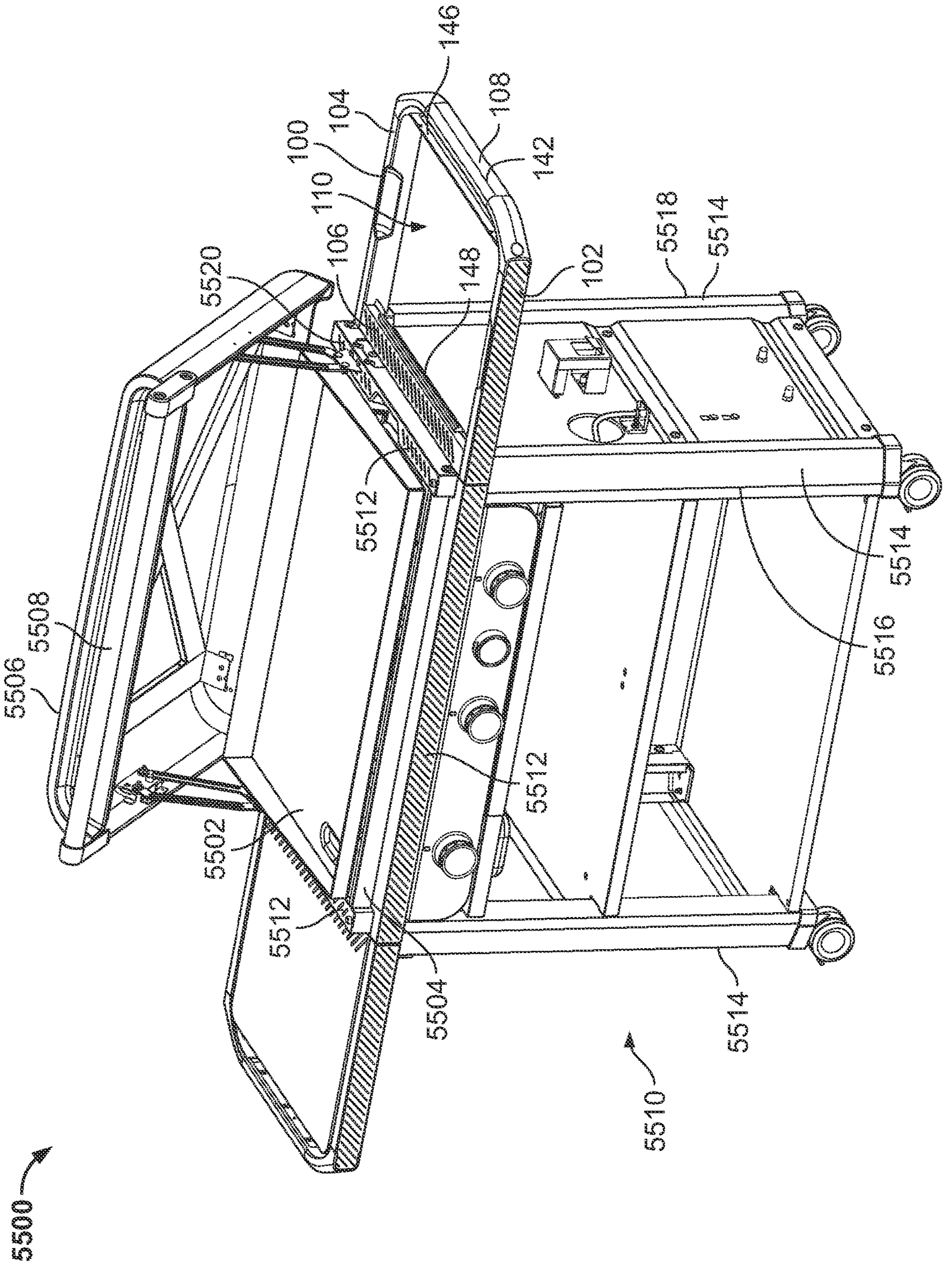
FIG. 55 is a perspective view of an example grill including the accessory support frame of FIGS. 1-10.
Figure 56:
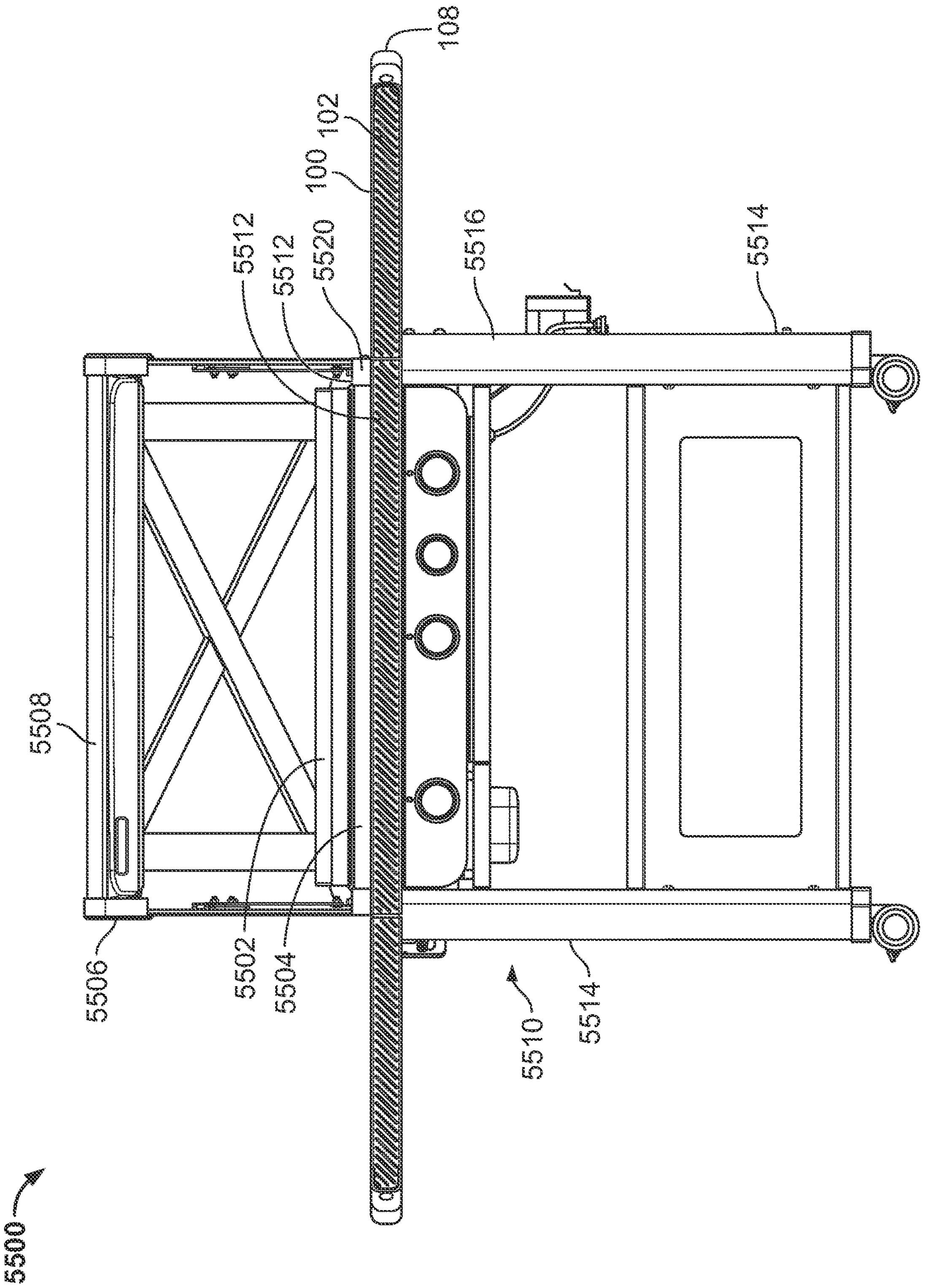
FIG. 56 is a front view of the grill of FIG. 55.
Figure 57:
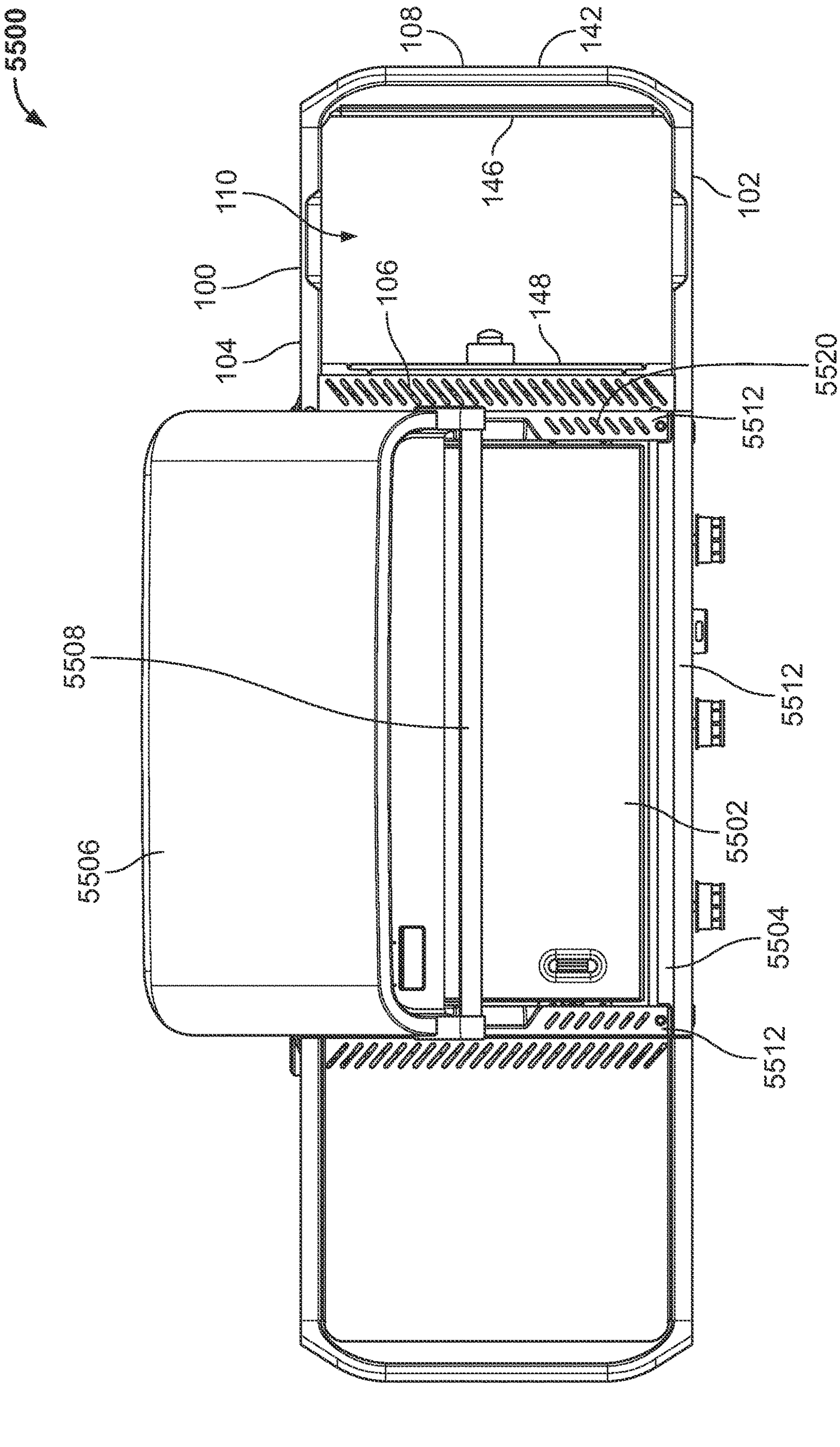
FIG. 57 is a top view of the grill of FIGS. 55 and 56.

FIG. 55 is a perspective view of an example grill 5500 including the accessory support frame 100 of FIGS. 1-10. FIG. 56 is a front view of the grill 5500 of FIG. 55. FIG. 57 is a top view of the grill 5500 of FIGS. 55 and 56. In the illustrated example of FIGS. 55-57, the grill 5500 is a gas grill having an example flattop griddle cooking surface 5502. In other examples, the grill 5500 can be a different type of grill (e.g., a charcoal grill, a pellet grill, an electric grill, etc.), and/or can have a different type of cooking surface (e.g., a cooking grate, a baking stone, a rotisserie system, etc.). The grill 5500 of FIGS. 55-57 includes an example cookbox 5504 configured to cook one or more item(s) of food. The cookbox 5504 supports the flattop griddle cooking surface 5502 of the grill 5500. In some examples, the cookbox 5504 houses, carries, and/or supports one or more burner(s), one or more grease deflector(s), and/or one or more heat diffuser(s) located and/or positioned within the cookbox 5504 below the flattop griddle cooking surface 5502.

The grill 5500 of FIGS. 55-57 further includes an example lid 5506 configured to cover and/or enclose the cookbox 5504 of the grill 5500 when the lid 5506 is in a closed position. The lid 5506 is movable relative to the cookbox 5504 between a closed position and an open position in which the flattop griddle cooking surface 5502 located on the cookbox 5504 is exposed. In the illustrated example of FIGS. 55-57, the lid 5506 is pivotally coupled to the cookbox 5504 via one or more hinge(s) and/or pivot(s) that mechanically couple the lid 5506 to the cookbox 5504. Movement of the lid 5506 of the grill 5500 between the closed position and the open position can be facilitated via user interaction with an example handle 5508 that is coupled to the lid 5506.

The grill 5500 of FIGS. 55-57 further includes an example frame 5510 having one or more support member(s) configured to support the cookbox 5504. For example, as shown in FIGS. 55-57, the frame 5510 includes one or more example horizontally-oriented support member(s) 5512 that border the cookbox 5504, and one or more vertically-oriented support member(s) 5514 (e.g., one or more leg(s)) that are configured to support the cookbox 5504 above an underlying ground surface. The horizontally-oriented support member(s) 5512, the vertically-oriented support member(s) 5514 and/or, more generally, the frame 5510 can be configured from any number and any type of structural components arranged in any manner that facilitates supporting the cookbox 5504 above an underlying ground surface when the grill 5500 is in use.

In the illustrated example of FIGS. 55-57, the accessory support frame 100 is coupled to the frame 5510 of the grill 5500, with the accessory support frame 100 being located to the right side of the cookbox 5504 at a position that would conventionally be occupied by a right side table of the grill 5500. When the accessory support frame 100 is coupled to the grill 5500 as shown in FIGS. 55-57, the side support 106 of the accessory support frame 100 is oriented toward and/or located proximal relative to the cookbox 5504 and/or one the frame 5510 of the grill 5500, and the accessory rail 108 of the accessory support frame 100 is oriented away from and/or located distal relative to the cookbox 5504 and/or the frame 5510 of the grill 5500.

In the illustrated example of FIGS. 55-57, the accessory support frame 100 is coupled to the grill 5500 via the first mounting leg 150, the second mounting leg 152, the first mounting tab 154, and the second mounting tab 156 of the accessory support frame 100. More specifically, the first mounting leg 150 of the accessory support frame 100 is disposed within and coupled to a first one of the vertically-oriented support member(s) 5514 (e.g., a front right leg 5516) of the frame 5510 of the grill 5500, and the second mounting leg 152 of the accessory support frame 100 is disposed within and coupled to a second one of the vertically-oriented support member(s) 5514 (e.g., a rear right leg 5518) of the frame 5510 of the grill 5500. The first mounting tab 154 and the second mounting tab 156 of the accessory support frame 100 are coupled to a first one of the horizontally-oriented support member(s) 5512 (e.g., a right side support 5520) of the frame 5510 of the grill 5500.

Figure 58:
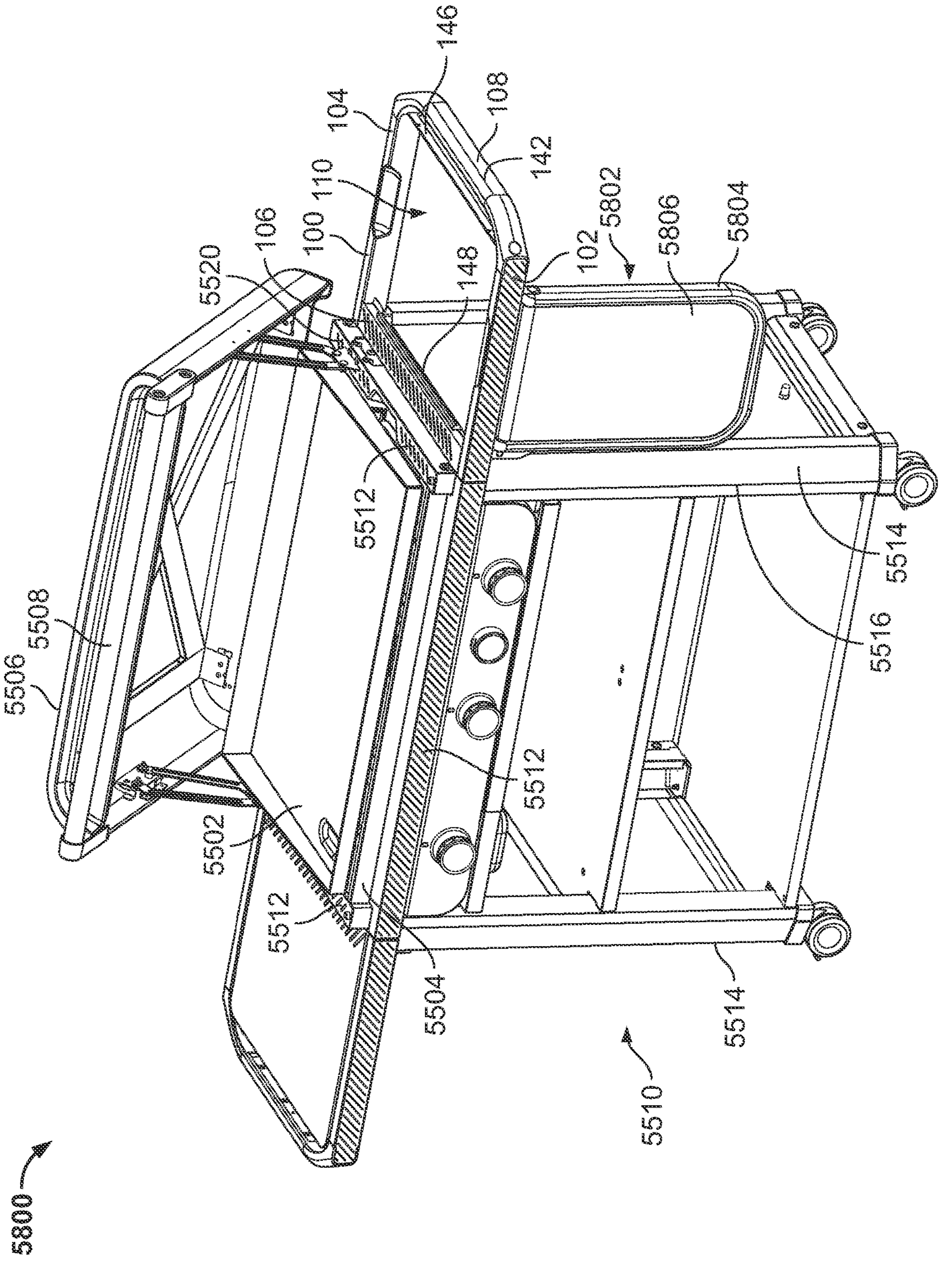
FIG. 58 is a perspective view of another example grill including the accessory support frame of FIGS. 1-10.
Figure 59:
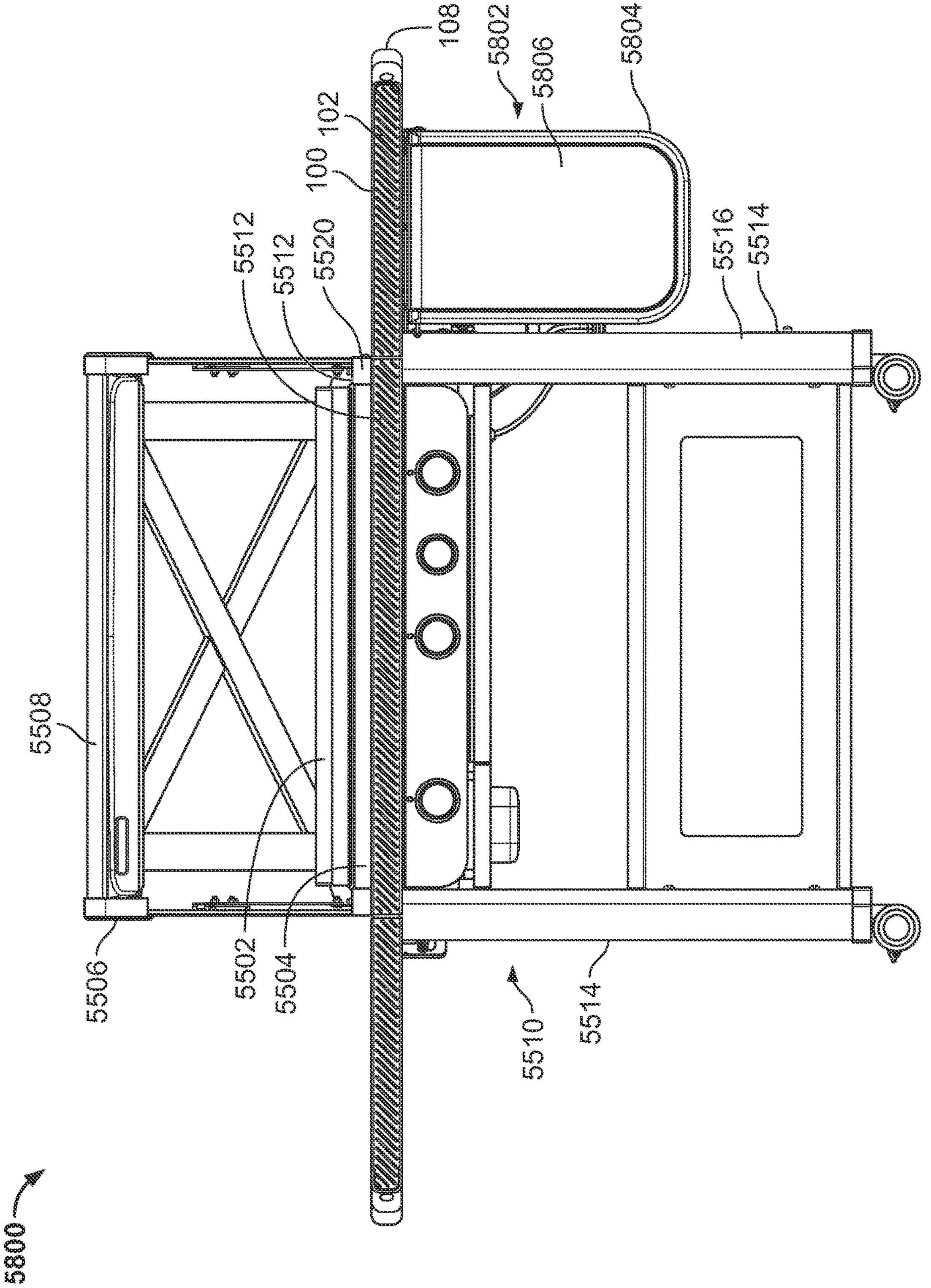
FIG. 59 is a front view of the grill of FIG. 58.

FIG. 58 is a perspective view of another example grill 5800 including the accessory support frame 100 of FIGS. 1-10. FIG. 59 is a front view of the grill 5800 of FIG. 58. The grill 5800 of FIGS. 58 and 59 includes the flattop griddle cooking surface 5502, the cookbox 5504, the lid 5506, and the frame 5510 of the grill 5500 of FIGS. 55-57 described above. In the illustrated example of FIGS. 58 and 59, the accessory support frame 100 further includes an example auxiliary shelf 5802 having an example frame 5804 and an example tabletop 5806 supported by the frame 5804. The frame 5804 of the auxiliary shelf 5802 is pivotally coupled to the front support 102 of the accessory support frame 100. For example, as shown in FIGS. 58 and 59, the frame 5804 of the auxiliary shelf 5802 is pivotally coupled to the lower surface 302 of the front support 102 of the accessory support frame 100. The frame 5804 of the auxiliary shelf 5802 of FIGS. 58 and 59 is movable (e.g. rotatable) between a stowed position (e.g., a vertically-oriented position) in which the frame 5804 and/or the tabletop 5806 of the auxiliary shelf 5802 is/are generally located below the front support 102 of the accessory support frame 100 (e.g., as shown in FIGS. 58 and 59), and a deployed position (e.g., a horizontally-oriented position) in which the frame 5804 and/or the tabletop 5806 of the auxiliary shelf 5802 is/are generally located forward of the front support 102 of the accessory support frame 100. The frame 5804 of the auxiliary shelf 5802 is movable between the stowed position and the deployed position without disturbing and/or interfering with the ability to insert any of the above-described insertable accessories (e.g., the tabletop 1100 of FIGS. 11-14, the cutting board 1500 of FIGS. 15-18, the storage bin 1900 of FIGS. 19-24, the cutting board 2500 of FIGS. 25 and 26, the basin 2700 of FIGS. 27 and 28, the caddy 2900 of FIGS. 29 and 30, and the tray 3100 of FIGS. 31 and 32) into the inset region 110 of the accessory support frame 100.

Figure 60:
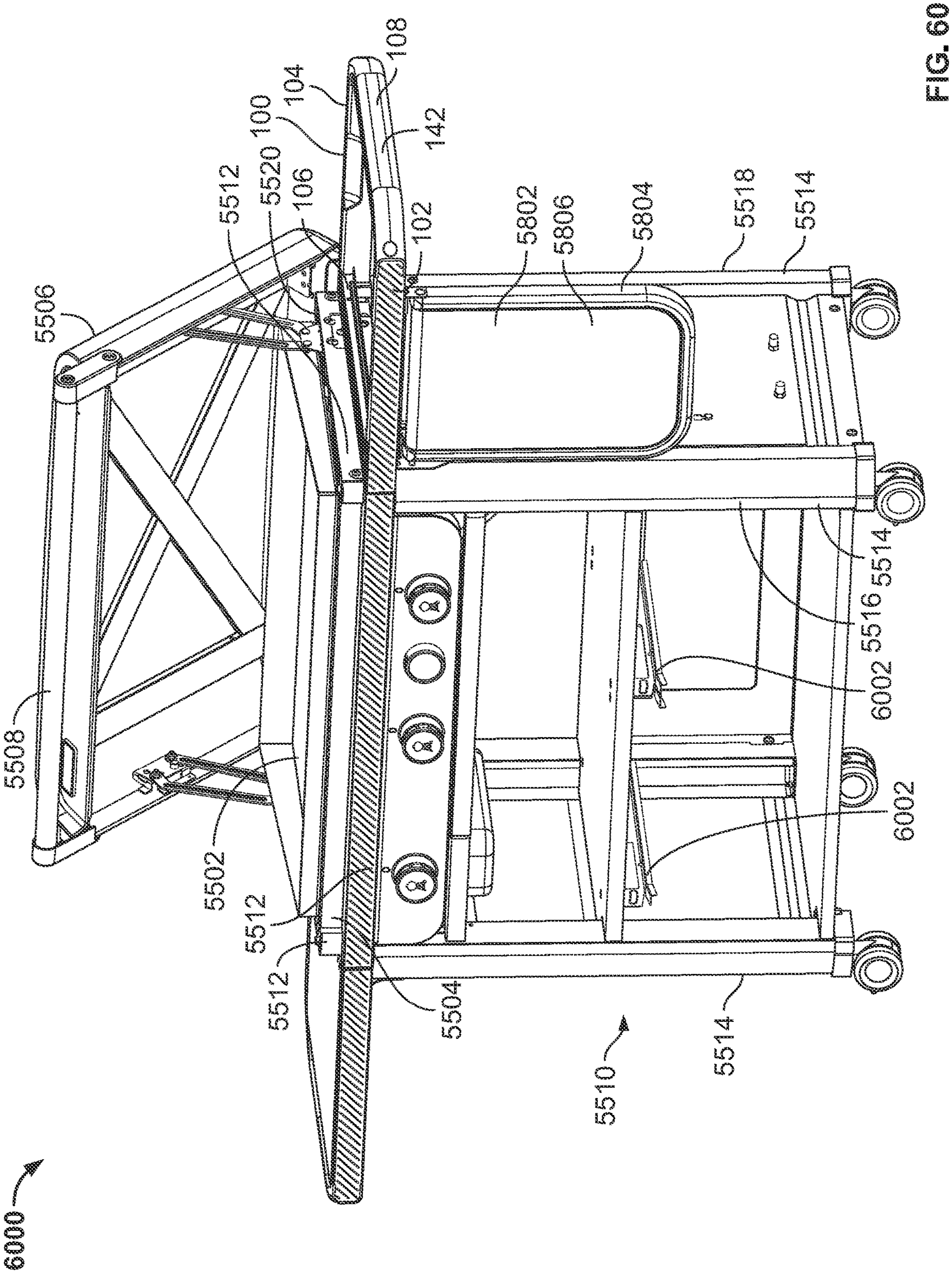
FIG. 60 is a perspective view of another example grill including the accessory support frame of FIGS. 1-10.
Figure 61:
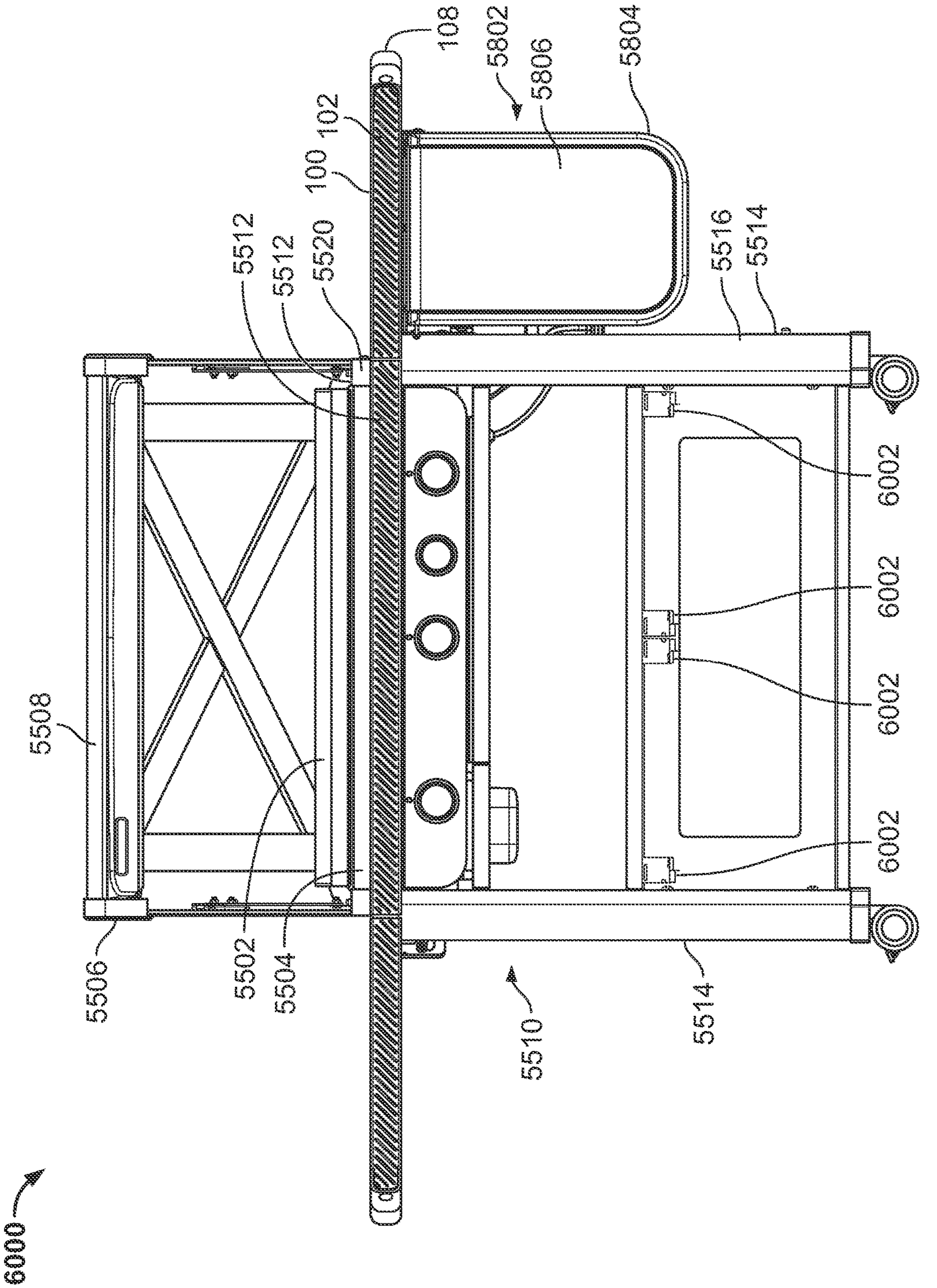
FIG. 61 is a front view of the grill of FIG. 60.
Figure 62:
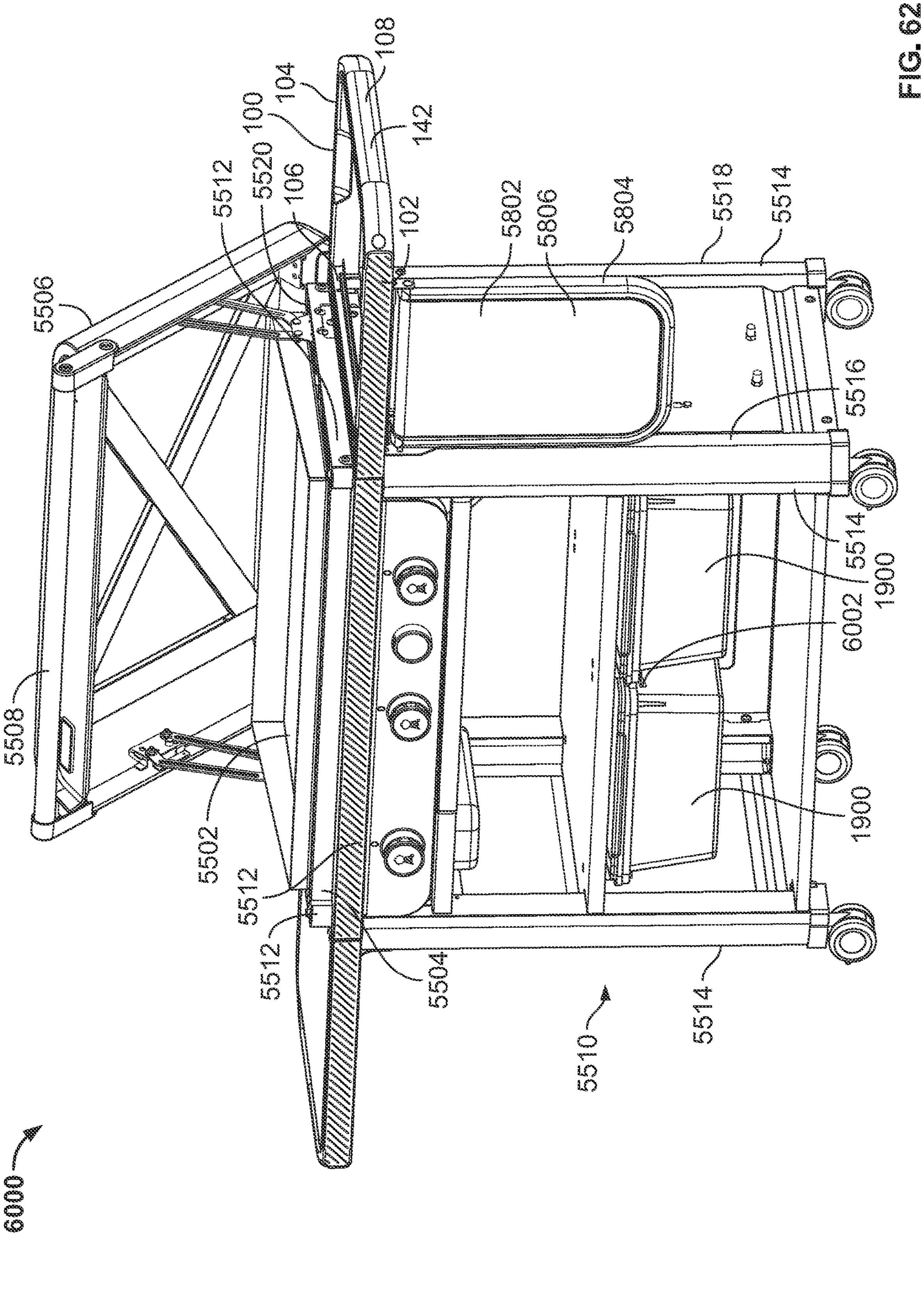
FIG. 62 is another perspective view of the grill of FIGS. 60 and 61, with example storage bins shown seated on the storage rails of the grill.
Figure 63:
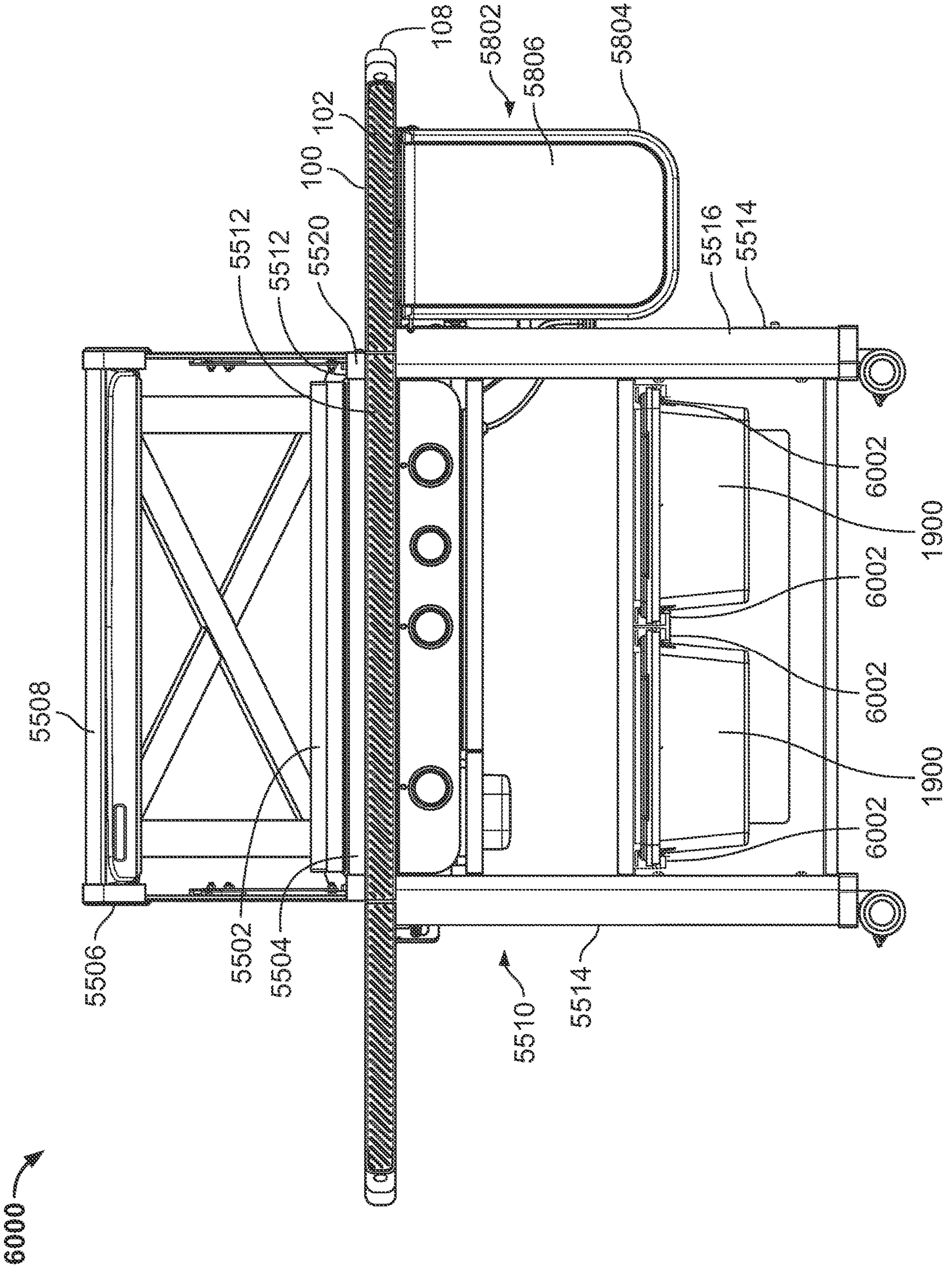
FIG. 63 is another front view of the grill of FIGS. 60-62, with the storage bins shown seated on the storage rails of the grill.

FIG. 60 is a perspective view of another example grill 6000 including the accessory support frame of FIGS. 1-10. FIG. 61 is a front view of the grill 6000 of FIG. 60. The grill 6000 of FIGS. 60 and 61 includes the flattop griddle cooking surface 5502, the cookbox 5504, the lid 5506, and the frame 5510 of the grill 5500 of FIGS. 55-57 described above, and also includes the auxiliary shelf 5802 of the grill 5800 of FIGS. 58 and 59 described above. In the illustrated example of FIGS. 60 and 61, the frame 5510 of the grill 6000 further includes example storage rails 6002 configured to support one or more of the above-described insertable accessories (e.g., the tabletop 1100 of FIGS. 11-14, the cutting board 1500 of FIGS. 15-18, the storage bin 1900 of FIGS. 19-24, the cutting board 2500 of FIGS. 25 and 26, the basin 2700 of FIGS. 27 and 28, the caddy 2900 of FIGS. 29 and 30, and the tray 3100 of FIGS. 31 and 32) at a storage location (e.g., below the cookbox 5504 of the grill 6000) when any such insertable accessory is not needed for use with the accessory support frame 100. For example, FIG. 62 is another perspective view of the grill 6000 of FIGS. 60 and 61, with two instances of the storage bin 1900 of FIGS. 19-24 shown seated on the storage rails 6002 of the grill 6000. FIG. 63 is another front view of the grill 6000 of FIGS. 60-62, with the two instances of the storage bin 1900 shown seated on the storage rails 6002 of the grill 6000.

Figure 64:
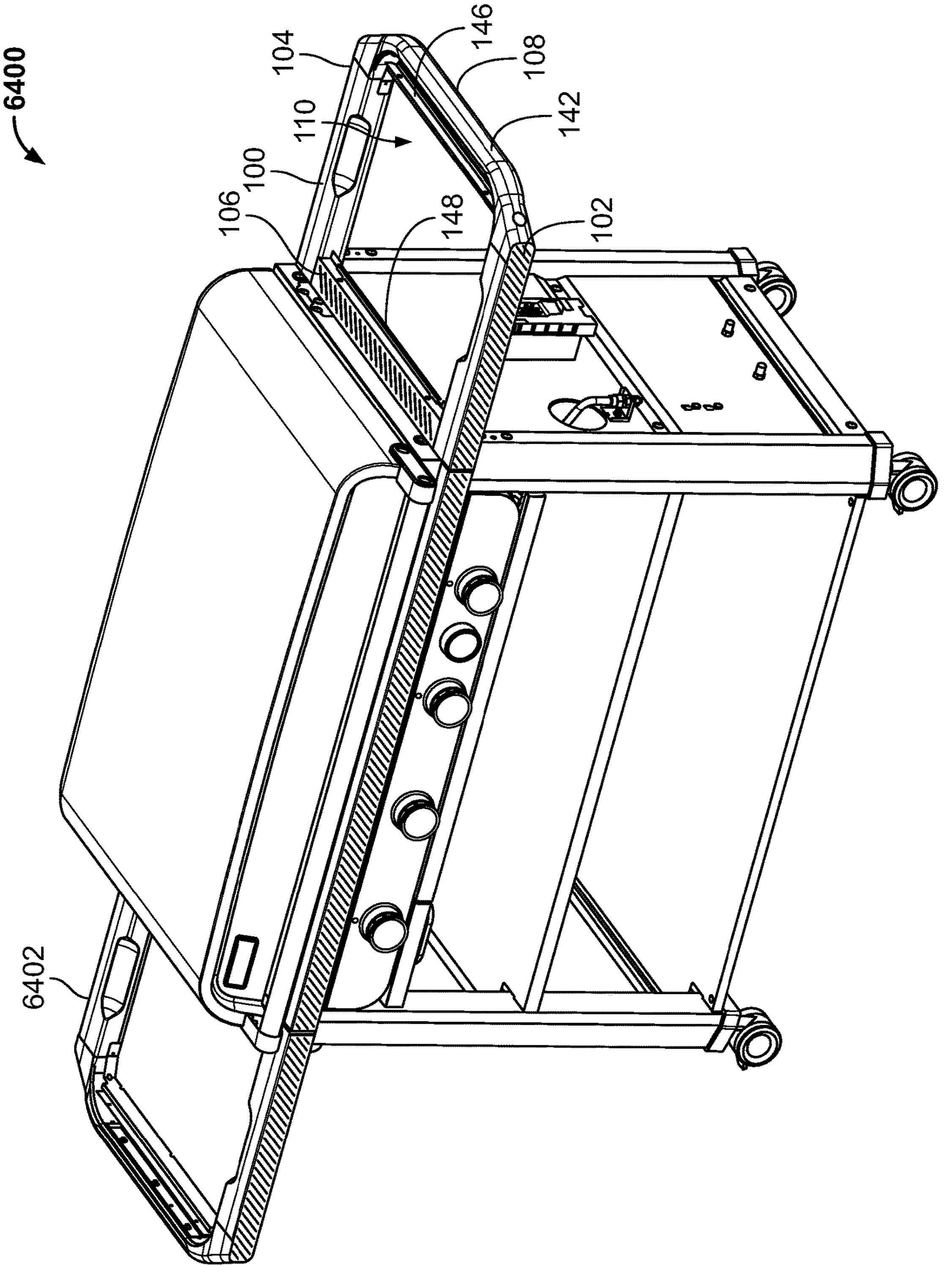
FIG. 64 is a perspective view of another example grill including the accessory support frame of FIGS. 1-10.
Figure 65:
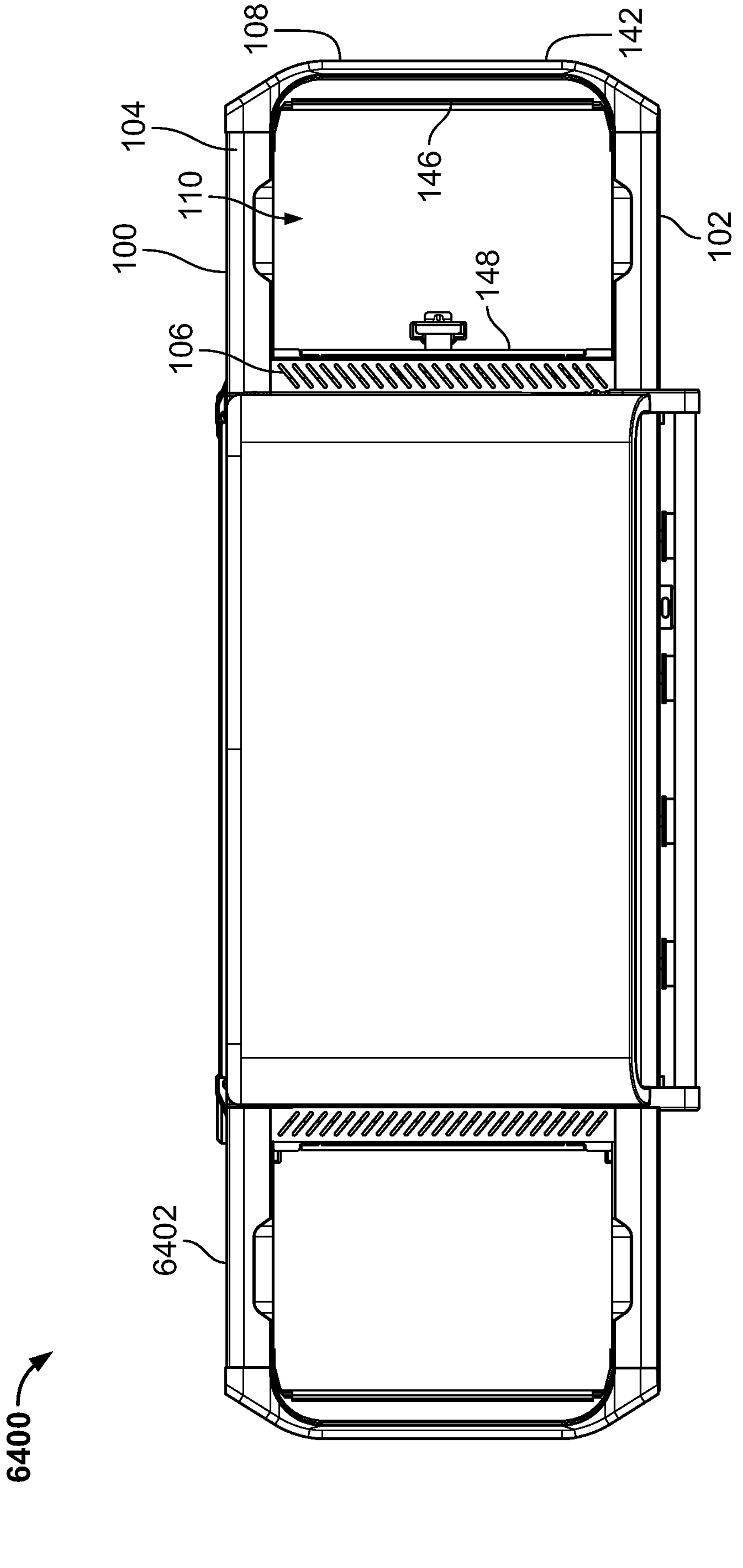
FIG. 65 is a top view of the grill of FIG. 64.

FIG. 64 is a perspective view of another example grill 6400 including the accessory support frame 100 of FIGS. 1-10. FIG. 65 is a top view of the grill 6400 of FIG. 64. The grill 6400 of FIGS. 64 and 65 includes a flattop griddle cooking surface, a cookbox, a lid, and a frame that are structured in a manner that generally corresponds to the flattop griddle cooking surface 5502, the cookbox 5504, the lid 5506, and the frame 5510 of the grill 5500 of FIGS. 55-57 described above. In the illustrated example of FIGS. 64 and 65, the accessory support frame 100 is a first accessory support frame of the grill 6400. The grill 6400 of FIGS. 64 and 65 further includes an example second accessory support frame 6402 constructed in a substantially identical manner to (e.g., as a mirror image of) the accessory support frame 100 of FIGS. 1-10. As shown in FIGS. 64 and 65, the second accessory support frame 6402 is coupled to the frame 5510 of the grill 6400, with the second accessory support frame 6402 being located to the left side of the cookbox 5504 at a position that would conventionally be occupied by a left side table of the grill 6400. The second accessory support frame 6402 includes all of the structural features and functionalities of the accessory support frame 100 of FIGS. 1-10 described above, particularly with regard to the ability to support (1) the above-described insertable accessories (e.g., the tabletop 1100 of FIGS. 11-14, the cutting board 1500 of FIGS. 15-18, the storage bin 1900 of FIGS. 19-24, the cutting board 2500 of FIGS. 25 and 26, the basin 2700 of FIGS. 27 and 28, the caddy 2900 of FIGS. 29 and 30, and the tray 3100 of FIGS. 31 and 32) that are interchangeably insertable into and/or locatable within the inset region 110 of the accessory support frame 100, and/or (2) the above-described interchangeable snap fit accessories (e.g., the tool hook 3700 of FIGS. 37-39, the bottle holder 4000 of FIGS. 40-42, the caddy 4300 of FIGS. 43-45, the bag holder 4600 of FIGS. 46-48, and the roll holder 4900 of FIGS. 49-51)

that are interchangeably removably couplable to the accessory mounting segment 142 of the accessory rail 108 of the accessory support frame 100.

The following paragraphs provide various examples in relation to the disclosed accessory support frames for grills.

Example 1 includes an accessory support frame for a grill. In Example 1, the accessory support frame comprises a front support, a rear support, an inset region, and an accessory rail. In Example 1, the rear support is spaced apart from the front support. In Example 1, the inset region is located between and bordered by the front support and the rear support. In Example 1, the inset region is configured to receive and to support an insertable accessory. In Example 1, the accessory rail is coupled to the front support and the rear support. In Example 1, the inset region is bordered by the accessory rail. In Example 1, the accessory rail includes an accessory mounting segment configured to be engaged by and to support a snap fit accessory.

Example 2 includes the accessory support frame of Example 1. In Example 2, the inset region includes a first support rail and a second support rail. In Example 2, the first support rail is located between the front support and the rear support. In Example 2, the first support rail is configured to support a first portion of the insertable accessory. In Example 2, the second support rail is located between the front support and the rear support. In Example 2, the second support rail is spaced apart from the first support rail. In Example 2, the second support rail is configured to support a second portion of the insertable accessory.

Example 3 includes the accessory support frame of Example 2. In Example 3, the accessory mounting segment of the accessory rail is spaced apart from and oriented parallel relative to the first support rail of the inset region.

Example 4 includes the accessory support frame of Example 2. In Example 4, the second support rail is oriented parallel relative to the first support rail.

Example 5 includes the accessory support frame of Example 4. In Example 5, the second support rail is spaced apart from the first support rail by a width, and the rear support is spaced apart from the front support by a depth.

Example 6 includes the accessory support frame of Example 5. In Example 6, the insertable accessory is configured to occupy the width when the insertable accessory is inserted into the inset region.

Example 7 includes the accessory support frame of Example 6. In Example 7, the insertable accessory is configured to substantially occupy the depth when the insertable accessory is inserted into the inset region.

Example 8 includes the accessory support frame of Example 6. In Example 8, the insertable accessory is configured to occupy approximately one half of the depth when the insertable accessory is inserted into the inset region.

Example 9 includes the accessory support frame of Example 1. In Example 9, at least one of the front support or the rear support includes a recess leading into and extending outwardly from the inset region, the recess configured to enable removal of the insertable accessory from the inset region.

Example 10 includes the accessory support frame of Example 1. In Example 10, the accessory support frame further comprises a side support coupled to the front support and the rear support. In Example 10, the side support is spaced apart from the accessory rail. In Example 10, the inset region is located between and bordered by the side support and the accessory rail.

Example 11 includes the accessory support frame of Example 10. In Example 11, an upper surface of the side support includes a plurality of heat distribution openings.

Example 12 includes the accessory support frame of Example 10. In Example 12, the accessory support frame further comprises a mounting leg located proximate the side support. In Example 12, the mounting leg extends below the inset region. In Example 12, the mounting leg is receivable within and couplable to a support member of the grill.

Example 13 includes the accessory support frame of Example 10. In Example 12, the accessory support frame further comprises a mounting tab located proximate the side support. In Example 13, the mounting tab extends above the inset region. In Example 13, the mounting tab is couplable to a support member of the grill.

Example 14 includes the accessory support frame of Example 1. In Example 14, the accessory mounting segment is configured to be engaged by a connector of the snap fit accessory to removably couple the snap fit accessory to the accessory rail.

Example 15 includes the accessory support frame of Example 14. In Example 15, a shape of a portion of the connector of the snap fit accessory complements a shape of a portion of the accessory mounting segment of the accessory rail.

Example 16 includes the accessory support frame of Example 1. In Example 16, the accessory support frame is configured to enable removal of the insertable accessory from the inset region while the snap fit accessory remains coupled to the accessory mounting segment of the accessory rail. In Example 16, the accessory support frame is configured to enable removal of the snap fit accessory from the accessory mounting segment of the accessory rail while the insertable accessory remains within the inset region.

Example 17 includes the accessory support frame of Example 1. In Example 17, the insertable accessory is one insertable accessory from among a plurality of insertable accessories. In Example 17, respective ones of the plurality of insertable accessories are configured to be interchangeably inserted into the inset region.

Example 18 includes the accessory support frame of Example 17. In Example 18, the plurality of insertable accessories includes a tabletop, a cutting board, a storage bin, a basin, a caddy, or a tray.

Example 19 includes the accessory support frame of Example 1. In Example 19, the snap fit accessory is one snap fit accessory from among a plurality of snap fit accessories. In Example 19, respective ones of the plurality of snap fit accessories are configured to be interchangeably removably coupled to the accessory mounting segment.

Example 20 includes the accessory support frame of Example 19. In Example 20, the plurality of snap fit accessories includes a tool hook, a caddy, a bottle holder, a bag holder, or a roll holder.

Although certain example apparatus, systems, methods, and articles of manufacture have been disclosed herein, the scope of coverage of this patent is not limited thereto. On the contrary, this patent covers all apparatus, systems, methods, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An accessory support frame for a grill, the accessory support frame comprising:

a front support;

a rear support spaced apart from and oriented parallel to the front support;

a side support coupled to and extending between the front support and the rear support;

an accessory rail coupled to and extending between the front support and the rear support, the accessory rail spaced apart from the side support, the accessory rail including an accessory mounting segment oriented parallel to the side support, the accessory mounting segment configured to be engaged by and to support a snap fit accessory; and an inset region located between and bordered by the front support, the rear support, the side support, and the accessory rail, the inset region configured to receive and to support an insertable accessory, the inset region including:

a first support rail located between the front support and the rear support proximate to the accessory rail, the first support rail spaced apart from and oriented parallel to the accessory mounting segment such that an upper engagement tab of a connector of the snap fit accessory is received within a portion of the inset region that is located between the first support rail and the accessory mounting segment when the snap fit accessory is coupled to the accessory mounting segment, the first support rail configured to support a first portion of the insertable accessory; and a second support rail located between the front support and the rear support proximate the side support, the second support rail oriented parallel to the side support, the second support rail spaced apart from and oriented parallel to the first support rail, the second support rail configured to support a second portion of the insertable accessory.

2. The accessory support frame of claim 1, wherein the second support rail is spaced apart from the first support rail by a width, and the rear support is spaced apart from the front support by a depth.

3. The accessory support frame of claim 2, wherein the insertable accessory is configured to occupy the width when the insertable accessory is inserted into the inset region.

4. The accessory support frame of claim 3, wherein the insertable accessory is configured to substantially occupy the depth when the insertable accessory is inserted into the inset region.

5. The accessory support frame of claim 3, wherein the insertable accessory is configured to occupy no more than approximately one half of the depth when the insertable accessory is inserted into the inset region.

6. The accessory support frame of claim 1, wherein the front support includes a front recess formed in an inner surface and an upper surface of the front support, wherein the rear support includes a rear recess formed in an inner surface and an upper surface of the rear support, wherein the front recess and the rear recess each lead into and extend outwardly from the inset region, wherein the front recess and the rear recess are each configured to enable removal of the insertable accessory from the inset region.

7. The accessory support frame of claim 1, wherein an upper surface of the side support includes a plurality of heat distribution openings.

8. The accessory support frame of claim 1, further comprising a mounting leg located proximate the side support, the mounting leg extending below the inset region, the mounting leg receivable within and couplable to a vertically-oriented support member of a frame of the grill.

9. The accessory support frame of claim 8, further comprising a mounting tab located proximate the side support, the mounting tab extending above the inset region, the mounting tab couplable to a horizontally-oriented support member of the frame of the grill.

10. The accessory support frame of claim 1, wherein the accessory mounting segment is configured to be engaged by the connector of the snap fit accessory to removably couple the snap fit accessory to the accessory rail, wherein a shape of a portion of the connector of the snap fit accessory complements a shape of a portion of the accessory mounting segment of the accessory rail.

11. The accessory support frame of claim 1, wherein the accessory support frame is configured to enable removal of the insertable accessory from the inset region while the snap fit accessory remains coupled to the accessory mounting segment of the accessory rail, and to enable removal of the snap fit accessory from the accessory mounting segment of the accessory rail while the insertable accessory remains within the inset region.

12. The accessory support frame of claim 1, wherein the insertable accessory is one insertable accessory from among a plurality of insertable accessories, wherein respective ones of the plurality of insertable accessories are configured to be interchangeably inserted into the inset region.

13. The accessory support frame of claim 12, wherein the plurality of insertable accessories includes a tabletop, a cutting board, a storage bin, a basin, a caddy, or a tray.

14. The accessory support frame of claim 1, wherein the snap fit accessory is one snap fit accessory from among a plurality of snap fit accessories, wherein respective ones of the plurality of snap fit accessories are configured to be interchangeably removably coupled to the accessory mounting segment.

15. The accessory support frame of claim 14, wherein the plurality of snap fit accessories includes a tool hook, a caddy, a bottle holder, a bag holder, or a roll holder.

16. The accessory support frame of claim 1, wherein the first support rail includes an upwardly-facing notch configured to receive a first portion of a downwardly-facing rim of the insertable accessory when the insertable accessory is inserted into the inset region, and wherein the second support rail includes an upwardly-facing notch configured to receive a second portion of the downwardly-facing rim of the insertable accessory when the insertable accessory is inserted into the inset region.

17. The accessory support frame of claim 1, wherein the first support rail includes a first end coupled to the front support and a second end coupled to the rear support.

18. The accessory support frame of claim 17, wherein the second support rail is coupled to or integrally formed with the side support.

19. The accessory support frame of claim 1, wherein the accessory mounting segment includes a contoured outer surface and a recessed inner surface, wherein the contoured outer surface of the accessory mounting segment is configured to be engaged by a contoured inner surface of the connector of the snap fit accessory when the snap fit accessory is coupled to the accessory mounting segment, wherein a shape of the contoured inner surface of the connector complements a shape of the contoured outer surface of the accessory mounting segment, wherein the recessed inner surface of the accessory mounting segment is configured to receive a portion of the upper engagement tab of the connector of the snap fit accessory when the snap fit accessory is coupled to the accessory mounting segment.

20. The accessory support frame of claim 19, wherein the accessory mounting segment further includes an upper engagement surface and a lower engagement surface, the upper engagement surface located between the contoured outer surface and the recessed inner surface along an upper portion of the accessory mounting segment, the lower engagement surface located between the contoured outer surface and the recessed inner surface along a lower portion of the accessory mounting segment, wherein the upper engagement surface is configured to be engaged by the upper engagement tab of the connector of the snap fit accessory and the lower engagement surface is configured to be engaged by a lower engagement tab of the connector of the snap fit accessory when the snap fit accessory is coupled to the accessory mounting segment, wherein the snap fit accessory is removably couplable to the accessory mounting segment via the upper engagement tab, the lower engagement tab, and the contoured inner surface of the connector of the snap fit accessory.

* * * * *